United States Patent
Becken et al.

(10) Patent No.: US 9,176,330 B2
(45) Date of Patent: Nov. 3, 2015

(54) METHOD FOR OPTIMIZING A SPECTACLE LENS WITH A DIFFRACTION GRATING

(75) Inventors: Wolfgang Becken, Munich (DE); Gregor Esser, Munich (DE); Helmut Altheimer, Baisweil-Lauchdorf (DE); Werner Mueller, Otisheim (DE); Dietmar Uttenweiler, Icking (DE)

(73) Assignee: Rodenstock GmbH, Munich (DE)

(*) Notice: Subject to any disclaimer, the term of this patent is extended or adjusted under 35 U.S.C. 154(b) by 81 days.

(21) Appl. No.: 13/988,182

(22) PCT Filed: Nov. 16, 2011

(86) PCT No.: PCT/EP2011/005781
§ 371 (c)(1),
(2), (4) Date: May 17, 2013

(87) PCT Pub. No.: WO2012/065737
PCT Pub. Date: May 24, 2012

(65) Prior Publication Data
US 2013/0229619 A1    Sep. 5, 2013

(30) Foreign Application Priority Data

Nov. 17, 2010   (DE) .................. 10 2010 051 627

(51) Int. Cl.
*G02C 3/00* (2006.01)
*G02C 7/00* (2006.01)
*G02C 7/02* (2006.01)

(52) U.S. Cl.
CPC *G02C 7/024* (2013.01); *G02C 7/02* (2013.01); *G02C 7/028* (2013.01); *G02C 2202/20* (2013.01); *G02C 2202/22* (2013.01)

(58) Field of Classification Search
CPC .. G02C 7/00–7/165; G02C 2202/00–2202/24; G02C 27/42–27/44
USPC ................ 351/159.77, 159.01, 41, 158, 168; 359/558–576
See application file for complete search history.

(56) References Cited

U.S. PATENT DOCUMENTS 6,070,980 A * 6/2000 Obara et al. ............. 351/159.01
(Continued)

FOREIGN PATENT DOCUMENTS

| EP | 1424049 | 6/2004 |
| EP | 2108993 | 10/2009 |

(Continued)

OTHER PUBLICATIONS

International Search Report issued for PCT/EP2011/005781 date of mailing: Feb. 28, 2012.

*Primary Examiner* — Thomas K Pham
*Assistant Examiner* — Sharrief Broome
(74) *Attorney, Agent, or Firm* — Schiff Hardin LLP

(57) ABSTRACT

A computer-implemented method and a device for optimizing an optical element comprising at least one diffraction grating, wherein at least one refractive surface contributing to the refractive light deflection and/or the at least one diffraction grating of the optical element are/is optimized in such a way as to minimize the color fringe and at least a second-order aberration of the optical element. Also, a corresponding production method and a corresponding device for producing an optical element comprising at least one diffraction grating.

22 Claims, 21 Drawing Sheets

(56) References Cited

U.S. PATENT DOCUMENTS

Figure 1A:
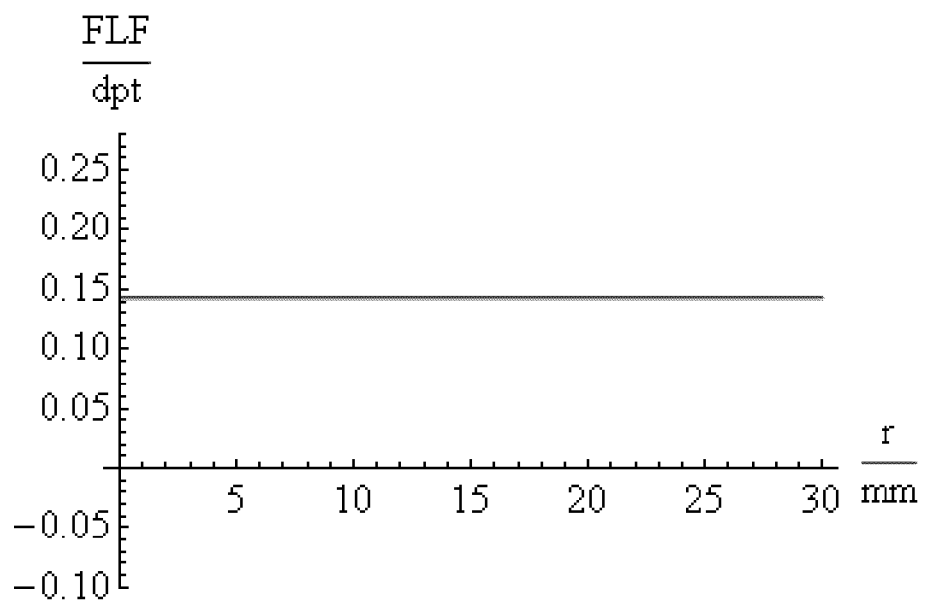

| | | |
|---|---|---|
| 6,536,899 B1 | 3/2003 | Fiala |
| 2003/0063254 A1 | 4/2003 | Peirs et al. |
| 2004/0080710 A1 | 4/2004 | Wooley et al. |
| 2006/0244905 A1* | 11/2006 | Piers et al. ............. 351/161 |

FOREIGN PATENT DOCUMENTS

| | | | |
|---|---|---|---|
| EP | 2113226 | 11/2009 | |
| WO | WO 2005/098518 | 10/2005 | |
| WO | WO 2005098518 A1 * | 10/2005 | ............. G02C 7/02 |
| WO | WO 2008/089999 | 7/2008 | |

* cited by examiner

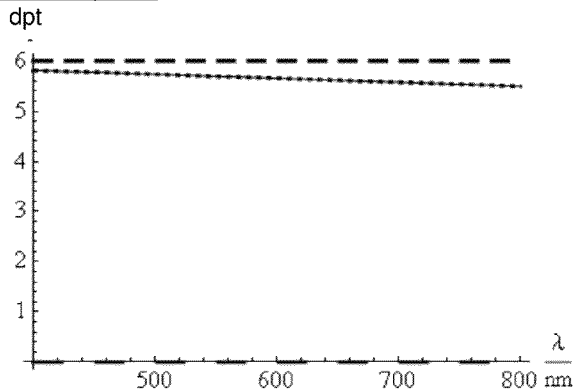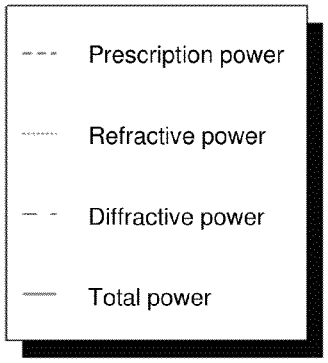
Fig. 7A
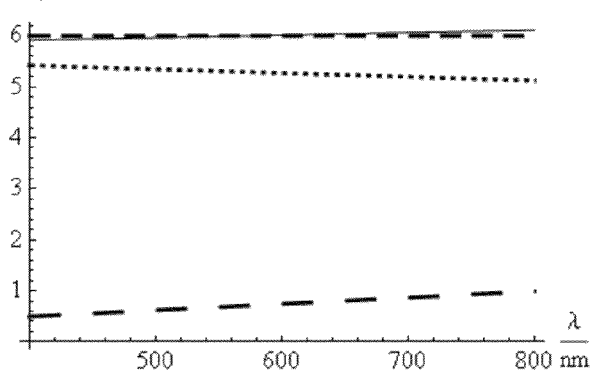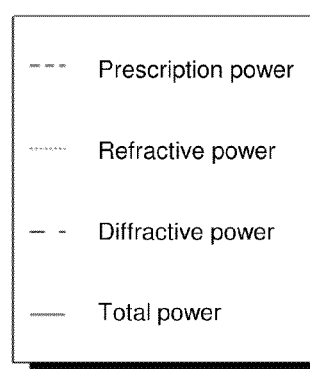
Fig. 7B
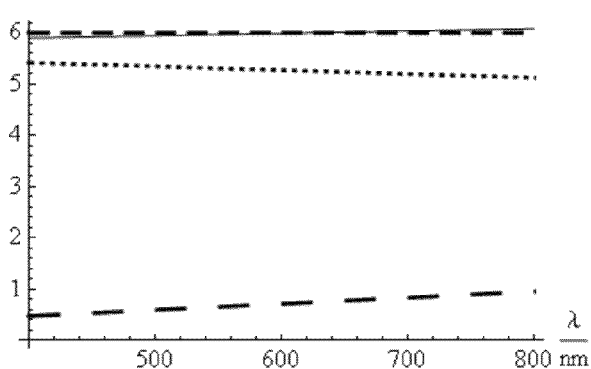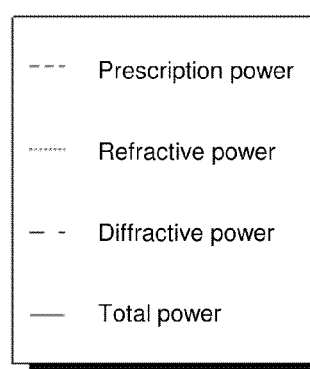
Fig. 7C

METHOD FOR OPTIMIZING A SPECTACLE LENS WITH A DIFFRACTION GRATING

A spectacle lens having a refractive front surface and a refractive back surface, which is composed of a dispersing material, always creates a color fringe in the periphery. This applies irrespective of the monochromatic criteria according to which the spectacle lens surfaces have been determined at first. In particular if, due to an individual optimization, the surfaces realize the best possible compromise between different needs in monochromatic terms, as this is e.g. accomplished by minimization of a target function, then the lens with these surfaces will have a color fringe under polychromatic conditions. This color fringe can be compensated for at least partly by using at least one diffraction grating. A diffraction grating, which is applied to a spectacle lens for color fringe correction, can be selected depending on the dioptric power of the lens. Conversely, however, the grating also contributes to the power of the spectacle lens. By means of the diffraction grating, the color fringe of a spectacle lens having surfaces optimized without a grating and creating a color fringe is at least partly eliminated. However, such a spectacle lens has a refractive error introduced by the diffraction grating.

It is an object of the invention to provide a method for optimizing and producing an optical element, for example a spectacle lens, which makes it possible to correct both the image formation properties of the optical element and the chromatic aberrations thereof in an optimum way.

This object is solved by a computer-implemented method for optimizing an optical element including the features of claim 1, a computer program product including the features of claim 17, a storage medium including the features of claim 18, a device for optimizing an optical element including the features of claim 20, a method for producing an optical element including the features of claim 21, and a device for producing an optical element including the features of claim 22.

A first aspect of the invention relates to a computer-implemented method for optimizing an optical element comprising at least one diffraction grating, wherein at least one refractive surface contributing to refractive light deflection and/or the at least one diffraction grating of the optical element is/are optimized in such a way as to minimize the color fringe and at least one second-order aberration of the optical element. In particular, one aspect of the invention relates to a computer-implemented method for optimizing an optical element comprising at least one diffraction grating, wherein at least one refractive surface contributing to refractive light deflection and/or the at least one diffraction grating of the optical element are optimized in such a way as to minimize the longitudinal, or axial, chromatic aberrations and/or the lateral, or transverse, chromatic aberration and at least one second-order (monochromatic) aberration of the optical element. The longitudinal and/or lateral chromatic aberration(s) of the optical element represent a measure for the color fringe of the optical element. Preferably, the lateral chromatic aberration of the optical element is minimized.

Within the scope of the present application, an optical element is understood to be an arbitrary, image-forming optical element or system having one or more optical component(s). The optical element may be a lens or lens system, a spectacle lens, a prism, etc. The optical element has at least two (refractive) boundary surfaces and at least one diffraction grating. The diffraction grating can be applied to or arranged on one of the refractive boundary surfaces, for example. However, the optical element can comprise more than two boundary surfaces, such as in the case of a lens system, laminated lenses or spectacle lenses, spectacle lenses formed as a so-called "compound system" comprising at least one main lens and a cover lens, etc.

Within the scope of the present application, the term "diffraction grating" is understood to mean any phase and/or amplitude-modulating or -modifying optical element to which diffraction effects have relevance. In particular, a phase-modifying optical element (POE) is an element that is phase-delaying or phase-modulating such that the change of the optical path length, by adding the element, depends on the penetration point of the ray. The diffraction grating can be realized by a diffractive optical element (DOE) or any other type of phase and/or amplitude modulation(s).

The diffraction grating usually comprises a substantially regular, preferably periodic or quasi-periodic, line-like arrangement of structures or regions in which the light is influenced such that diffraction effects have relevance. The diffraction grating may be both a finely structured diffraction grating and a coarsely structured diffraction grating (such as an MOD=multi order diffraction grating). The diffraction grating may be a transmission grating, a mechanically separated grating, particularly a sawtooth grating or blazed grating, a holographic grating, a grating realized with a varying refractive index (gradient-index-material) by a thin film or layer, etc. The structures of the diffraction gratings used can be static or switchable, in particular electrically switchable. Methods for producing static or switchable diffraction gratings are known in the prior art.

Preferably, use is made of diffraction gratings in which the path difference between two neighboring grating lines typically corresponds to a diffraction order of $|m|=1$ to $|m|=4$. It is also possible to use an MOD grating in which the path difference is typically in the order of $|m| \approx 20$. For example, the diffraction grating can be used in the first diffraction order. However, it is possible to use the diffraction grating not in the first diffraction order, but in a higher order. The diffraction grating can have a boundary surface that is calculated against air. It is also possible to calculate a boundary surface of the diffraction grating not against air, but against a different material.

The profile of the diffraction grating can be suitably dimensioned and set. The profile of the diffraction grating is preferably set such that the diffraction efficiency for a specific diffraction order is at a maximum. Put differently, the profile of the diffraction grating can be set such that the intensity of the diffracted light concentrates in one diffraction order, if possible. Preferably, the grating profile is sawtooth-shaped or blazed. In particular, a blazed boundary surface can be inserted between a dispersing base material and air. The lateral scale of the grating, i.e. the grating constant, can be in the order of magnitude of the wavelength. However, it is also possible to use diffraction gratings where the grating constant is not in the order of magnitude of the wavelength, but up to a factor of 100 above. The diffraction grating can be overlaid/combined with another grating, e.g. with a Fresnel grating, which has a dioptric power other than zero. As will be explained in detail in the following, the period of the grating can be suitably determined.

The grating can extend substantially across the entire angular region of the optical element, e.g. across the entire viewing angle region of a spectacle lens. The grating can be arranged around a predetermined reference point, particularly around the prism reference point, around the centration or fitting point, etc., or around the geometric center of the optical element in a centered manner. However, it is also possible to arrange the grating in a decentered manner. The grating lines are generally asymmetric, closed curves. In the case of rotationally symmetric elements, the grating lines can be circular or elliptical curves.

One or more of the boundary surfaces of an optical element, e.g. of a spectacle lens, can have diffraction gratings. For example, in the case of a spectacle lens, a diffraction grating can be arranged on or attached to the front and/or back surface(s) of the spectacle lens. However, it is possible to provide a compound system composed of a main lens and a cover lens, wherein the grating structures are applied to the protected inner sides of the main lens and/or of the cover lens (i.e. the mutually opposite sides of the main and cover lenses).

Preferably, the at least one second-order aberration of the optical (image-forming) system is the refractive error. The refractive error particularly represents the deviation of the spherical equivalent from a predetermined target value, which is e.g. determined by refraction determination. Alternatively or in addition, the at least one aberration can be the astigmatic error or comprise the astigmatic error. The astigmatic error particularly represents the amount of astigmatic deviation from a predetermined target value, which is e.g. determined by refraction determination. It is also possible to take higher-order aberrations into consideration (e.g. coma, trefoil, spherical aberration, etc.).

The optimization can comprise a modification or variation of at least one variable parameter of the diffraction grating and/or of at least one variable surface parameter of the refractive surface. Preferably, the at least one refractive surface and/or the at least one diffraction grating are described by means of a flexible mathematical representation, such as a spline representation or a polynomial representation. Preferably, as will be described in the following, the grating is described by means of a phase function having at least one degree of freedom or at least one variable parameter. The at least one refractive surface, which contributes to refractive light deflection, and/or the at least one diffraction grating are preferably modified or optimized until both the at least one aberration and the color fringe become optimally small in the sense of a preferably best possible compromise. Put differently, the at least one refractive surface and/or the at least one diffraction grating are modified or optimized until both the at least one aberration and the color fringe are minimized. Optimizing can comprise minimizing or maximizing a target function, which takes the aberrations at many evaluation points as well as lateral and/or longitudinal chromatic aberration(s) into account, wherein the minimization/maximization of the target function tries to find a suitable compromise between the requirements on many directions of sight.

In particular, the optimization can be performed such that the color fringe in a predetermined region of the optical element is below a predetermined perception threshold. Below the perception threshold, the color fringe is not perceived as disturbing. The perception threshold can be in range of between 0.04 cm/m and 0.5 cm/m. A typical perception threshold is 0.12 cm/m. The predetermined region can extend across the entire optical element. Preferably, the at least one aberration and the color fringe are determined at several evaluation points and are evaluated by means of a target function. Minimization in this case is understood to mean finding a preferably best possible compromise, which is sought by optimization in a plurality of evaluation points or viewing angles.

Irrespective of how the compromise is reached, it is advantageous to perform the optimization of the at least one refractive surface and/or of the at least one diffraction grating in a wearing position of the optical element, wherein preferably the properties of the optical element in the wearing position and in the presence of a diffraction grating are taken into consideration. The properties of the optical element in the wearing position comprise the at least one second-order aberration. The calculation of the properties of an optical element having at least one diffraction grating in the wearing position will be described in detail in the following.

An optical element that is optimally corrected with regard to its image-formation properties and the chromatic aberrations can be obtained with the method according to the invention. Moreover, it is possible to achieve a reduction in thickness of the optical element in addition.

For example, with a conventional thin spectacle lens of a highly refractive material with the Abbe number $v_d \approx 30$, which has been monochromatically optimized, the region in which the color fringe is below the perception threshold can be only a few millimeters depending on the power. With the proposed optimization method according to a preferred embodiment, this region can be extended to almost the entire spectacle lens, which corresponds to a theoretical Abbe number of $v_d \approx 100$ to $v_d \approx 200$. Thus, a spectacle lens having a color fringe corrected virtually across the entire viewing angle range is obtained. Such an improvement can be achieved both for single-vision lenses and for asymmetric lenses, and in particular for progressive spectacle lenses.

To calculate an optical element, e.g. a spectacle lens, for which the power comes about both by surface curvatures and by at least one diffraction grating, preferably both the at least one refractive surface and the at least one diffraction grating of the optical element are optimized and varied. This can be accomplished by optimizing and varying the surface parameters and parameters of the diffraction grating.

Preferably, the method comprises simultaneously, i.e. concurrently optimizing and varying the at least one refractive surface and the at least one diffraction grating. The optimization can be accomplished by minimizing or maximizing a target function, which depends on the at least one aberration and on the longitudinal and/or lateral chromatic aberration(s) of the optical element. In the following, this target function in contrast to a convention monochromatic target function will be referred to as a "polychromatic" target function. The optimization is preferably performed for a plurality of evaluation points, e.g. for 1000 to more than 10000 evaluation points.

The color fringe or the chromatic aberrations (longitudinal and/or lateral chromatic aberration(s)) of the optical element can indirectly be taken into consideration due to the wavelength dependency of the aberrations taken into account in the target function. The longitudinal and/or lateral chromatic aberration(s) of the optical element can also directly be taken into account in the target function e.g. by means of additional terms that depend on the longitudinal and/or lateral chromatic aberration(s). The target function is preferably evaluated at a plurality of evaluation points.

Preferably, both the diffraction grating and the refractive surfaces, which contribute to the refractive light deflection, are varied simultaneously until both the at least one aberration and the color fringe become optimally small in the sense of a preferably best possible compromise. Without the color fringe problems, the problem of calculating an optical element for several evaluation points, such as a spectacle lens for several viewing directions, both in a refraction-correct and astigmatism-free manner is overdetermined, as long as the degrees of freedom are determined only by one or two variable surfaces. One solution approach according to the prior art in this case is the minimization/maximization of a target function that takes the aberrations at many evaluation points into consideration, wherein the minimization/maximization of the target function tries to find a suitable compromise between the requirements on many viewing directions. If the color fringe is taken into consideration, an overdetermined problem will usually also have to be solved, even if another degree of freedom is added with the grating. Again, the problem is to find a suitable compromise. However, other than with a purely monochromatic optimization, the compromise according to a preferred embodiment does not only compensate for requirements between different viewing directions, but also between at least two different wavelengths.

Preferably, the target function is a target function $F_1$ of the form:

$$F_1 = \sum_\lambda F_{monochrom}(\lambda),$$

where $F_{monochrom}(\lambda)$ is a monochromatic target function for the wavelength $\lambda$; and wherein the polychromatic target function $F_1$ is evaluated for at least two different wavelengths.

In particular, such a target function is achieved since an arbitrary monochromatic target function is understood to be a function of the wavelength and is evaluated for at least two different wavelengths and summed up via the set of at least two different wavelengths. As explained above, in this case, the chromatic aberrations of the optical element are indirectly taken into consideration due to the wavelength dependency of the variables taken into account in the target function. The monochromatic target function can be a monochromatic target function known from the prior art, for example.

In particular, the target function $F_1$ can be a target function of the form:

$$F_1 = \sum_{i,\lambda} g_Z(i,\lambda)(Z_\Delta(i,\lambda) - Z_{\Delta,target}(i,\lambda))^2 + g_S(i,\lambda)(S_\Delta(i,\lambda) - S_{\Delta,target}(i,\lambda))^2.$$

In the above formula:
$Z_\Delta(i,\lambda)$ is the actual value of the amount of the astigmatic error at the $i^{th}$ evaluation point of the optical element for the wavelength $\lambda$;
$Z_{\Delta,target}(i,\lambda)$ is the target value of the amount of the astigmatic error at the $i^{th}$ evaluation point of the optical element for the wavelength $\lambda$;
$S_\Delta(i,\lambda)$ is the actual value of the refractive error at the $i^{th}$ evaluation point of the optical element for the wavelength $\lambda$;
$S_{\Delta,target}(i,\lambda)$ is the target value of the refractive error at the $i^{th}$ evaluation point of the optical element for the wavelength $\lambda$;
$g_Z(i,\lambda)$ is the weighting of the amount of the astigmatic deviation at the $i^{th}$ evaluation point of the optical element for the wavelength $\lambda$; and
$g_S(i,\lambda)$ is the weighting of the refractive error at the $i^{th}$ evaluation point of the optical element for the wavelength $\lambda$.

The target function can also be a target function $F_2$ of the form:

$$F_2 = F_{monochrom}(\lambda_0) + \sum_i g_{FLF}(i) \times f(S_{SK}(i,\lambda_2) - S_{SK}(i,\lambda_1))^2$$

In the above formula:
$F_{monochrom}(\lambda)$ is a monochromatic target function for a predetermined wavelength $\lambda_0$;
$g_{FLF}(i)$ is the weighting of the longitudinal chromatic aberration at the $i^{th}$ evaluation point of the optical element;
$S_{SK}(i,\lambda_1)$ is the vergence matrix of the wavefront at the vertex sphere for the wavelength and for the $i^{th}$ evaluation point;
$S_{SK}(i,\lambda_2)$ is the vergence matrix of the wavefront at the vertex sphere for the wavelength and for the $i^{th}$ evaluation point; and
$f(S_{SK}(i,\lambda_2) - S_{SK}(i,\lambda_1))$ is the function of the difference of the vergence matrices of the wavefront at the vertex sphere for two different wavelengths and $\lambda_1$ and $\lambda_2$.

A target function of the above type is in particular achieved since an arbitrary monochromatic target function is evaluated at a predetermined wavelength 4 (operating wavelength) and since another term is added to this function, which depends on the difference $(S_{SK}(i,\lambda_2) - S_{SK}(i,\lambda_1))$ of the vergence matrices for at least two different wavelengths $\lambda_1$ and $\lambda_2$. The type of dependence can be selected differently. In particular, the function $f$ can be the dioptric distance between the vergence matrices or the difference of the spherical equivalents. In the latter case, the function $f$ represents a penalty term for the longitudinal chromatic aberration. The function $f$ can be an arbitrary function for which $f(0)=0$ is satisfied. Preferably, $f$ is to be selected such that $f(S_{SK}(i,\lambda_2) - S_{SK}(i,\lambda_1))$ is the greater the greater the distance between $S_{SK}(i,\lambda_2)$ and $S_{SK}(i,\lambda_1)$ is. In a further preferred embodiment, $fS_{SK}(i,\lambda_2) - S_{SK}(i,\lambda_1)$ is the greater the greater the distance between the spherical equivalents of $S_{SK}(i,\lambda_2)$ and $S_{SK}(i,\lambda_1)$ is.

A target function $F_2$ of the above type can be a target function of the form:

$$F_2 = \sum_i (g_Z(i)(Z_\Delta(i,\lambda_0) - Z_{\Delta,target}(i,\lambda_0))^2 + g_S(i)(S_\Delta(i,\lambda_0) - S_{\Delta,target}(i,\lambda_0))^2 + g_{FLF}(i) \times f(S_{SK}(i,\lambda_2) - S_{SK}(i,\lambda_1))^2).$$

In this formula:
$Z_\Delta(i,\lambda)$ is the actual value of the amount of the astigmatic error at the $i^{th}$ evaluation point of the optical element for the wavelength $\lambda$;
$Z_{\Delta,target}(i,\lambda)$ is the target value of the amount of the astigmatic error at the $i^{th}$ evaluation point of the optical element for the wavelength $\lambda$;
$S_\Delta(i,\lambda)$ is the actual value of the refractive error at the $i^{th}$ evaluation point of the optical element for the wavelength $\lambda$;
$S_{\Delta,target}(i,\lambda)$ is the target value of the refractive error at the $i^{th}$ evaluation point of the optical element for the wavelength $\lambda$;
$g_Z(i,\lambda)$ is the weighting of the amount of the astigmatic deviation at the $i^{th}$ evaluation point of the optical element for the wavelength $\lambda$; and
$g_S(i,\lambda)$ is the weighting of the refractive error at the $i^{th}$ evaluation point of the optical element for the wavelength $\lambda$.

According to a further preferred example, the target function can be a target function $F_3$ of the form:

$$F_3 = F_{monochrom}(\lambda_0) + \sum_i g_{FQF}(i) \times g(\Delta\varphi_{SK}(i,\lambda_2,\lambda_1))^2$$

where
$F_{monochrom}(\lambda)$ is a monochromatic target function for a predetermined wavelength $\lambda_0$;
$g_{FQF}(i)$ is the weighting of the lateral chromatic aberration at the $i^{th}$ evaluation point of the optical element;

$S_{SK}(i,\lambda_1)$ is the vergence matrix of the wavefront at the vertex sphere for the wavelength and for the $i^{th}$ evaluation point;

$S_{SK}(i,\lambda_2)$ is the vergence matrix of the wavefront at the vertex sphere for the wavelength $\lambda_2$ and for the $i^{th}$ evaluation point; and $\Delta\phi_{SK}(i, \lambda_2, \lambda_1)$ is the angle between the object-side main rays for different wavelengths $\lambda_1$ and $\lambda_2$, and $g(\Delta\phi_{SK}(i, \lambda_2, \lambda_1))$ is a function of the angle between the object-side main rays for different wavelengths $\lambda_1$ and $\lambda_2$.

A target function of the above type is in particular achieved since an arbitrary monochromatic target function is evaluated at a predetermined wavelength) (operating wavelength) and since another term is added to this function, which depends on the lateral chromatic aberration. Thus, a function $g(\Delta\phi_{SK}(i,\lambda_2, \lambda_1))$ represents a penalty term for the lateral chromatic aberration, which is determined by the angle $\Delta\phi_{SK}(i,\lambda_2,\lambda_1)$ between the object-side main rays for different wavelengths $\lambda_1$ and $\lambda_2$. The function g can be the identity, a trigonometric function, or any other suitable function.

An exemplary target function of the above type is a target function $F_3$ of the form:

$$F_3 = \sum_i (g_Z(i)(Z_\Delta(i, \lambda_0) - Z_{\Delta,target}(i, \lambda_0))^2 + g_S(i)(S_\Delta(i, \lambda_0) - S_{\Delta,target}(i, \lambda_0))^2 + g_{FQF}(i) \times g(\Delta\varphi_{SK}(i, \lambda_2, \lambda_1))^2).$$

where $Z_\Delta(i,\lambda)$ is the actual value of the amount of the astigmatic error at the $i^{th}$ evaluation point of the optical element for the wavelength $\lambda$;

$Z_{\Delta,target}(i,\lambda)$ is the target value of the amount of the astigmatic error at the $i^{th}$ evaluation point of the optical element for the wavelength $\lambda$;

$S_\Delta(i,\lambda)$ is the actual value of the refractive error at the $i^{th}$ evaluation point of the optical element for the wavelength $\lambda$;

$S_{\Delta,target}(i,\lambda)$ is the target value of the refractive error at the $i^{th}$ evaluation point of the optical element for the wavelength $\lambda$;

$g_Z(i,\lambda)$ is the weighting of the amount of the astigmatic deviation at the $i^{th}$ evaluation point of the optical element for the wavelength $\lambda$; and $g_S(i,\lambda)$ is the weighting of the refractive error at the $i^{th}$ evaluation point of the optical element for the wavelength $\lambda$.

However, it is also possible to use a different suitable target function, e.g. a target function which is a combination of the above-described target functions. In particular, the target function can include terms that depend both on the longitudinal chromatic aberration and on the lateral chromatic aberration. By using a target function in the method for optimizing an optical element with at least one diffraction grating, the problem of meeting the refraction requirements on the optical element and achieving the reduction of chromatic aberrations in the best possible way can be solved to a large extent. In particular, by means of the target function, a compromise between all requirements for a plurality of evaluation points and directions, in particular viewing directions, can be sought. In order to be able to meet the increasing requirements, it is suggested that additional degrees of freedom or variable parameters be introduced and varied, namely the degrees of freedom of at least one diffraction grating, which is preferably taken into account in the target function via a modified wavefront tracing.

As described above, the method for optimizing an optical element comprising at least one diffraction grating can comprise optimizing and varying the at least one refractive surface and the at least one diffraction grating simultaneously, i.e. concurrently. Instead of simultaneously, the at least one refractive surface and the at least one diffraction grating of the optical element can be optimized and varied sequentially (i.e. in succession). In particular, sequentially optimizing the at least one refractive surface and the at least one diffraction grating comprises optimizing the at least one refractive surface with a diffraction grating being maintained (i.e. with a recorded diffraction portion of the optical element) and optimizing the at least one diffraction grating with refractive surfaces being maintained (i.e. with a recorded refractive portion of the optical element).

An exemplary method with a sequential optimization comprises the steps of:

specifying a refractive optical element;

calculating a diffraction grating that minimizes the color fringe of the specified refractive optical element, and adding the thus calculated diffraction grating to the refractive optical element;

optimizing at least one of the refractive surfaces of the thus created optical element with the diffraction grating being maintained such that the refractive error introduced by the diffraction grating is minimized; and optimizing the at least one diffraction grating with refractive surfaces of the optical element being maintained such that the color fringe introduced by the surface modification is minimized.

The refractive optical element is an optical element that does not have a diffraction grating. For example, the refractive optical element can be a conventional spectacle lens or a lens or a lens system without a diffraction grating. The refractive optical element is preferably optimized such as to minimize at least one second-order aberration, in particular the refractive error and/or the astigmatic error. A minimization is to be understood in the sense of a best possible compromise, which is sought by means of an optimization comprising a plurality of evaluation points or viewing angles. The refractive optical element can be optimized according to a monochromatic optimization method known from the prior art, for example. The monochromatic optimization can be performed by maximizing or minimizing a monochromatic target function in which the at least one second-order aberration is taken into account as a target variable or term.

Specifying a refractive optical element particularly comprises specifying or setting surface data of the at least one refractive optical element. The surface data can be in the form of numerical data. Preferably, the surface data is in the form of a functional or parametric representation with at least one variable parameter. A suitable representation may be a spline representation. The surface data can be stored in a suitable memory.

Calculating the diffraction grating can comprise optimizing the diffraction grating taking the wearing position of the optical element with the diffraction grating into consideration. Optimizing can comprise minimizing one of the above-described polychromatic target functions, for example. In some cases, it is possible to determine or calculate the diffraction grating only generally. The general calculation/determination of the diffraction grating can be accomplished e.g. depending on the total power or the refractive power of the optical element and/or the Abbe number of the optical element.

The optimization of the at least one surface and the at least one diffraction grating can be repeated in an iterative manner. Usually, the method converges and can be discontinued after a suitably selected step.

In this method for optimizing an optical element with a sequential, preferably iterative optimization of the at least one refractive surface and the at least one diffraction grating, the at least one aberration and the color fringe take on their conceivable minima only approximately, since the method is discontinued after finite steps. Depending on the number of steps, the quality of this method can come close to the quality of the method including a simultaneous optimization of the at least refractive surface and the at least one diffraction grating. An advantage of the method including a sequential, preferably iterative optimization of the at least one refractive surface and the at least one diffraction grating can be the use of a simpler target function, e.g. a target function according to the prior art. However, it is also possible to use one of the above-described polychromatic target functions.

Moreover, if a complete compensation of the color fringe is not intended, but a certain residual color fringe error is admissible, then a relatively general selection of the grating will usually be sufficient, so that it does not have to be determined by optimization or by a target function.

Preferably, specifying a refractive optical element comprises optimizing at least one of the refractive surfaces of the refractive optical element, which is performed such as to minimize at least one second-order aberration, preferably the refractive error of the optical element. The optimization of the at least one refractive surface is preferably performed monochromatically, i.e. without taking a wavelength dependency into consideration—as is known from the prior art.

Preferably, the monochromatic optimization is performed such as to minimize the refractive error and/or the astigmatic error, wherein, in at least one reference point, the refractive power of the optical element is substantially equal to a predetermined target value ($S_{prescription}$). In the case of a spectacle lens, the monochromatic optimization is performed such that, in at least one reference point of the spectacle lens, the refractive power of the spectacle lens is substantially equal to the predetermined prescription value ($S_{prescription}$) determined by refraction determination.

The predetermined reference point can be the optical center of the optical element, the vertex of the optical element, or any other suitable reference point. With a spectacle lens, the reference point can be the distance reference point, the centration or fitting point, the near reference point, the prism reference point, the optical center, the geometric center of the raw-round spectacle lens, etc. With non-prismatic spectacle lenses, the optical center usually coincides with the prism reference point. With prismatic spectacle lenses, the optical center is usually in a point the position of which can generally be determined numerically and which does not have to coincide with any special or mentioned reference point in the spectacle lens. Approximately, the position of the optical center is determined by solving the equation for the total prism, which results according to Prentice's rule for Pr:=$Pr_0$−$S'_\infty$, r=0 (where $Pr_0$ is the prescription prism and $S'_\infty$ is the vertex power matrix), with respect to r to r=$(S'_\infty)^{-1} Pr_0$.

According to another embodiment, the method for optimizing an optical element with at least one diffraction grating comprises the steps of:

specifying a refractive optical element;

optimizing at least one of the refractive surfaces of the refractive optical element such that the refractive portion $S_{ref,0}(\lambda_d)$ of the refractive power becomes the value $$\frac{S_{prescription}}{\left(1 - \frac{1}{v_d} \cdot \frac{\lambda_d}{\lambda_F - \lambda_C}\right)}$$

in a predetermined reference point of the refractive optical element and for a predetermined wavelength $\lambda_d$; and calculating a diffraction grating, which minimizes the color fringe of the refractive optical element, and adding the thus calculated diffraction grating to the optimized refractive optical element, where $S_{prescription}$ is a predetermined target value;

$v_d$ is the Abbe number of the base lenses;

$\lambda_F$ is the F-Fraunhofer line, which is taken into account in the definition of the Abbe number; and $\lambda_C$ is the C-Fraunhofer line, which is taken into account in the definition of the Abbe number.

The optimization of the at least one refractive surface of the refractive optical element is performed monochromatically, i.e. without taking a wavelength dependency into consideration. In the case of a spectacle lens, the monochromatic optimization is performed such that in at least one reference point of the spectacle lens, the refractive power of the spectacle lens is substantially equal to the predetermined prescription value $S_{prescription}$ determined by refraction determination, divided by the factor $$\left(1 - \frac{1}{v_d} \cdot \frac{\lambda_d}{\lambda_F - \lambda_C}\right).$$

Due to the prismatic power of the diffraction grating, the diffraction element also has dioptric power according to Prentice's rule. For a predetermined wavelength $\lambda_d$, the actual refractive power $S_0(\lambda_d)$ of a color fringe-corrected optical element having the refractive power $S_{ref,0}(\lambda_d)$ is:

$$S_0(\lambda_d) = S_{ref,0}(\lambda_d)\left(1 - \frac{1}{v_d} \cdot \frac{\lambda_d}{\lambda_F - \lambda_C}\right).$$

Instead of optimizing the surfaces of the optical element in an iterative process such that the refractive power of the optical element takes on the predetermined target value $S_{prescription}$ (i.e. $S_{ref,0}(\lambda_d)=S_{prescription}$), this example suggests providing the modification of the refractive power by the diffraction grating. Specifically, this means that the optimization of the at least one refractive surface is categorically organized such that the later total refractive power takes on the predetermined target value $S_{prescription}$ (i.e. $S_0(\lambda_d)=S_{prescription}$). Consequently, the optimization of the refractive optical element is performed such that $$S_{ref,0}(\lambda_d) = \frac{S_{prescription}}{\left(1 - \frac{1}{v_d} \cdot \frac{\lambda_d}{\lambda_F - \lambda_C}\right)}$$

is satisfied.

In a next step, a diffraction grating is introduced such that it compensates for or minimizes the color fringe of the optimized refractive optical element.

As explained above, calculating the diffraction grating can comprise optimizing the diffraction grating taking the wearing position of the optical element with the diffraction grating into consideration. For example, optimizing can comprise minimizing one of the above-described polychromatic target functions. In some cases, it is possible to determine or calculate the diffraction grating only generally, e.g. depending on the total power or the refractive power of the optical element and on the Abbe number of the optical element.

The above exemplary method has the advantage that the computing effort is comparatively little, but still an optimum (within the possibilities of the grating) correction of the color fringe can be obtained. The refractive error, however, is only minimized approximately, since after adding the diffraction grating, the surfaces are not again optimized in the wearing position. In many cases, this is acceptable though. A further advantage is the possibility of using simpler target functions, e.g. target functions known from the prior art.

According to a further example, the method for optimizing an optical element with at least one diffraction grating comprises the steps of:

specifying a refractive optical element with a refractive power $$S_{ref,0}(\lambda_d) = \frac{S_{prescription}}{\left(1 - \frac{1}{v_d} \cdot \frac{\lambda_d}{\lambda_F - \lambda_C}\right)}$$

in a predetermined reference point for a predetermined wavelength $\lambda_d$;

calculating a diffraction grating adapted to minimize the color fringe of the refractive optical element, and adding the thus calculated diffraction grating to the refractive optical element; and optimizing at least one of the refractive surfaces of the thus created optical element with the diffraction grating being maintained such that the refractive error introduced by the diffraction grating is minimized.

Instead of determining the grating at a later point, as in the above-described method, the diffraction grating can categorically be determined as the grating to compensate for the color fringe of a refractive optical element with a refractive power $$S_{ref,0}(\lambda_d) = \frac{S_{prescription}}{\left(1 - \frac{1}{v_d} \cdot \frac{\lambda_d}{\lambda_F - \lambda_C}\right)}$$

As explained above, calculating the diffraction grating can comprise optimizing the diffraction grating taking the wearing position of the optical element with the diffraction grating into consideration. For example, optimizing can comprise minimizing one of the above-described polychromatic target functions. In some cases, it is possible to determine or calculate the diffraction grating only generally. In particular, the diffraction grating can be determined or calculated depending on the total power or the refractive power of the optical element and/or the Abbe number of the optical element.

The above method has the advantage that with comparatively little computing effort, an optimum correction of the color fringe can be obtained with an approximate correction of the color fringe. In particular, the refractive error can be minimized in the best possible way in the wearing position of the optical element (e.g. the spectacle lens). The color fringe, however, is only minimized approximately, since the surface optimization (preferably in the wearing position and by means of wavefront tracing) is the last step performed, in which all other variables (such as the at least one diffraction grating) are already known. In many cases, the approximate minimization of the color fringe error is acceptable. A further advantage is the possibility of using simpler target functions, e.g. target functions known from the prior art.

Preferably, the at least one aberration of the optical element with the at least one diffraction grating is calculated by means of wavefront tracing taking the diffraction grating into consideration.

Wavefront tracing is preferably performed in a predetermined wearing position of the optical element, which is characterized by average or individual parameters. If the optical element is a spectacle lens, the parameters of the wearing position will comprise face form angle, forward inclination, corneal vertex distance, pupillary distance, and optionally further parameters. Wavefront tracing taking the diffraction grating into consideration will be described in detail in the following.

The method for optimizing an optical element comprising at least one diffraction grating can further comprise obtaining data relating to a power of the optical element to be achieved and/or data relating to an individual or average wearing position of the optical element (e.g. the spectacle lens). The power to be achieved can comprise a spherical and/or astigmatic and/or prismatic power. In the case of a spectacle lens, the date relating to a power of the optical element to be achieved can be prescription data of a spectacles wearer or, put differently, prescription data for the spectacle lens to be optimized. The data relating to an individual or average wearing position of the spectacle lens can comprise face form angle and/or corneal vertex distance and/or forward inclination and/or pupillary distance and/or other data characterizing the wearing position of the spectacle lens.

Preferably, the optical element is a spectacle lens.

A further aspect of the invention relates to a computer program product, i.e. a computer program claimed in the patent category of a device, and to a storage medium with a computer program stored thereon, wherein the computer program is adapted, when loaded and executed on a computer, to perform a preferred exemplary method for optimizing an optical element with at least one diffraction grating.

Moreover, a device for optimizing an optical element with at least one diffraction grating is proposed, wherein the device comprises optimizing means adapted to perform an optimization of the optical element according to a preferred exemplary method for optimizing an optical element. The optimizing means can be implemented by means of suitably configured or programmed computers, specialized hardware and/or computer networks or computer systems, etc.

Further, the device can comprise detecting means adapted to detect data relating to a power of the optical element to be achieved and/or data relating to an individual or average wearing position of the optical element (e.g. the spectacle lens).

A further aspect of the invention relates to a method for producing an optical element, in particular a spectacle lens, with at least one diffraction grating, wherein the method comprises optimizing the optical element according to an exemplary method for optimizing an optical element according to the invention.

The method for producing an optical element can further comprise
  providing processing data of the optimized optical element; and
  manufacturing the optical element on the basis of the provided processing data.

The processing data can comprise surface data of the optical components forming the optical element and data of the at least one diffraction grating. The surface data can e.g. comprise surface data of the boundary surfaces of a lens, a spectacle lens, or a lens system. The data of the at least one diffraction grating can e.g. comprise the grating period, grating profile, grating topology, etc. In addition, the processing data can comprise data relating to the refractive index of the optical components forming the optical element. The processing data can be of numerical form or functional form.

Methods for manufacturing an optical element with at least one diffraction grating on the basis of predetermined data are known from the prior art. In particular, manufacturing can comprise selecting a blank with two refractive boundary surfaces. One of the surfaces of the blank can be finished depending on the provided processing data. Methods for producing surfaces with an arbitrary topography (free-form surfaces) and for forming or applying a diffraction grating are known from the prior art.

A further aspect of the invention relates to a device for producing an optical element, in particular a spectacle lens, with at least one diffraction grating, comprising optimizing means adapted to perform an optimization of the optical element according to an exemplary method for optimizing an optical element according to the invention. The optimizing means have been described in detail in connection with the device for optimizing an optical element with at least one diffraction grating.

The device for producing an optical element, in particular a spectacle lens, with at least one diffraction grating can further comprise processing means (e.g. numerically controlled machines) adapted to manufacture the optimized optical element. Moreover, the device can comprise storage means adapted to store data (e.g. processing data) of the optimized optical element.

Figure 2A:
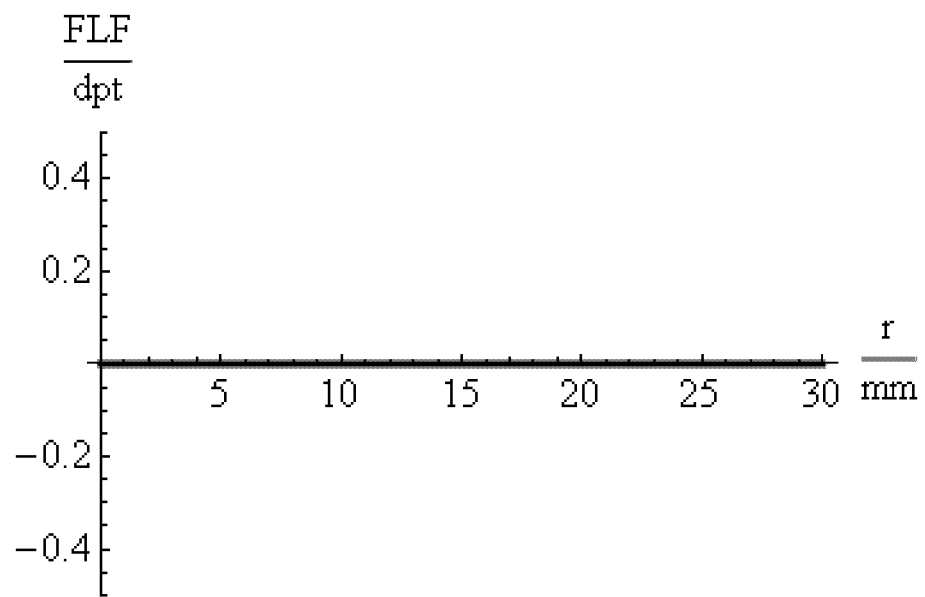
Figure 3A:
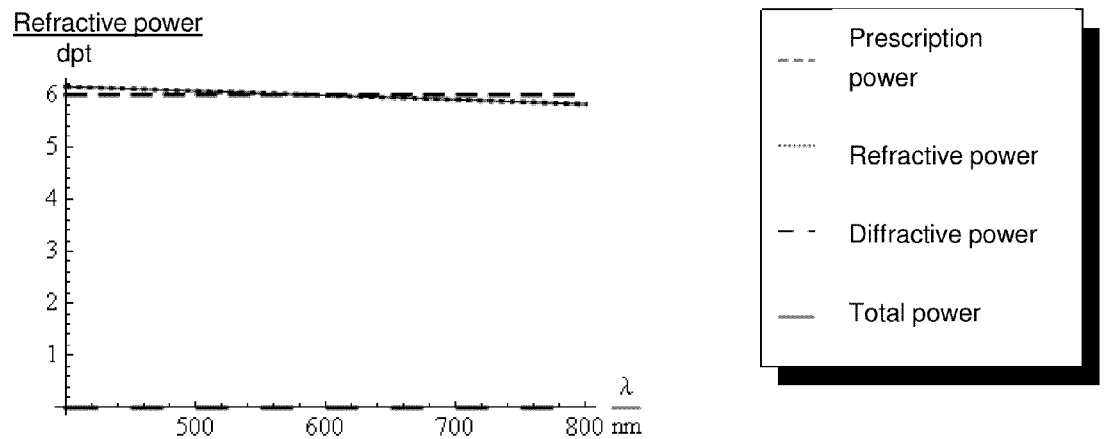
Figure 3B:
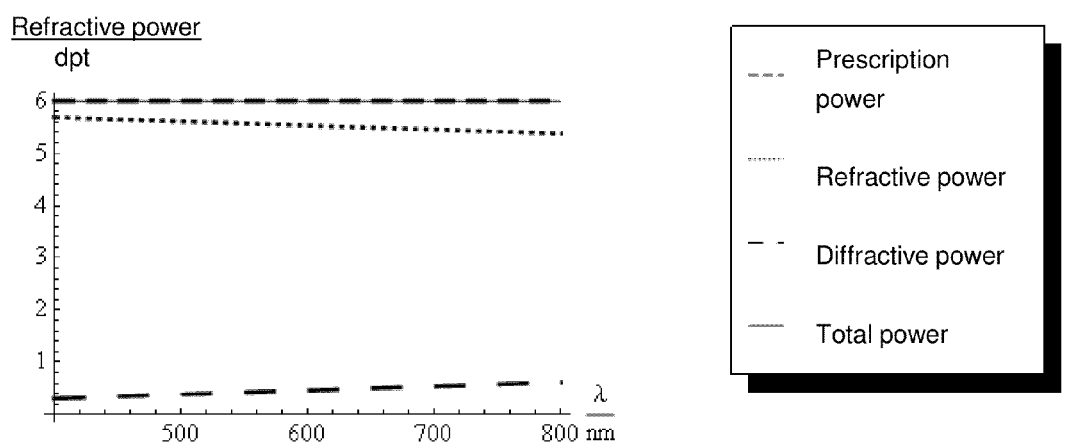
Figure 4A:
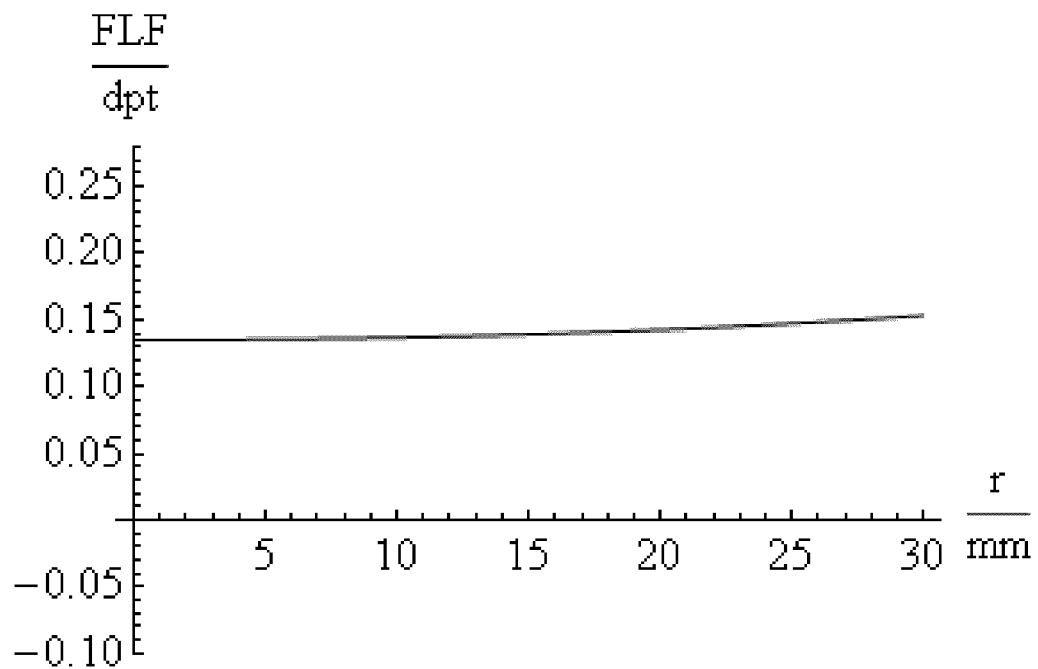
Figure 5A:
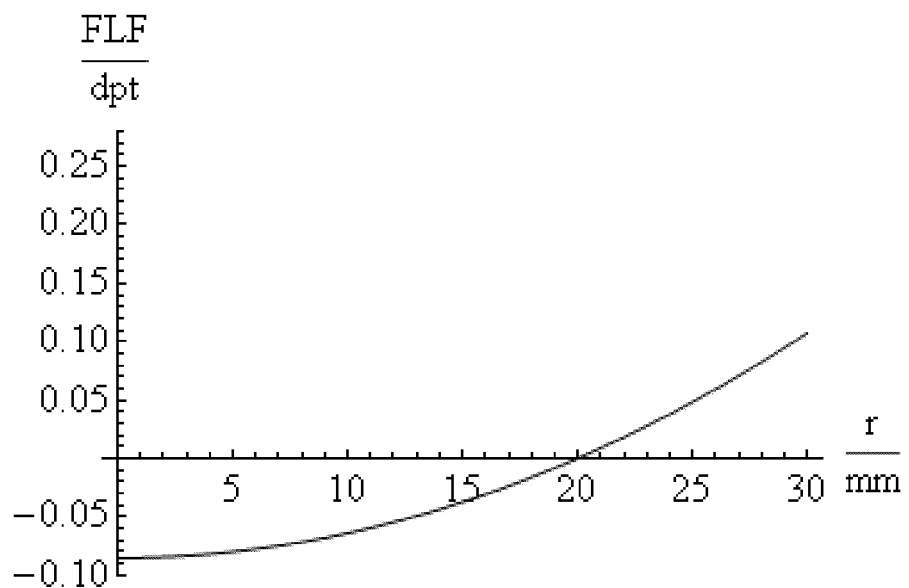
Figure 6A:
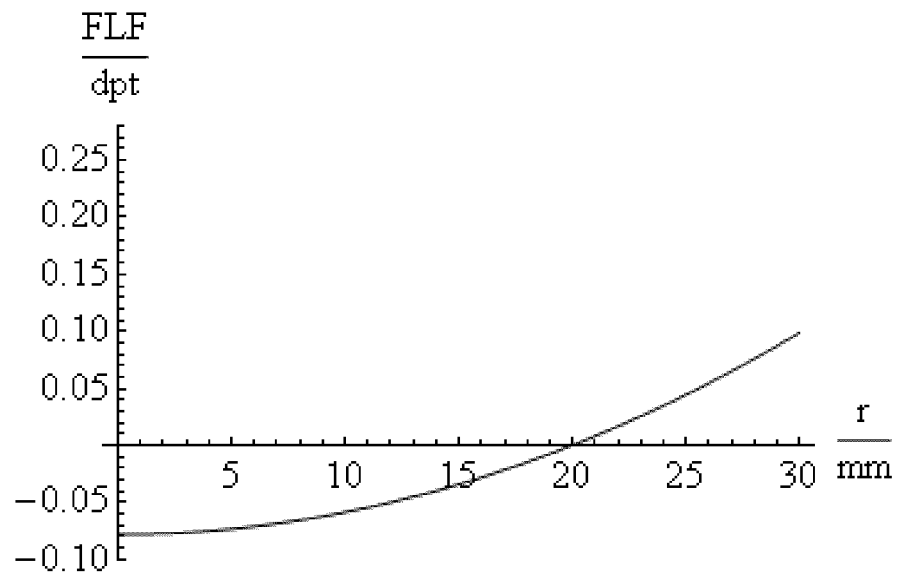
Figure 8A:
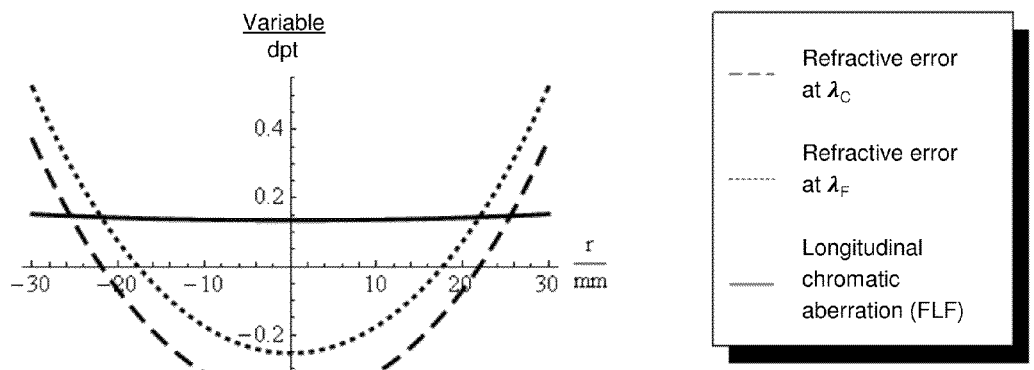
Figure 8B:
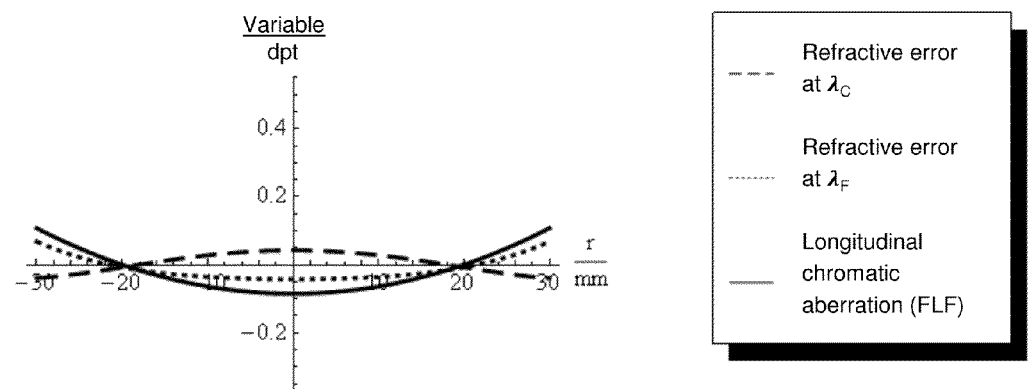
Figure 8C:
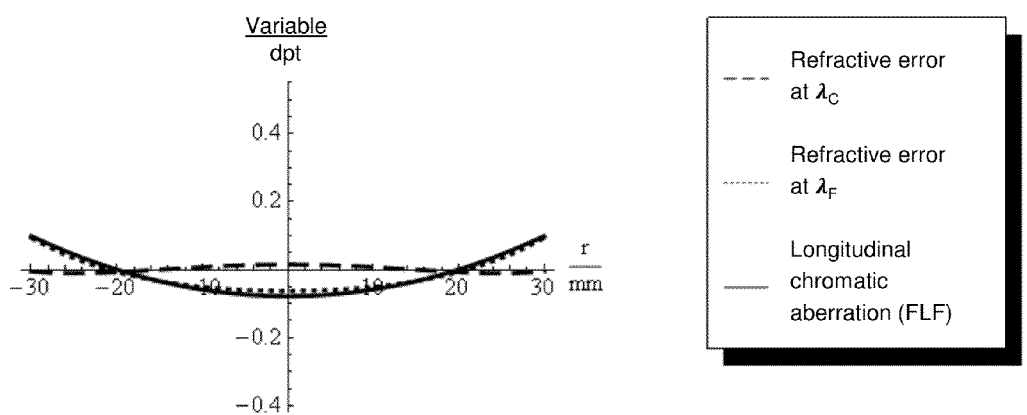
Figure 9A:
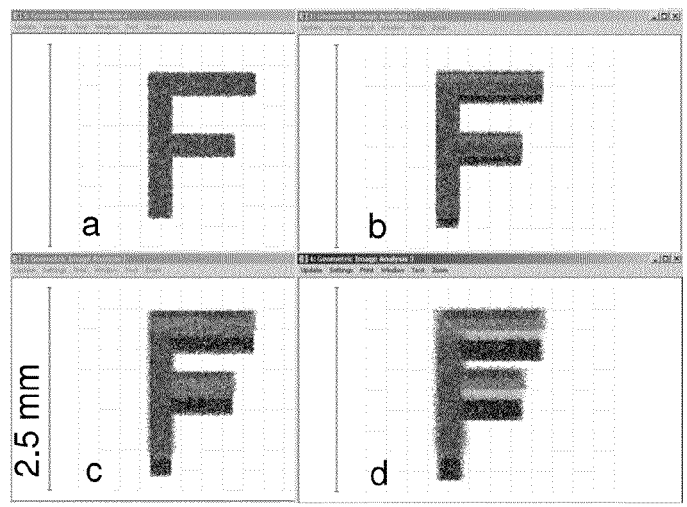
Figure 9B:
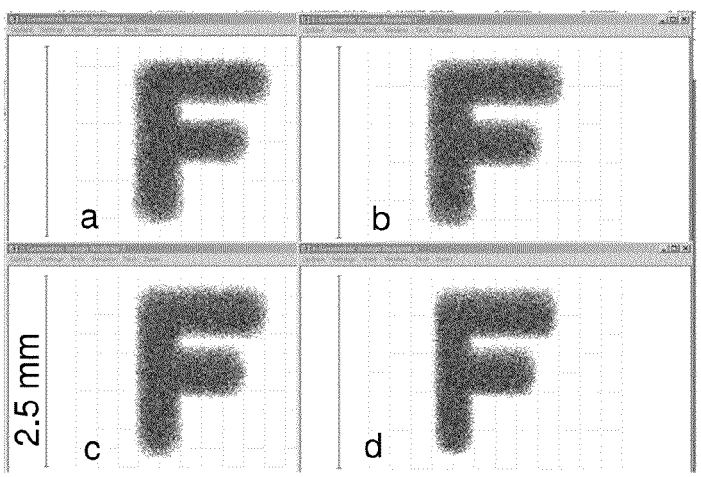
Figure 9C:
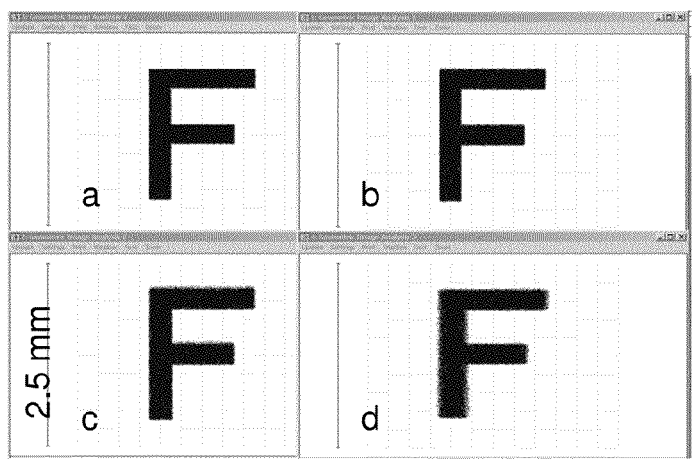
Figure 10A:
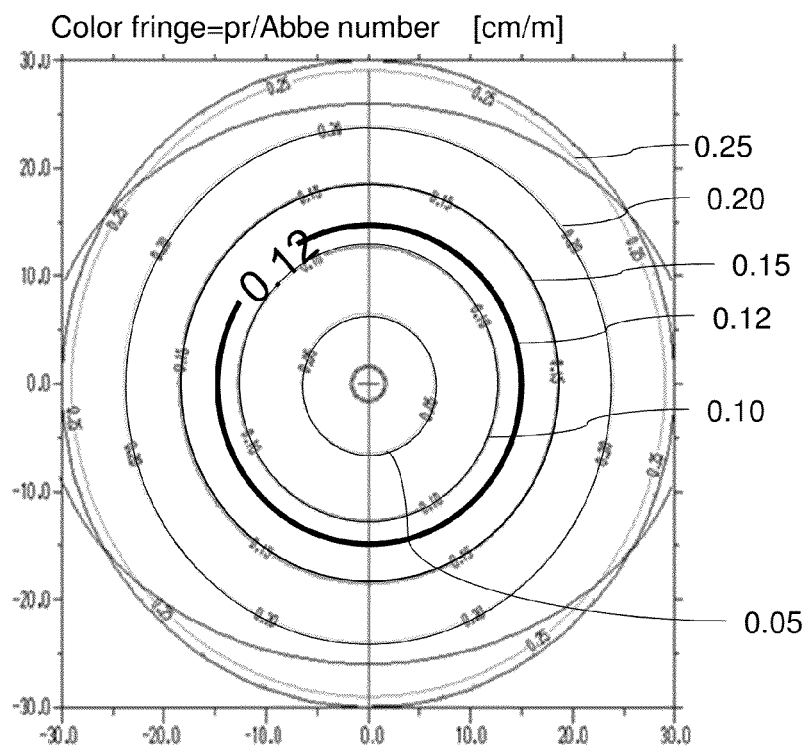
Figure 10B:
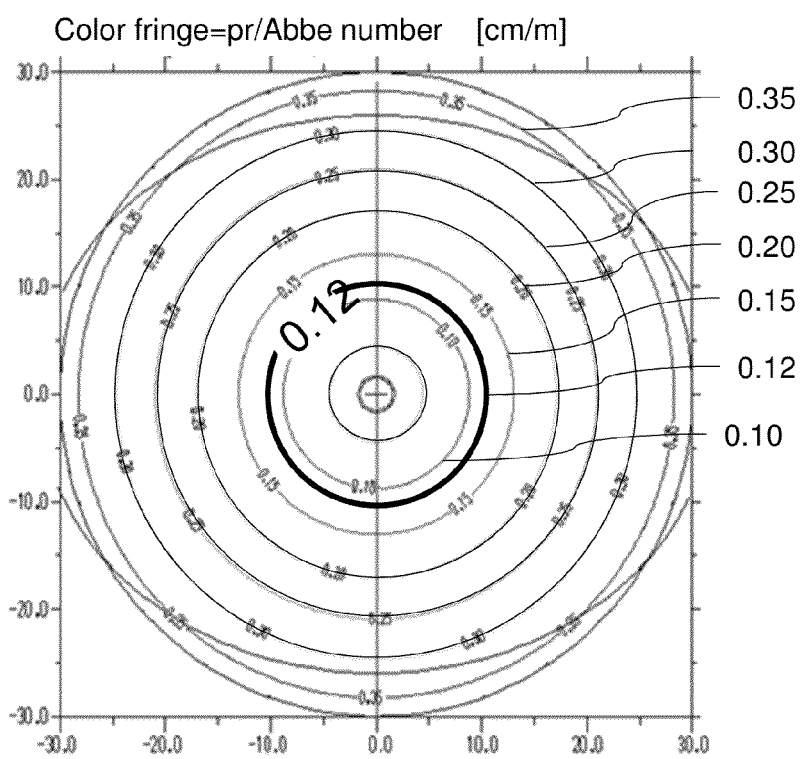
Figure 10C:
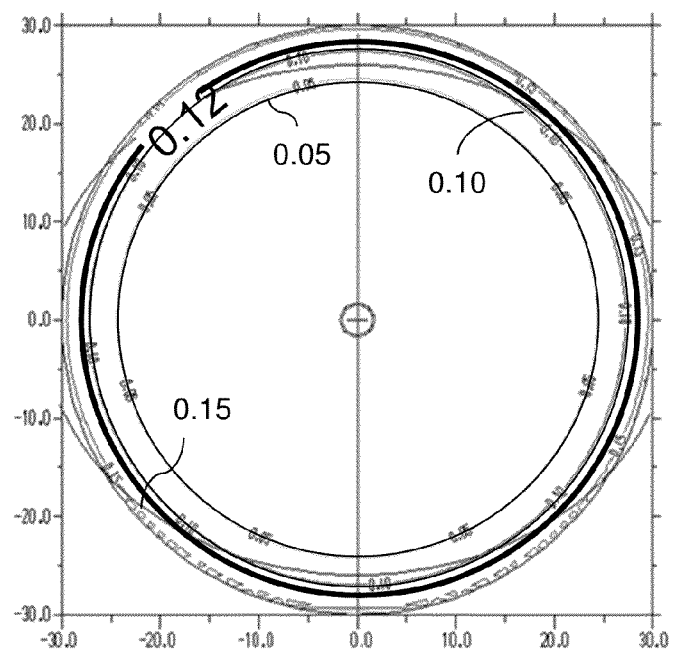
Figure 11A:
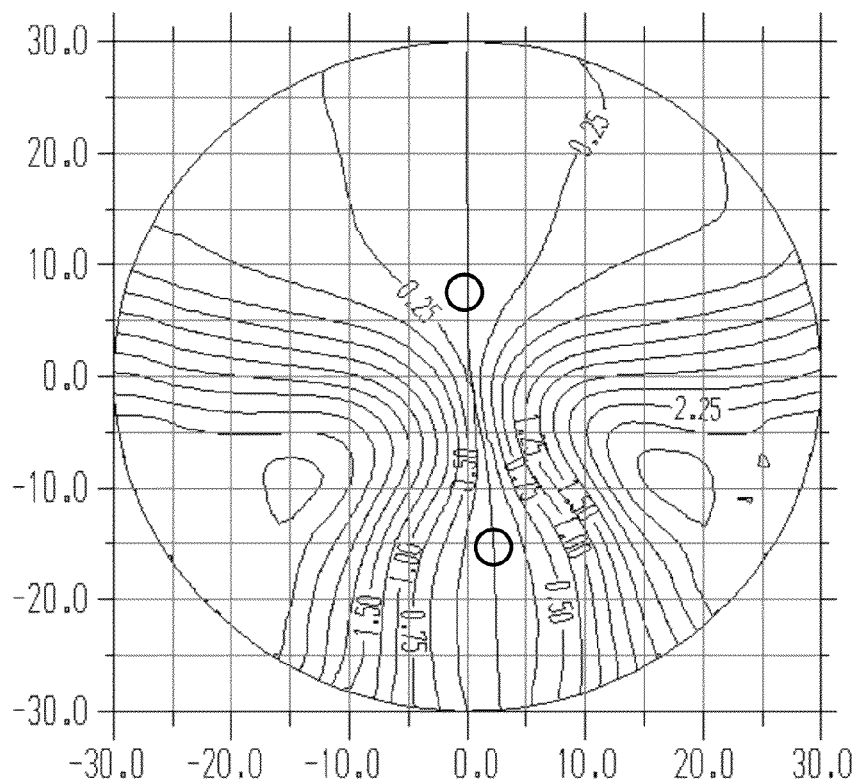
Figure 11B:
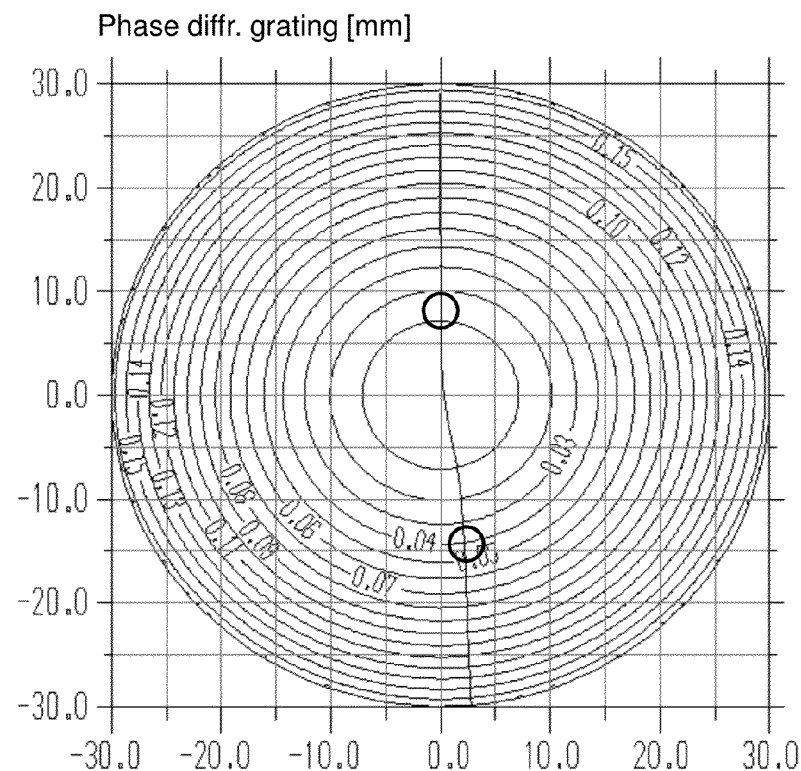
Figure 11C:
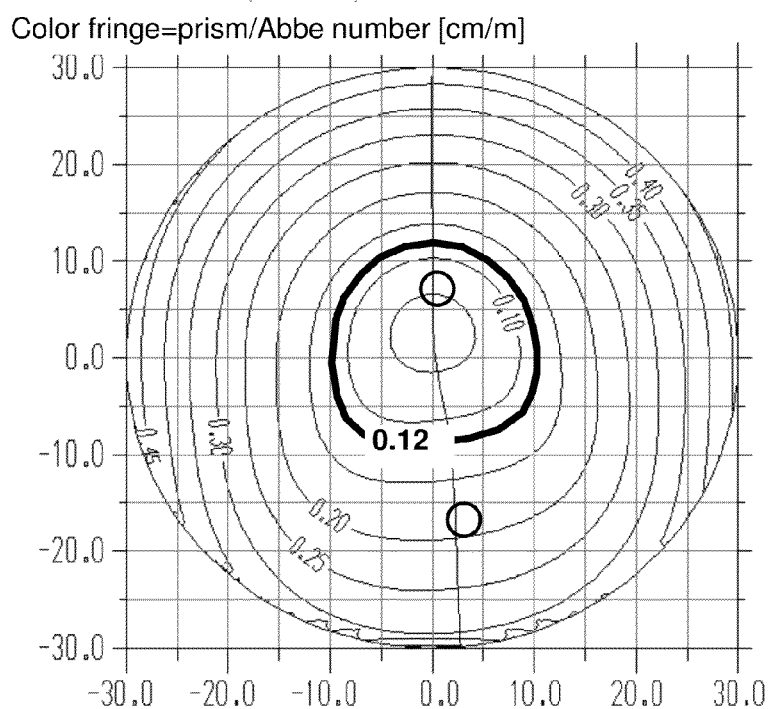
Figure 11D:
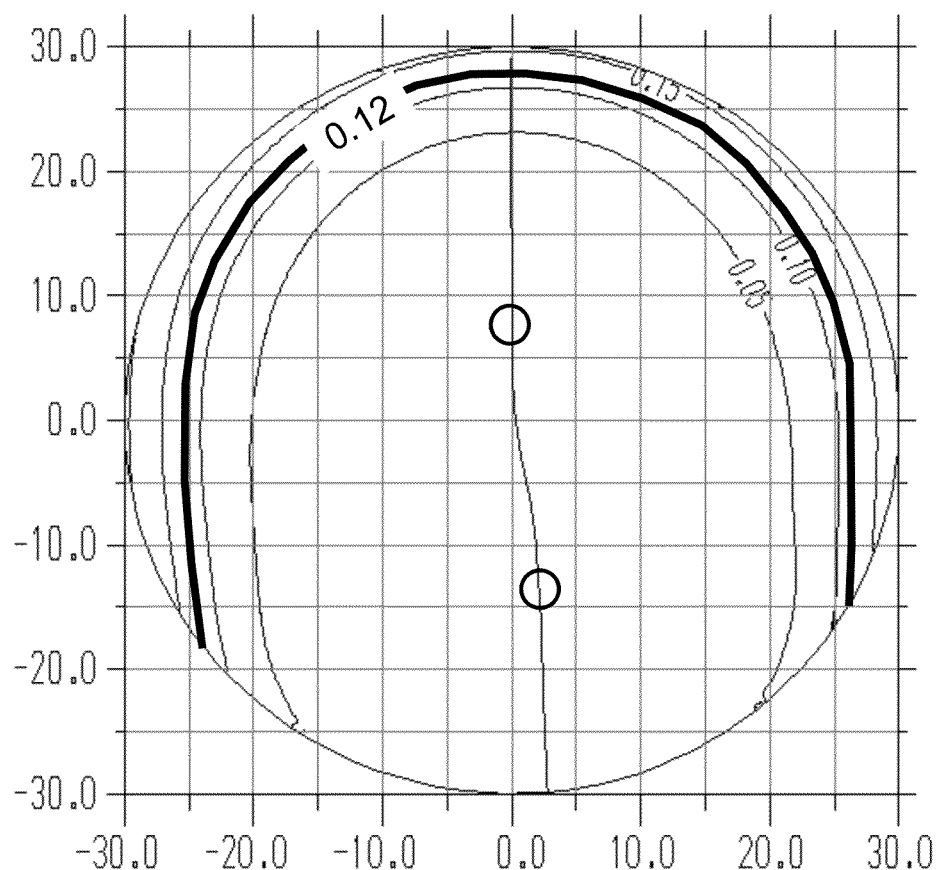
Figure 12:
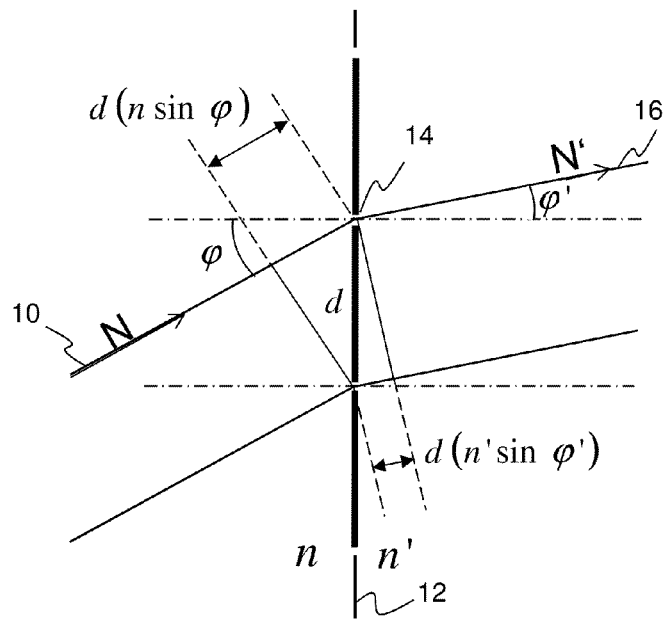
Figure 13:
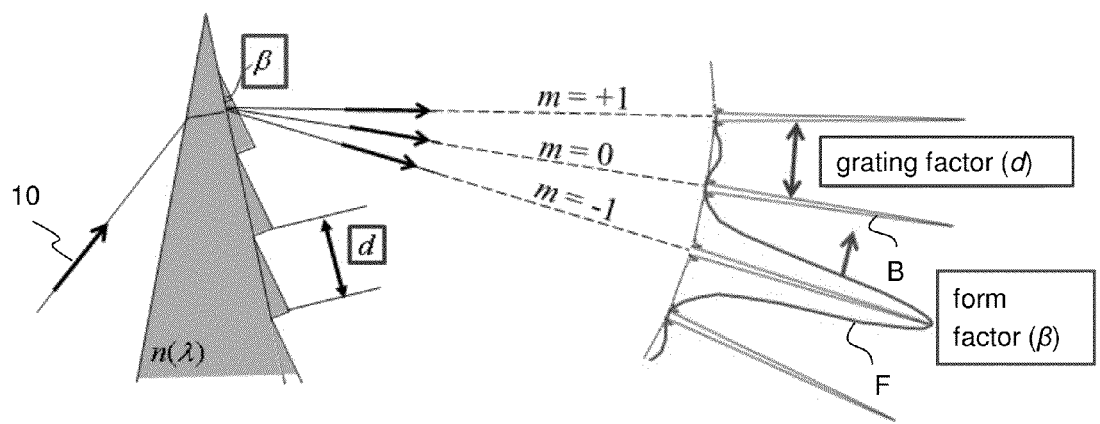
Figure 14:
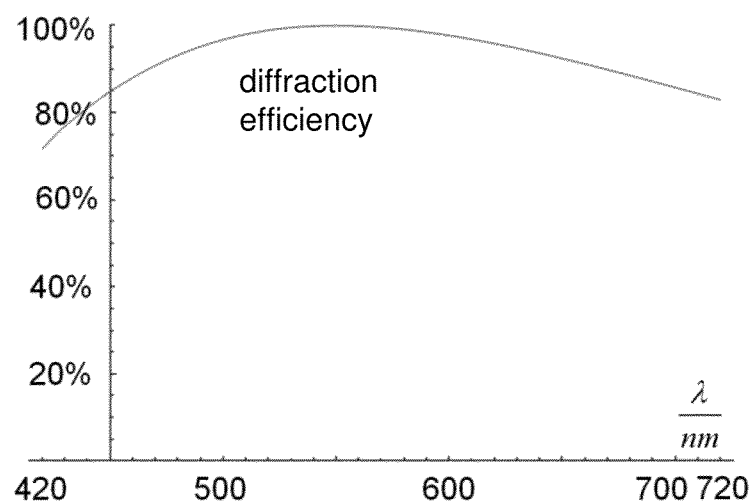
Figure 16:
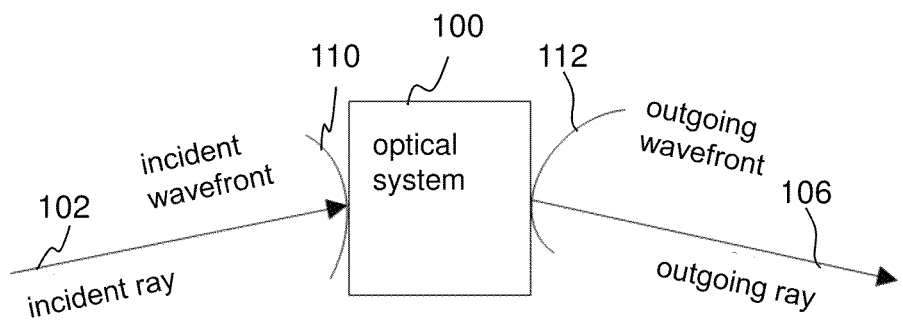
Figure 17:
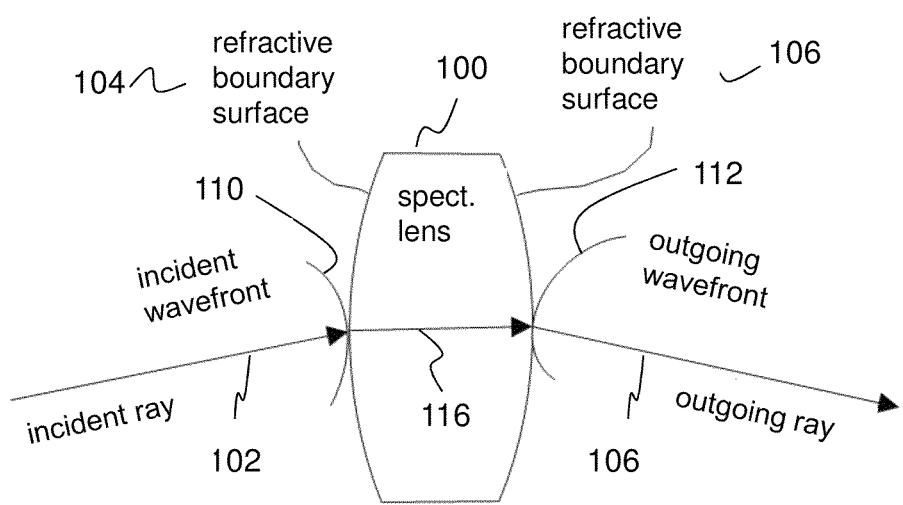
Figure 18A:
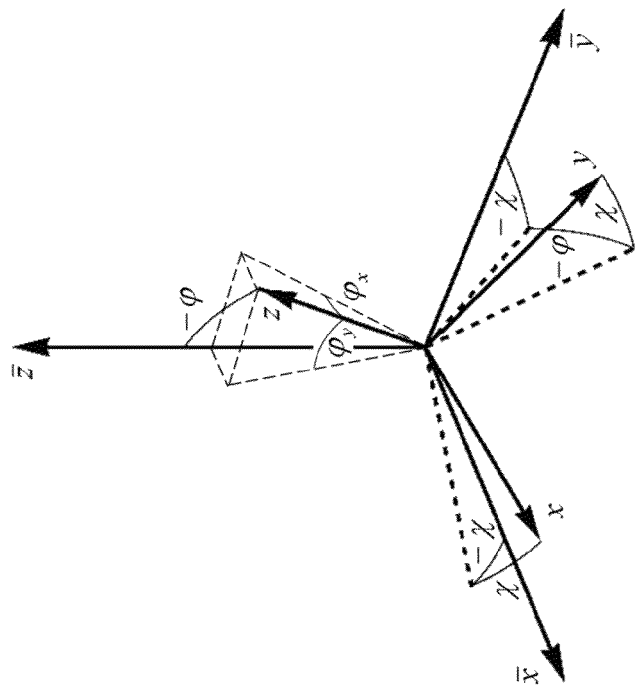
Figure 18:
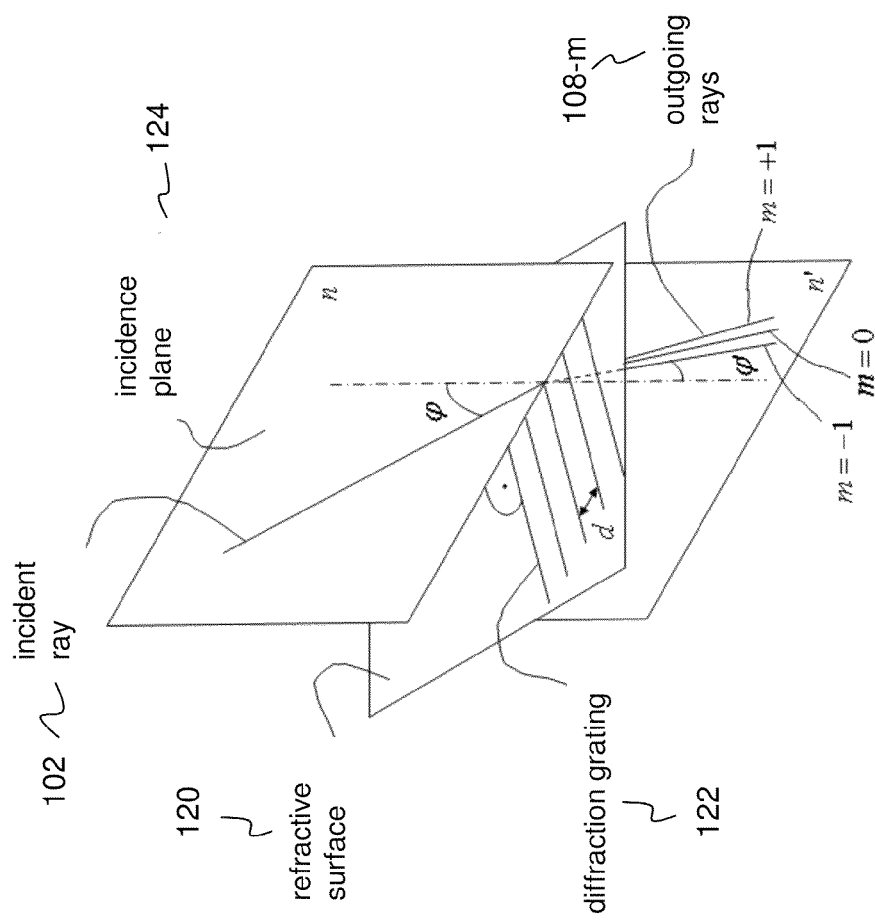
Figure 19:
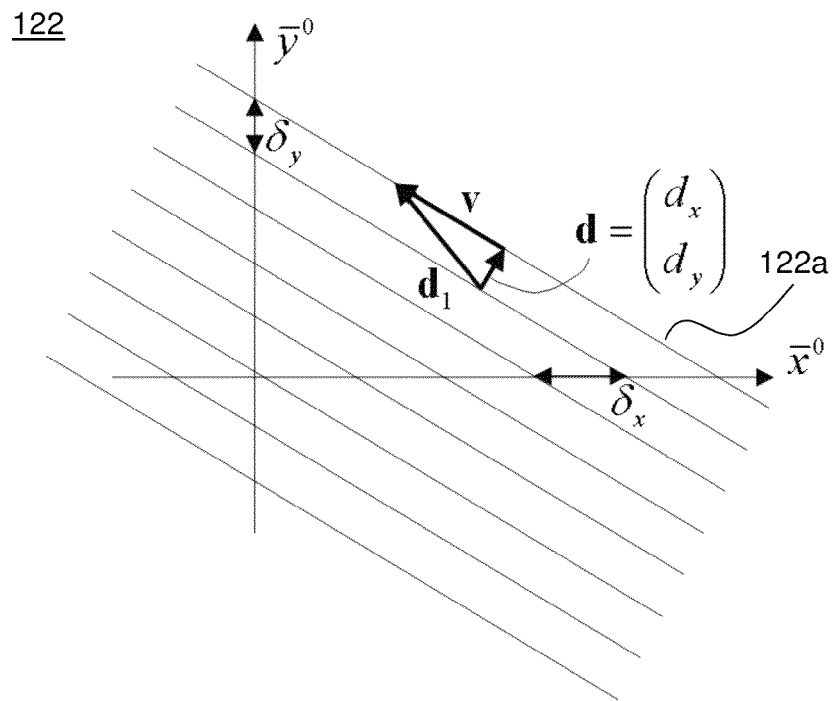
Figure 20:
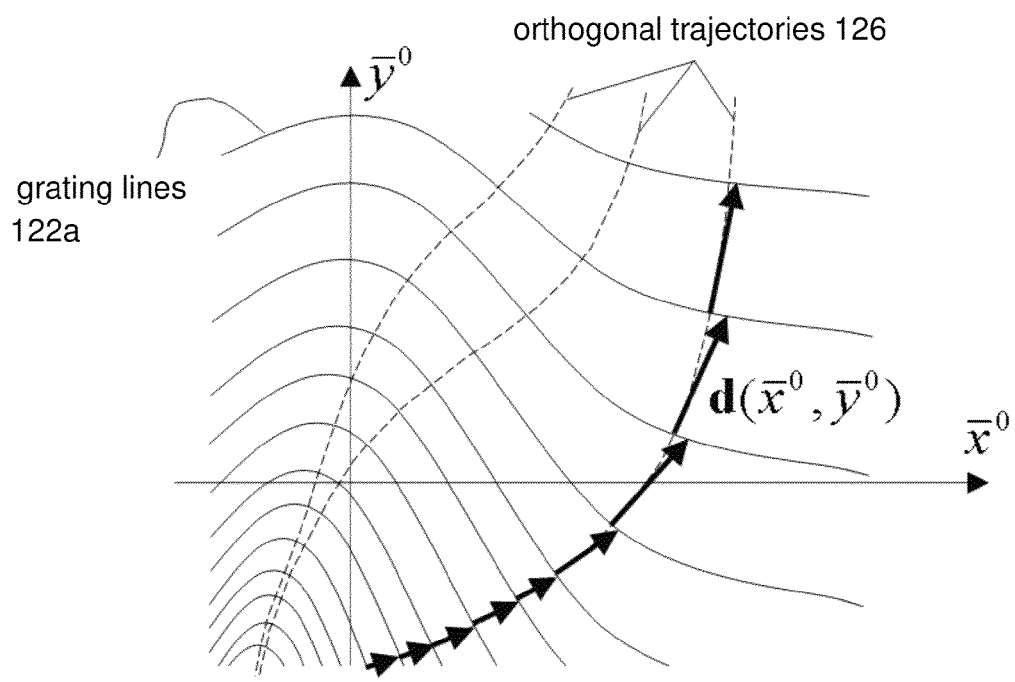
Figure 21:
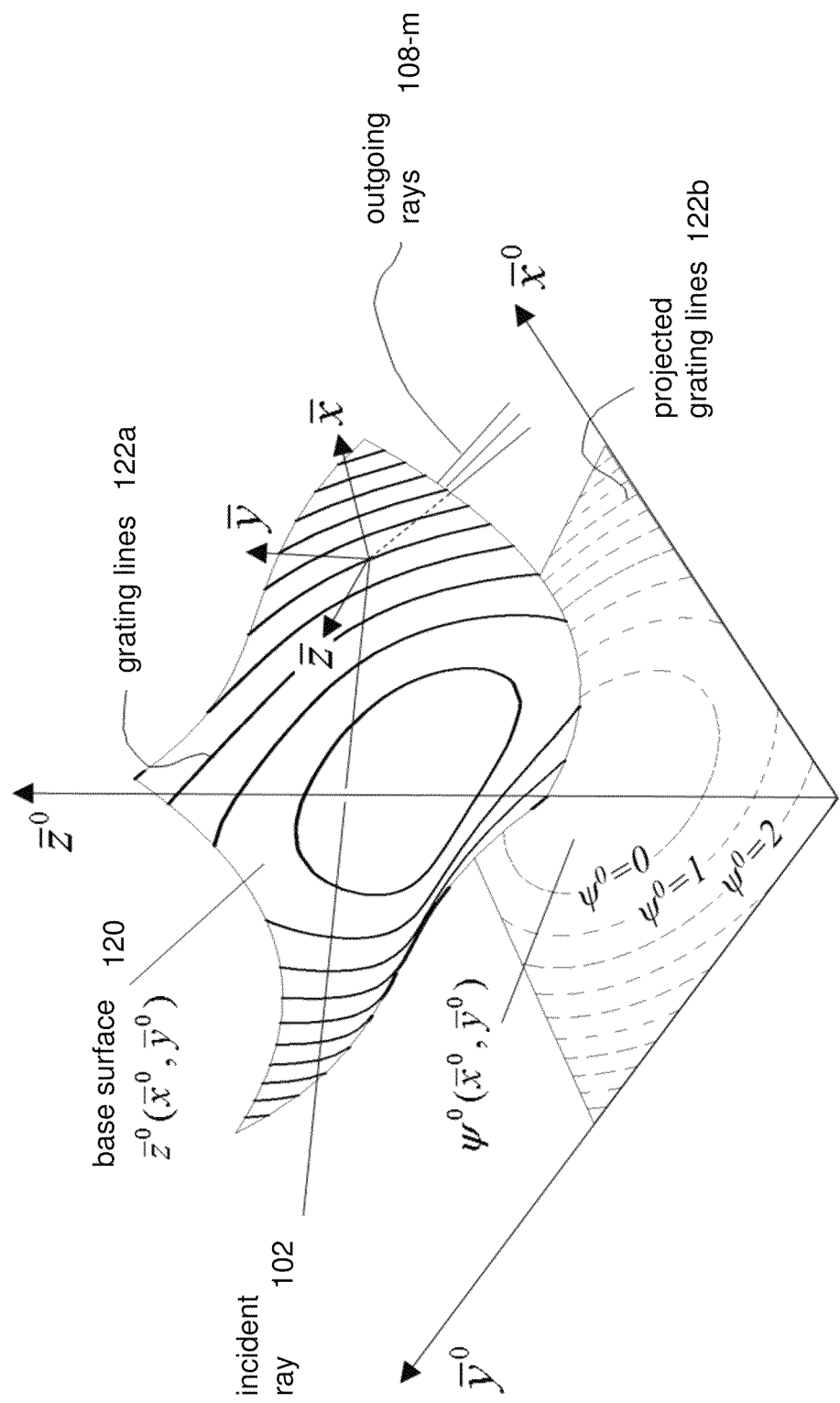
Figure 22:
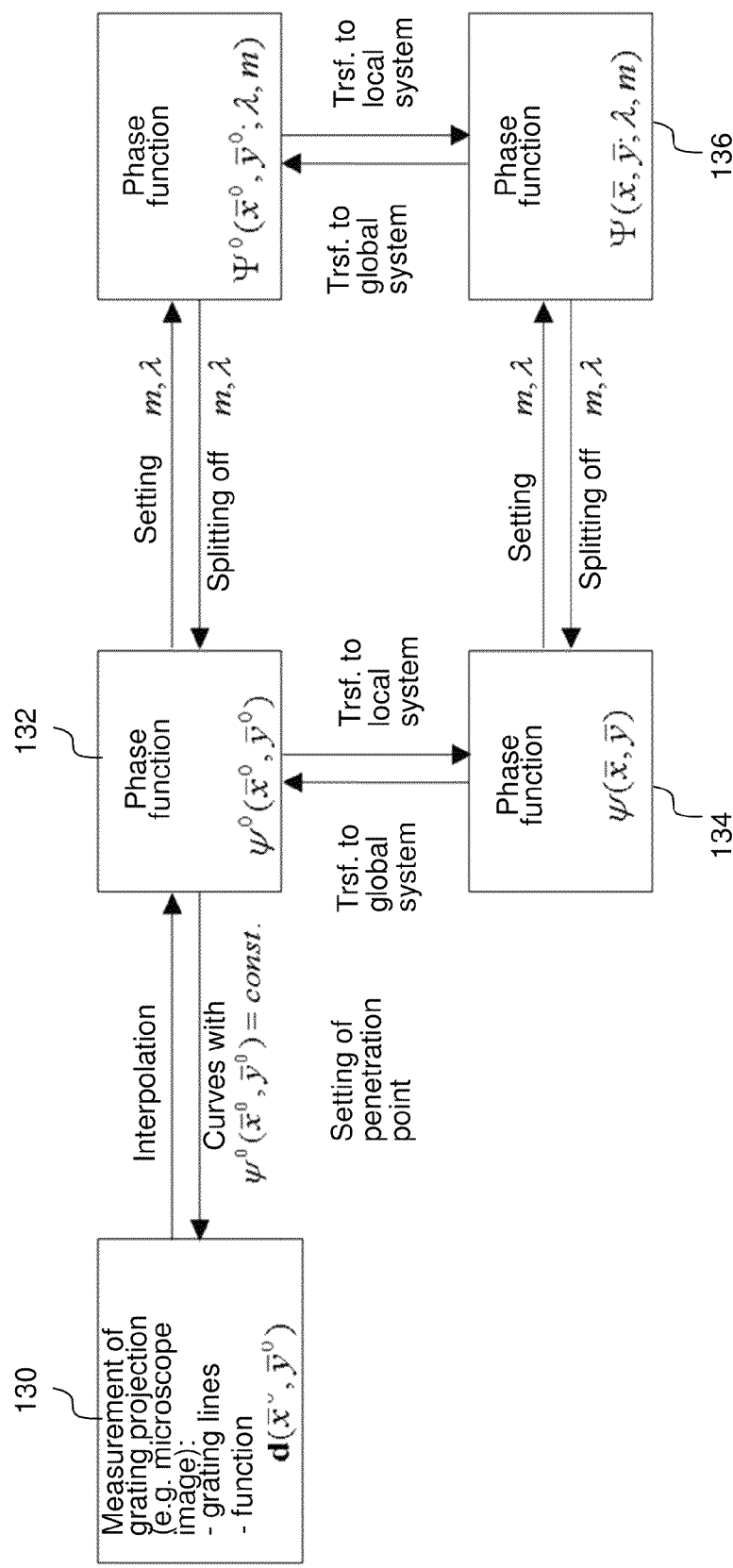

Preferred embodiments of the invention will be described by way of example in the following with reference to the figures, which show:

FIGS. 1A,B the longitudinal chromatic aberration (FIG. 1A) and the lateral chromatic aberration (FIG. 1B) of a lens according to first comparative example, which has been optimized according to a monochromatic target function;

FIGS. 2A,B the longitudinal chromatic aberration (FIG. 2A) and the lateral chromatic aberration (FIG. 2B) of lenses optimized according to a polychromatic target function of a first type (first example) and of a second type (second example), respectively;

FIGS. 3A,B the prescription power, the refractive power, the diffractive power, and the total power in the lens center as a function of the wavelength of the lens according to the first comparative example (FIG. 3A) and of the lenses according to the first and second examples (FIG. 3B);

FIGS. 4A,B the longitudinal chromatic aberration (FIG. 4A) and the lateral chromatic aberration (FIG. 4B) of a lens according to a second comparative example, which has been optimized according to a monochromatic target function;

FIGS. 5A,B the longitudinal chromatic aberration (FIG. 5A) and the lateral chromatic aberration (FIG. 5B) of a lens according to a third example, which has been optimized according to a polychromatic target function of a first type;

FIGS. 6A,B the longitudinal chromatic aberration (FIG. 6A) and the lateral chromatic aberration (FIG. 6B) of a lens according to a fourth example, which has been optimized according to a polychromatic target function of a second type;

FIGS. 7A-C the prescription power, the refractive power, the diffractive power, and the total power in the lens center as a function of the wavelength of the lens according to the second comparative example (FIG. 7A), of the lens according to the third example (FIG. 7B), and of the lens according to the fourth example (FIG. 7C);

FIGS. 8A-C the refractive error at the wavelength $\lambda_C$, the refractive error at the wavelength $\lambda_F$, and the longitudinal chromatic aberration in the lens according to the second comparative example (FIG. 8A), in the lens according to the third example (FIG. 8B), and in the lens according to the fourth example (FIG. 8C);

FIGS. 9A-C the color fringe of a spectacle lens for different viewing angles a) 0° b) 10° c) 20° d) 30°, wherein FIG. 9A shows a non-corrected image formation through a monochromatically optimized spectacle lens, FIG. 9B shows an image formation through a spectacle lens with corrected color fringe, without an aspherical follow-up optimization of the refractive surfaces, and FIG. 9C shows an image formation through a spectacle lens optimized by means of a simultaneous color fringe optimization and an aspherical follow-up optimization;

FIGS. 10A-C an exemplary color fringe correction of a non-corrected single-vision lens, wherein FIG. 10A shows the color fringe of a non-corrected single-vision lens with an Abbe number of 58.5, FIG. 10B shows the color fringe of a single-vision lens with an Abbe number of 40.5, and FIG. 10C shows the color fringe of a color fringe-corrected single-vision lens with an effective Abbe number of approximately 130;

FIGS. 11A-D an exemplary color fringe correction of a progressive spectacle lens, wherein FIG. 11A shows the astigmatism in the wearing position of the spectacle lens, FIG. 11B shows the diffractive phase or form of the grating lines of the diffraction grating, FIG. 11C shows the color fringe of the non-corrected spectacle lens, and FIG. 11D shows the color fringe of the corrected spectacle lens;

FIG. 12 the diffraction of a plane wavefront being incident onto a boundary surface with a periodic structure;

FIG. 13 the angular distribution of the intensity for a blazed grating applied to one of the surfaces of a prism;

FIG. 14 the diffraction efficiency as a function of the wavelength;

FIG. 15 the principle of color fringe correction by a diffraction grating;

FIG. 16 a schematic illustration of the ray path for ray tracing and wavefront tracing for an optical system;

FIG. 17 a schematic illustration of the ray path for ray tracing and wavefront tracing for a spectacle lens;

FIG. 18 the ray path in the case of a plane boundary surface with a diffraction grating;

FIG. 18A the mutual position of the coordinate system x, y, z of the incident wavefront with respect to the coordinate system of the base surface;

FIG. 19 the grating lines of a simple periodic diffraction grating on a plane boundary surface;

FIG. 20 the grating lines of a diffraction grating on a plane boundary surface;

FIG. 21 the grating lines of a diffraction grating on a curved boundary surface;

FIG. 22 a flow diagram illustrating the transition between the vector field) $d(\bar{x}^0, \bar{y}^0)$ and the phase function $\psi^0(\bar{x}^0, \bar{y}^0)$.

In the following example, the optical element will exemplarily be a spectacle lens. However, the optical element can also be an arbitrary image-forming optical system, such as a lens, a lens system, etc.

Different procedures for performing a preferred optimization method according to the invention exist.

Iterative Method

In this method, at least one of the refractive surfaces of the spectacle lens, which contribute to the refraction, and the at least one diffraction grating are successively optimized or modified.

In a first step, a monochromatic optimization of at least one of the surfaces (hereinafter referred to as lens surfaces), which contribute to the refraction, of a predetermined spectacle lens not having a diffraction grating is performed. In particular, at least one of the lens surfaces is modified and optimized until the refractive error and/or the astigmatic error is/are minimized. The monochromatic optimization is performed such that the refractive power in at least one reference point of the spectacle lens takes on the prescription value $S_{prescription}$ ($S_{ref,0}(\lambda_d)=S_{prescription}$). The prescription value is the value that is determined for a spectacles wearer e.g. by refraction determination and that is required for correcting a visual defect of the spectacles wearer. The reference point can be the distance reference point, the centration or fitting point, the optical or geometric center of the spectacle lens, or any other suitable point on the spectacle lens. The monochromatic optimization can be performed for an arbitrary, suitable wavelength; preferably, the monochromatic optimization is performed for the wavelength $\lambda_d$, which is also taken into account in the definition of the Abbe number. The spectacle lens is preferably optimized in the wearing position. Methods for the monochromatic optimization of spectacle lenses are known from the prior art (e.g. WO 2008/089999 A1).

In a third step, a diffraction grating is added with lens surfaces being maintained. The diffraction grating is determined or calculated so as to optimally correct the color fringe of the spectacle lens optimized in the preceding step. However, by adding the diffraction grating, a refractive error is introduced.

In a fourth step, with the grating being maintained, at least one of the lens surfaces contributing to the refraction can be optimized again until the refractive error, which has been introduced by the grating, is compensated for. In a next step, the grating is adjusted in order to compensate for the color fringe that formed due to the surface modification in the fourth step.

Since for ordinary Abbe numbers the refractive power of a grating, which is to compensate for the color fringe of a spectacle lens, is in the order of 5% to 10% of the refractive power of the spectacle lens, the modifications in the iterative method become increasingly less, so that the method generally converges and can be discontinued after a suitably selected step.

In this method, both the color fringe and the refractive error take on their conceivable minima only approximately, since the method is discontinued after a finite number of steps.

Provision of Refractive Power

As explained above, a diffraction grating also exhibits refractive power. The actual refractive power of a spectacle lens having a diffraction grating can be represented as the sum of the refractive power of the spectacle lens formed by purely refractive surfaces and of the refractive power of the diffraction grating. In particular, the actual refractive power $S_0(\lambda_d)$ of a color fringe-corrected lens with a refractive power $S_{ref,0}(\lambda_d)$ is determined by $$S_0(\lambda_d) = S_{ref,0}(\lambda_d)\left(1 - \frac{1}{v_d} \cdot \frac{\lambda_d}{\lambda_F - \lambda_C}\right), \tag{1}$$

where $v_d=(n_d-1)/(n_F-n_C)$ is the (alternative) Abbe number of the optical material of the spectacle lens, and $n_d$, $n_F$ and $n_C$ are the refractive indices of the optical material at the wavelengths $\lambda_d$, $\lambda_F$, and $\lambda_C$. Preferably, $\lambda_d$=587.562 nm, $\lambda_F$=486.134 nm, and $\lambda_C$=656.281 nm.

Instead of optimizing at least one of the lens surfaces in an iterative process such that the refractive power of the spectacle lens in at least one reference point takes on the prescription value $S_{prescription}$ ($S_{ref,0}(\lambda_d)=S_{prescription}$), the modification of the refractive power can be provided by a predetermined diffraction grating. This means that the optimization of the at least one lens surface in a first step is categorically organized such that the later total refractive power of the spectacle lens with the grating in at least one reference point takes on the prescription value, so that $S_0(\lambda_d)=S_{prescription}$ is satisfied. Consequently, the refractive, monochromatic optimization of the lens surfaces is performed such that for the refractive power of the spectacle lens in the predetermined reference point the condition $$S_{ref,0}(\lambda_d) = \frac{S_{prescription}}{\left(1 - \frac{1}{v_d} \cdot \frac{\lambda_d}{\lambda_F - \lambda_C}\right)} \tag{2}$$

is satisfied.

In a second step, a diffraction grating is calculated and introduced such that it compensates for the color fringe of the spectacle lens of the first step. The thus added refractive error of the spectacle lens is exactly such that the total refractive power of the lens is $S_0(\lambda_d)=S_{prescription}$.

The method has the advantage that the color fringe is always optimally compensated for (within the possibilities of the grating). The refractive error, however, is only corrected approximately, since after introducing the diffraction grating, the lens surfaces of the spectacle lens cannot again be optimized in the wearing position.

Provision of Diffractive Power

Instead of determining the required grating at a later point by means of provision of the refractive power in the above-described method, the grating can categorically, i.e. right in a first step, be determined as the grating to compensate for the color fringe of a lens with refractive power $S_{ref,0}(\lambda_d)$ (cf. equation (2)). In a second step, the refractive error of the spectacle lens is optimized, wherein with the grating being maintained, an optimization of at least one of the refractive lens surfaces is performed. Preferably, the optimization of at least one of the refractive lens surfaces is performed taking the wavefront tracing with the presence of a diffraction grating into consideration.

The method according to the third example has the advantage that the refractive error is minimized in the wearing position in the best possible way, since the wavefront optimization in the wearing position is the last step to be performed. In this step, all other variables, such as the grating, are already known. A disadvantage might be that the color fringe might not be compensated for in the best possible way, since the grating is determined generally and not depending on the current surfaces in advance.

Simultaneous Optimization of Surfaces and Grating

With regard to a simultaneous optimization of the refractive portions and the diffractive portions of a lens, a preferred embodiment suggests minimizing both the refractive aberrations and the chromatic aberrations or the color fringe by minimizing a target function.

It is known from WO 2008/089999 A1 to perform a monochromatic optimization of a spectacle lens by minimizing the following monochromatic target function:

$$F_{monochrom} = \sum_i g_Z(i)(Z_\Delta(i) - Z_{\Delta,target}(i))^2 + g_S(i)(S_\Delta(i) - S_{\Delta,target}(i))^2, \quad (3)$$

where $S_\Delta$ and $Z_\Delta$ are the refractive error of the spherical equivalent or the amount of the astigmatic deviation, $S_{\Delta,target}$, $Z_{\Delta,target}$ the corresponding target values, and $g_Z(i)$ and $g_S(i)$ the respective weightings.

The image formation properties are evaluated at a predetermined wavelength. The sum over the index i goes over different evaluation points of the spectacle lens. A degree of freedom in the minimization of the target function in equation (3) is usually a vertex depth of at least one refractive surface, which is described by a function z(x,y). The degree of freedom in the optimization can e.g. be the vertex depth $z_1(x, y)$ of the front surface or the vertex depth $z_2(x, y)$ of the back surface of a spectacle lens. It is also possible that both the vertex depth of the front surface and that of the back surface are degrees of freedom in the optimization, as may be the case in a double progressive spectacle lens. The monochromatic target function can be a monocular or a binocular target function. A monochromatic binocular target function is described e.g. in WO 2008 089999 A1 or in the article of W. Becken, et al. "Brillengläser im Sport: Optimierung der Abbildungseigenschaften unter physiologischen Aspekten", Z. Med. Phys., 17 (2007), pages 56-66. Reference is made to these documents with respect to the technical terms used, and in particular the symbols used in equation (3), as well as to the connection of sphere, cylinder, axis (SZA, values) with wavefront properties. Thus, the corresponding explanations constitute an integral part of the disclosure of the present application.

According to one embodiment of the invention, it is suggest that the monochromatic target function be expanded to take the wavelength dependency of the lens with a grating into consideration. In particular, the following three types of target functions are suggested:

$$\text{Type 1) } F_1 = \sum_\lambda F_{monochrom}(\lambda) \quad (4)$$

$$\text{Type 2) } F_2 = F_{monochrom}(\lambda_0) + \sum_i g_{FLF}(i) \times f(S_{SK}(i, \lambda_2) - S_{SK}(i, \lambda_1))^2 \quad (5)$$

$$\text{Type 3) } F_3 = F_{monochrom}(\lambda_0) + \sum_i g_{FQF}(i) \times g(\Delta\varphi_{SK}(i, \lambda_2, \lambda_1))^2 \quad (6)$$

An example of a target function of type 1 is the target function $$F_1 = \sum_{i,\lambda} g_Z(i, \lambda)(Z_\Delta(i, \lambda) - Z_{\Delta,target}(i, \lambda))^2 + g_S(i, \lambda)(S_\Delta(i, \lambda) - S_{\Delta,target}(i, \lambda))^2. \quad (4a)$$

An example of a target function of type 2 is the target function $$F_2 = \sum_i (g_Z(i)(Z_\Delta(i, \lambda_0) - Z_{\Delta,target}(i, \lambda_0))^2 + g_S(i)(S_\Delta(i, \lambda_0) - S_{\Delta,target}(i, \lambda_0))^2 + g_{FLF}(i) \times f(S_{SK}(i, \lambda_2) - S_{SK}(i, \lambda_1))^2). \quad (5a)$$

An example of a target function of type 3 is the target function $$F_3 = \sum_i (g_Z(i)(Z_\Delta(i, \lambda_0) - Z_{\Delta,target}(i, \lambda_0))^2 + g_S(i)(S_\Delta(i, \lambda_0) - S_{\Delta,target}(i, \lambda_0))^2 + g_{FQF}(i) \times g(\Delta\varphi_{SK}(i, \lambda_2, \lambda_1))^2). \quad (6a)$$

In the above equations (4a) to (6a):

$Z_\Delta(i,\lambda)$ is the actual value of the astigmatic error or the amount of the astigmatic deviation at the $i^{th}$ evaluation point of the spectacle lens for the wavelength $\lambda$;

$Z_{\Delta,target}(i, \lambda)$ is the target value of the astigmatic error or the amount of the astigmatic deviation at the $i^{th}$ evaluation point of the spectacle lens for the wavelength $\lambda$;

$S_\Delta(i,\lambda)$ is the actual value of the refractive error or the deviation of the spherical equivalent at the $i^{th}$ evaluation point of the spectacle lens for the wavelength $\lambda$;

$S_{\Delta,target}(i,\lambda)$ is the target value of the refractive error or the deviation of the spherical equivalent at the $i^{th}$ evaluation point of the spectacle lens for the wavelength $\lambda$;

$g_Z(i,\lambda)$ is the weighting of the astigmatic error/of the amount of the astigmatic deviation at the $i^{th}$ evaluation point of the spectacle lens for the wavelength $\lambda$;

$g_S(i,\lambda)$ is the weighting of the refractive error or the deviation of the spherical equivalent at the $i^{th}$ evaluation point of the spectacle lens for the wavelength $\lambda$;

$g_{FLF}(i)$ is the weighting of the longitudinal chromatic aberration at the $i^{th}$ evaluation point of the spectacle lens;

$g_{FQF}(i)$ is the weighting of the lateral chromatic aberration at the $i^{th}$ evaluation point of the spectacle lens;

$S_{SK}(i,\lambda_1)$ is the vergence matrix of the wavefront at the vertex sphere for the wavelength and for the $i^{th}$ evaluation point;

$S_{SK}(i,\lambda_2)$ is the vergence matrix of the wavefront at the vertex sphere for the wavelength and for the $i^{th}$ evaluation point; and $\Delta\varphi_{SK}(i,\lambda_2,\lambda_1)$ is the angle between the object-side main rays for two different wavelengths $\lambda_1$ and $\lambda_2$.

In the target function of type 1, the common monochromatic target function is understood to be a function of the wavelength, i.e. $F_{monochrom} = F_{monochrom}(\lambda)$. Subsequently, this target function is repeatedly evaluated for several wavelengths and summed via a predetermined set of wavelengths. The set of wavelengths comprises at least two wavelengths, e.g. $\lambda_1 = \lambda_F = 486,134$ nm and $\lambda_2 = \lambda_C = 656,281$ nm. In addition to the index i, the sum also goes over the wavelength $\lambda$ correspondingly.

The target function of type 2 is particularly obtained since a common monochromatic target function is evaluated at an operating wavelength $\lambda_0$ and since another term is added to this function, which depends on the difference $S_{SK}(i,\lambda_2) - S_{SK}(i,\lambda_1)$ of the vergence matrices $S_{SK}$ for two different wavelengths $\lambda_1$, $\lambda_2$. The type of dependence $f(S_{SK}(i,\lambda_2) - S_{SK}(i,\lambda_1))$ can be selected differently. In particular, $f(S_{SK}(i,\lambda_2) - S_{SK}(i,\lambda_1))$ can be the dioptric distance between the vergence matrices or the difference of the spherical equivalents. In the latter case, the term $f(S_{SK}(i,\lambda_2)-S_{SK}(i,\lambda_1))$ represents a penalty term for the longitudinal chromatic aberration.

The target function of type 3 is obtained by analogy with the target function of type 2, with the difference that the additional term $g(\Delta\phi_{SK}(i,\lambda_2,\lambda_1))$ is a penalty term for the lateral chromatic aberration determined by the angle $\Delta\phi_{SK}(i,\lambda_2,\lambda_1)$ between the object-side main rays at the $i^{th}$ evaluation point. Here, g is a suitable function, e.g. the identity, a trigonometric function, or any other function.

Irrespective of the type of target function (target function of type 1, type 2, or type 3), a function describing the diffraction grating is a degree of freedom of the optimization. In addition, the vertex depth z(x,y) of at least one of the surfaces of the spectacle lens is a degree of freedom in the optimization. The vertex depth can be described parametrically. A suitable representation of the vertex depth is a polynomial representation or a representation by means of splines, for example.

Preferably, the function describing the diffraction grating is a phase function $\Psi(x, y)$. The phase function $\Psi(x, y)$ represents the optical path length difference (optical path difference or OPD), which is introduced by the diffraction grating, as a function of the coordinates x, y of a suitably selected coordinate system. Preferably, the phase function $\Psi(\bar{x},\bar{y})$ is plotted in a local coordinate system $(\bar{x}, \bar{y}, \bar{z})$, where $\bar{x}, \bar{y}$ are the coordinates tangentially to the refracting surface. The description of a diffraction grating by a phase function will be described in detail in the following.

The phase function can preferably be described parametrically, with the number of parameters being equal to the number of degrees of freedom of the phase function. Such a description is particularly suitable in the case that the phase function is to have certain symmetries. Generally, the phase function can be described by splines, like a free-form surface, wherein in the optimization, optionally up to several thousands of spline coefficients are available for variation then.

The calculation of the wearing properties in equations (4) to (6) is performed in the presence of the diffraction grating, described by the current phase function $\Psi(x, y)$. The refractive index relevant for the calculations is determined by its value $n(\lambda)$ at the respective wavelength $\lambda$. The determined grating can generally be asymmetric, since the function $\Psi(x, y)$ is freely optimized and does not or does not have to include any symmetries a priori.

Instead of only one or two refractive surfaces, a higher number of refractive surfaces can be taken into consideration in the equations (4) to (6). For example, several refractive surfaces are present with compound systems. In equations (4) to (6), a higher number (two or more) of gratings can be taken into consideration as well. The several gratings can each be arranged on the boundary surfaces of a compound system, for example.

The target function can also comprise terms that depend on the higher-order aberrations, such a coma, trefoil, spherical aberration. Moreover, instead of the monocular target function in equation (3), a binocular target function can be used as well. A monochromatic binocular target function is described e.g. in WO 2008/089999 A1 or in the publications of W. Becken, et al. "Brillengläser im Sport: Optimierung der Abbildungseigenschaften unter physiologischen Aspekten", Z. Med. Phys., 17 (2007), pages 56-66.

By introducing a target function in the method for optimizing a spectacle lens with at least one diffraction grating, the problem of meeting the refraction requirements on the spectacle lens and achieving the reduction of chromatic aberrations in the best possible way can be solved to a large extent. In particular, by means of the target function, a compromise between all requirements for a plurality of viewing directions can be sought. The target function can be based on common monochromatic target functions of the prior art; wherein according to a preferred example, it is suggested that additional terms be introduced, which directly include the lateral chromatic aberrations (type 3) and/or directly the longitudinal chromatic aberrations (type 2). Alternatively, the chromatic aberrations can be corrected indirectly by evaluating a monochromatic target function for several different wavelengths and summing it over all wavelengths (type 1). In order to meet the increasing requirements, it is suggested that additional degrees of freedom (parameters) be introduced and varied, namely the degrees of freedom of at least one diffraction grating, which is preferably taken into account in the target function via a modified wavefront tracing.

It depends on the performance of the optimization steps how well the quality of the above-described iterative method, of the method including provision of refractive power, and of the method including provision of diffractive power comes near the quality of the method including a simultaneous optimization of the lens surfaces and of the grating by means of a target function. For example, if also a target function of type 1 is used in the iterative method, the quality of the iterative method including a sequential optimization of the lens surfaces and of the grating can come close to the quality of the method including a simultaneous optimization of the lens surfaces and of the grating by means of a target function, depending on the length of the iteration. An advantage of the iterative method including a sequential optimization of the lens surfaces and of the grating can be that also simpler target functions of the prior art can be used, as long as the wearing position optimization of the surface is performed in the last step. Moreover, if a complete compensation of the color fringe is not intended, but a certain residual color fringe error is admissible, then a relatively general selection of the grating will usually be sufficient, so that it does not have to be determined by optimization or by a target function. The same applies to the method including provision of diffractive power, since also in this case the last step is the wearing position optimization of the surface.

In contrast, the method including provision of refractive power is mainly suitable for the optimization of single-vision lenses with gratings, since due to the grating being added at a later point, the ray path changes such that the lens in the wearing position does generally not meet the vision needs fully any more. However, in single-vision lenses, existing symmetries can be advantageously used such that due to the provision of right power in the optical center, sufficient quality can also be expected in the periphery.

EMBODIMENTS

The following embodiments relate to rotationally symmetric single-vision lenses with a diffraction grating, wherein the astigmatism is disregarded and only one-dimensional problems are considered for the sake of simplicity. The single-vision lenses have a prescription power of $S_{prescription}$+6.0 dpt and are made of an optical material having a refractive index of $n_d$=1.597 with an Abbe number of $v_d$=42.0. All spectacle lenses according to the examples of the invention are optimized according to the method for simultaneously optimizing lens surfaces and gratings with a target function. The optimization methods specifically used in embodiment 1 and embodiment 2 differ in some optimization objectives though.

Other than most of the optimization problems, embodiment 1 is not an overdetermined problem and can therefore be solved exactly. It leads to a lens fully corrected within the scope of the model assumptions. Embodiment 2 is selected such that also within the scope of the one-dimensional treatment without astigmatism, a compromise for several viewing directions has to be found, which depends on the type of target function. This situation corresponds to the general case of a spectacle lens with a diffraction grating. For example, in progressive lenses, already without taking chromatic aberrations into account, the Minkwitz theorem causes the optimization problem to be overdetermined and therefore a compromise has to be found.

It can be seen in both embodiments that the introduced grating can significantly improve the chromatic aberrations of the lens and at the same time also optimize the refractive error of the lens. Of course, the method is not limited to one-dimensional problems, but can also be applied to the tracing of a spectacle lens in the wearing position. In this more general case, an oblique-angled ray incidence is taken into consideration in the wavefront tracing.

In the following, the optimization of a rotationally symmetric spectacle lens by means of a target function will be explained in more detail. As explained above, the astigmatism of the spectacle lens will be neglected for the sake of simplicity.

An exemplary target function of type 1 in this case is a target function of the form:

$$F_1 = \sum_{i,\lambda} g_S(i,\lambda)(S_\Delta(i,\lambda) - S_{\Delta,target}(i,\lambda))^2. \quad (4b)$$

An exemplary target function of type 2 in this case is the target function of the form:

$$F_2 = \sum_i g_S(i)(S_\Delta(i,\lambda_0) - S_{\Delta,target}(i,\lambda_0))^2 + \quad (5b)$$
$$g_{FLF}(i) \times f(S_{SK}(i,\lambda_2) - S_{SK}(i,\lambda_1))^2$$

An exemplary target function of type 3 in this case is the target function of the form:

$$F_3 = \quad (6b)$$
$$\sum_i g_S(i)(S_\Delta(i,\lambda_0) - S_{\Delta,target}(i,\lambda_0))^2 + g_{FQF}(i) \times g(\Delta\varphi_{SK}(i,\lambda_2,\lambda_1))^2.$$

The calculation of the values taken into account in equations (4) to (6) can be performed by means of wavefront tracing. Other than the wavefront tracing in the above-mentioned article of W. Becken, et, al. "Brillengläser im Sport: Optimierung der Abbildungseigenschaften unter physiologischen Aspekten", Z. Med. Phys., 17 (2007), pages 56-66, the generalized Coddington equation described in the article, for the purely refractive case, is further extended by an additional term for the diffractive phase $\Psi$. The extension of the Coddington equation for an optical element with at least one diffraction grating will be described in detail in the following.

In the case of a vertical, or perpendicular, light incidence on the individual boundary surface i (i=1,2) for the then one-dimensional problem, it holds for the wavefront tracing that $$n'_i W'^{(2)}_{Out,i}(0) - n_i W^{(2)}_{In,i}(0) = (n'_i - n_i)\bar{S}^{(2)}_i(0) - \Psi^{(2)}_i(0). \quad (7)$$

In equation (7):
$n'_i$ is the refractive index of the material behind the $i^{th}$ surface;
$n_i$ is the refractive index of the material in front of the $i^{th}$ surface;
$\bar{S}_i$ is the refractive power of the $i^{th}$ surface;
$W'^{(2)}_{Out,i}(0)$ is the curvature of the outgoing wavefront at the $i^{th}$ surface;
$W^{(2)}_{In,i}(0)$ is the curvature of the incident wavefront at the $i^{th}$ surface;
$\Psi^{(2)}_i(0)$ is the phase of the $i^{th}$ diffraction grating.

As can be seen from equation (7), the refractive portion of the refractive power is determined by $(n'_i-n_i)\bar{S}^{(2)}_i(0)$, and the diffractive portion of the refractive power is determined by $-\Psi^{(2)}_i(0)$. In the present example, two refractive surfaces $\bar{S}_1$, and $\bar{S}_2$ and two diffraction gratings $\Psi_1$ and $\Psi_2$, which limit a spectacle lens with a refractive index n in air, are contemplated. In this case, $n_1=1$, $n'_1=n$, $n_2=n$, $n'_2=1$.

The change of the wavefront in the propagation through the spectacle lens and from the spectacle lens to the vertex sphere can be neglected. If the incident waveform is plane (i.e. $W^{(2)}_{In,1}(0)=0$), then the curvature $W'^{(2)}_{Out,2}(0)$ of the outgoing wavefront can be equated directly with the refractive power of the lens. Accordingly, it holds for the refractive and diffractive portions of the refractive power that:

$$S(\bar{x},\lambda) = S_{ref}(\bar{x},\lambda) + S_{diff}(\bar{x},\lambda) \quad (8)$$

where $$S_{ref}(\bar{x},\lambda) = (n(\lambda)-1)\bar{S}^{(2)}(\bar{x}) \quad (9)$$
$$= (n(\lambda)-1)(\bar{S}^{(2)}_1(\bar{x}) + \bar{S}^{(2)}_2(\bar{x}))$$
$$S_{diff}(\bar{x},\lambda) = -\Psi^{(2)}(\bar{x},\lambda)$$
$$= -(\Psi^{(2)}_1(\bar{x},\lambda) + \Psi^{(2)}_2(\bar{x},\lambda)).$$

If one assumes that $n(\lambda)$ depends linearly on the wavelength, it will hold that $$n(\lambda) - 1 = (n_0 - 1) + \frac{\partial n}{\partial \lambda}(\lambda - \lambda_0) \quad (10)$$
$$= (n_0 - 1) + \frac{n_C - n_F}{\lambda_C - \lambda_F}(\lambda - \lambda_0)$$
$$= (n_0 - 1)\left(1 + \frac{n_C - n_F}{n_0 - 1}\left(\frac{\lambda - \lambda_0}{\lambda_C - \lambda_F}\right)\right).$$

In the above equation, $\lambda_F$=486.1 nm and $\lambda_C$=656.3 nm. The wavelength $\lambda_0$ in the expression $n_0=n(\lambda_0)$ is a suitably selected wavelength.

Preferably, $\lambda_0=\lambda_d$=587.1 nm is the wavelength in which the Abbe number $$v_d = -\frac{n_d - 1}{n_C - n_F}$$

is defined, so that $$n(\lambda) - 1 = (n_d - 1)\left(1 - \frac{1}{v_d}\left(\frac{\lambda - \lambda_d}{\lambda_C - \lambda_F}\right)\right) \quad (10a)$$

The phase $\Psi$ is proportional to the wavelength and reads in a spatial dimension:

$$\Psi(\bar{x};\lambda,m) = m\lambda \cdot \psi(\bar{x}). \tag{11}$$

The total refractive power can be expressed by the sought functions $\bar{S}^{(2)}(\bar{x})$ of the surface curvature and $\psi^{(2)}(\bar{x})$ of the phase curvature:

$$S(\bar{x},\lambda) = (n_d - 1)\left(1 - \frac{1}{v_d}\left(\frac{\lambda - \lambda_d}{\lambda_C - \lambda_F}\right)\right)\bar{S}^{(2)}(\bar{x}) - m\lambda \cdot \psi^{(2)}(\bar{x}). \tag{12}$$

In the following examples, the target function of type 1 will be evaluated for 2 wavelengths. For the weighting function, it holds that $g_S(i,\lambda)=1$, $g_{FLF}(i)=1$ and $g_{FQF}(i)=1$. The target objectives for the refractive error are set to $S_{\Delta,targ}(i,\lambda)=0$. Here, the variable $S_\Delta(i,\lambda)$ is the difference of the existing refractive power $S(\bar{x},\lambda)$ and the required prescription power of the lens $S_{prescription}$.

Under these conditions, the target functions of different types have the respective following formulae:

$$\text{Type 1) } F_1 = \sum_i (S(\bar{x}_i, \lambda_1) - S_{prescription})^2 + \tag{13}$$
$$\sum_i (S(\bar{x}_i, \lambda_2) - S_{prescription})^2$$

$$\text{Type 2) } F_2 = \sum_i (S(\bar{x}_i, \lambda_0) - S_{prescription})^2 +$$
$$f(S_{SK}(i, \lambda_2) - S_{SK}(i, \lambda_1))^2$$

$$\text{Type 3) } F_3 = \sum_i (S(\bar{x}_i, \lambda_0) - S_{prescription})^2 + g(\Delta\varphi_{SK}(i, \lambda_2, \lambda_1))^2.$$

Embodiment 1

The spectacle lens according to the first comparative example has been optimized according to a conventional method by means of minimization of a monochromatic target function. The single-vision lenses of example 1 or example 2 are optimized according to one of the above-described methods by means of target functions of type 1 (example 1) or type 2 (example 2). The wavelengths decisive for the polychromatic optimization are $\lambda_1 = \lambda_F = 486.1$ nm and $\lambda_2 = \lambda_C = 656.3$ nm. The following table 1 summarizes the objectives for the optimization methods.

TABLE 1

|  | Target function | Degrees of freedom | Evaluation points |
| --- | --- | --- | --- |
| Comparative example 1 | monochromatic | 1 (refractive) | 1 ($\bar{x}_i = 0$) |
| Example 1 | type 1 | 1 (refractive) + 1 (diffractive) = 2 | 1 ($\bar{x}_i = 0$) |
| Example 2 | type 2 | 1 (refractive) + 1 (diffractive) = 2 | 1 ($\bar{x}_i = 0$) |

The lens surfaces to be optimized and the gratings used can be described by a parameter representation or by splines or by another suitable form. In the spectacle lenses of the comparative example 1 as well as of the first and second examples, the refractive surface to be optimized is described as follows by the one degree of freedom of the curvature k $$\bar{S}(\bar{x}) = \frac{k}{2}\bar{x}^2. \tag{14a}$$

The grating phase is described by the function $$\psi(\bar{x}) = \frac{\alpha_2}{2}\bar{x}^2 \tag{14b}$$

where $\alpha_2$ is a variable parameter.

Comparative Example 1

On the assumptions of the present example, the monochromatic target function of equation (3) reads as follows $$F_{monochrom} = (a_d u + c)^2, \tag{15}$$

where $a_d = (n_d - 1)$ and $c = -S_{prescription}$. Here, $u = \bar{S}^{(2)}(0) = k$ plays the role of the only degree of freedom, since the grating is not present in the monochromatic target function.

An optimization of the spectacle lens according to the comparative example 1 on the basis of the monochromatic target function of equation (3) due to a wavefront tracing without diffractive addition term furnishes the result $u = -c/a_d$, as can be seen e.g. by differentiating equation (15) for u and by a subsequent zeroing.

This is equivalent to $$\bar{S}^{(2)}(0) = \frac{S_{prescription}}{n_d - 1} \approx 10.05 dpt. \tag{16}$$

After substitution of equation (16) into equations (10), (11), (12), the refractive power of such a lens will be $$S(\bar{x},\lambda) = (n(\lambda) - 1)\bar{S}^{(2)}(\bar{x}) = \left(1 - \frac{1}{v_d}\left(\frac{\lambda - \lambda_d}{\lambda_C - \lambda_F}\right)\right)S_{prescription}. \tag{15a}$$

In this case, $S(\bar{x},\lambda)$ of the spectacle lens is equal to $S_{prescription}$ only for $\lambda = \lambda_d$. For other wavelengths, the spectacle lens according to the comparative example 1 exhibits a refractive error.

Therefore, the longitudinal chromatic aberration (FLF) of a spectacle lens according to comparative example 1, which is defined by $$FLF(\bar{x}) := S(\bar{x},\lambda_1) - S(\bar{x},\lambda_2) \tag{18}$$

does not disappear, but is determined by $$FLF(\bar{x}) = \frac{S_{prescription}}{v_d} = 0.14 dpt \tag{18a}$$

Under the conditions of the present example, in particular when the corrections for an oblique-angled ray incidence are neglected, the lateral chromatic aberration (FQF) of a spectacle lens can be determined from the longitudinal chromatic aberration (FLF) by integration of Prentice's rule. In the differential form, Prentice's rule reads $$S(r) = \frac{\partial Pr}{\partial r} \Rightarrow Pr(r) = Pr(0) + \int_0^r S(r')dr'. \tag{19}$$

where Pr is the prismatic power. Since Pr(0)=0, it holds for the lateral chromatic aberration that:

$$FQF(\bar{x}) := |Pr(\bar{x}, \lambda_1) - Pr(\bar{x}, \lambda_2)| = \left|\int_0^r FLF(r')dr'\right| \tag{20}$$

In the present case, it holds that $$FQF(\bar{x}) = \left|\int_0^r \frac{S_{prescription}}{v_d} dr'\right| = 0.14 dpt \times |r|. \tag{20a}$$

First Example

In the first example, the spectacle lens is optimized polychromatically by means of minimization of a target function of type 1. An exemplary target function is a target function of the form $$F_1 = (a_1 u + b_1 v + c)^2 + (a_2 u + b_2 v + c)^2, \tag{21}$$

where $$a_i = (n_d - 1)\left(1 - \frac{1}{v_d}\left(\frac{\lambda_i - \lambda_d}{\lambda_C - \lambda_F}\right)\right), i = 1, 2; \tag{22}$$

$$b_i = -m\lambda_i, i = 1, 2;$$

$$c = -S_{prescription};$$

$$u = \bar{S}^{(2)}(0) = k;$$

$$v = \psi^{(2)}(0) = \alpha_2$$

Directly deriving F with respect to u and v and zeroing lead to the results $$u = \frac{(b_2 - b_1)c}{a_2 b_1 - a_1 b_2} \tag{23}$$

$$v = \frac{(a_2 - a_1)c}{a_1 b_2 - a_2 b_1}.$$

This is equivalent to $$\bar{S}^{(2)}(0) = \frac{S_{prescription}}{n_d - 1} \times \left(1 + \frac{1}{v_d}\frac{\lambda_d}{\lambda_C - \lambda_F}\right)^{-1} \tag{24}$$

$$\psi^{(2)}(0) = \frac{1}{m} \times \frac{S_{prescription}}{-v_d(\lambda_C - \lambda_F)} \times \left(1 + \frac{1}{v_d}\frac{\lambda_d}{\lambda_C - \lambda_F}\right)^{-1}.$$

The following numerical values result for the first example:

$$\bar{S}^{(2)}(0) \approx 9.29 \text{ dpt}$$

$$\psi^{(2)}(0) \approx 7.76 \times 10^5 \text{ m}^{-2}. \tag{24a}$$

After substitution of equation (22) into equations (10), (11), (12), the refractive power of such a lens will be $$S(\bar{x}, \lambda) = S_{ref}(\bar{x}, \lambda) + S_{diff}(\bar{x}, \lambda) \tag{25}$$

$$= (n(\lambda) - 1)\bar{S}^{(2)}(\bar{x}) - \Psi^{(2)}(\bar{x}, \lambda)$$

$$= (n_d - 1)\left(1 - \frac{1}{v_d}\left(\frac{\lambda - \lambda_d}{\lambda_C - \lambda_F}\right)\right)\frac{S_{prescription}}{n_d - 1} \times$$

$$\left(1 + \frac{1}{v_d}\frac{\lambda_d}{\lambda_C - \lambda_F}\right)^{-1} - m\lambda \frac{1}{m} \times \frac{S_{prescription}}{-v_d(\lambda_C - \lambda_F)} \times$$

$$\left(1 + \frac{1}{v_d}\frac{\lambda_d}{\lambda_C - \lambda_F}\right)^{-1}$$

$$= S_{prescription}.$$

The longitudinal chromatic aberration (FLF) of such a lens is $$FLF(\bar{x}) = S_{prescription} - S_{prescription} = 0. \tag{26}$$

The same applies to the lateral chromatic aberration $$FLF(\bar{x}) = 0. \tag{27}$$

Consequently, the minimization of the target function of type 1 results in a lens that exactly meets the prescription objectives and that is fully corrected with respect to the longitudinal chromatic aberration and the lateral chromatic aberration.

Second Example

In the second example, the spectacle lens is optimized polychromatically by minimizing a target function of type 2 (cf. equation (5b)). An exemplary target function is a target function of the form $$F = (a_d u + b_d v + c)^2 + (a_2 u + b_2 v - a_1 u - b_1 v)^2, \tag{28}$$

where $$a_d = (n_d - 1); \tag{29}$$

$$a_i = (n_d - 1)\left(1 - \frac{1}{v_d}\left(\frac{\lambda_i - \lambda_d}{\lambda_C - \lambda_F}\right)\right), i = 1, 2;$$

$$b_i = -m\lambda_i, i = 0, 1, 2;$$

$$c = -S_{prescription};$$

$$u = \bar{S}^{(2)}(0);$$

$$v = \psi^{(2)}(0).$$

Directly deriving F with respect to u and v and zeroing lead to the results $$u = \frac{(b_2 - b_1)c}{(a_2 - a_1)b_0 - (b_2 - b_1)a_0} \tag{30}$$

$$v = \frac{(a_2 - a_1)c}{(b_2 - b_1)a_0 - (a_2 - a_1)b_0},$$

which is equivalent to $$\bar{S}^{(2)}(0) = \frac{S_{prescription}}{n_d - 1} \times \left(1 + \frac{1}{v_d}\frac{\lambda_d}{\lambda_C - \lambda_F}\right)^{-1} \tag{31}$$

$$\psi^{(2)}(0) = \frac{1}{m} \times \frac{S_{prescription}}{-v_d(\lambda_C - \lambda_F)} \times \left(1 + \frac{1}{v_d}\frac{\lambda_d}{\lambda_C - \lambda_F}\right)^{-1}$$

Thus, the solution according to equation (31) is identical to the solution according to equation (23), which is obtained by minimization of the target function of type 1.

Figure 1B:
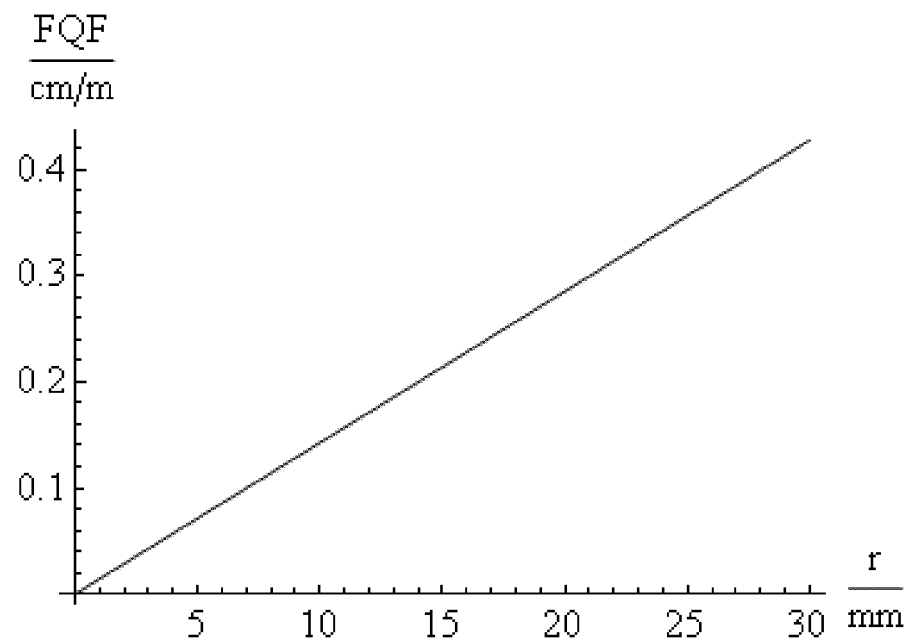

FIG. 1 shows the longitudinal chromatic aberration (FIG. 1A) and the lateral chromatic aberration (FIG. 1B) of the exemplary lens according to the comparative example 1. As can be seen from FIG. 1, a clear longitudinal chromatic aberration (FLF) of 0.14 dpt occurs, so that the lateral chromatic aberration (FQF) outside a radius of r≈8 mm is below the perception threshold for the color fringe of 0.12 cm/m, which is common in the physiology.

Figure 2B:
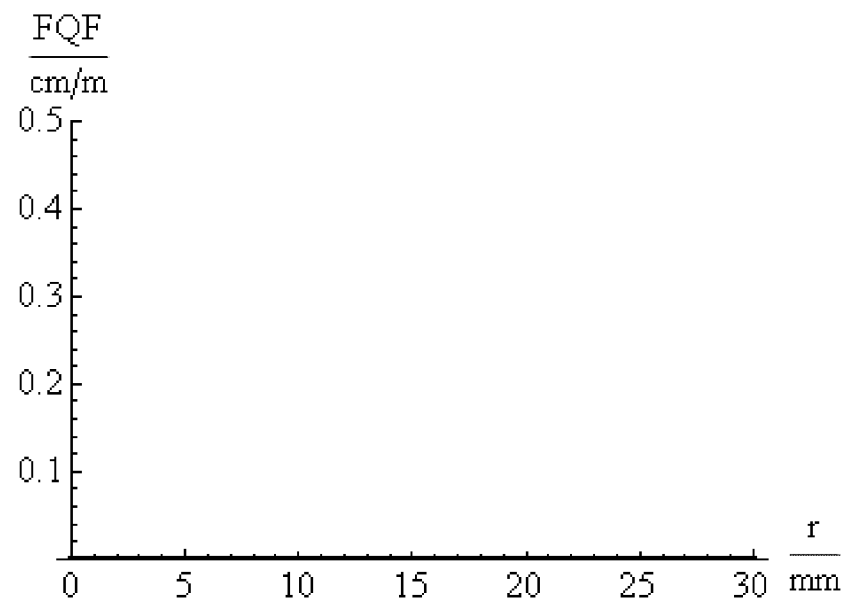

FIG. 2 shows the longitudinal chromatic aberration (FIG. 2A) and the lateral chromatic aberration (FIG. 2B) of the exemplary lens optimized according to a target function of type 1 (example 1) or of type 2 (example 2). In contrast to the comparative example 1, it is possible to bring the longitudinal chromatic aberration (FLF) and the lateral chromatic aberration (FQF) to zero across the entire lens by optimization according to a target function of type 1 or of type 2.

FIG. 3A shows the prescription power, the refractive power, the diffractive power, and the total power in the lens center as a function of the wavelength for the spectacle lens according to the comparative example 1, which has been optimized according to the monochromatic target function. FIG. 3B shows the prescription power, the refractive power, the diffractive power, and the total power in the lens center as a function of the wavelength for the spectacle lens optimized according to a target function of type 1 (example 1) or of type 2 (example 2).

The refractive error of the lens according to the comparative example 1 is shown in FIG. 3A by the slightly sloping, solid curve for the total power. The refractive error is exclusively determined by the refractive portion (short-dashed), which decreases for great wavelengths due to the dispersion. In contrast, in examples 1 and 2, only slightly more than 90% of the total power are attributed to the refractive portion (FIG. 3B). In addition, there is a diffractive portion (long-dashed), which slightly increases as the wavelength increases and thereby compensates for the decreasing behavior of the refractive portion. The result is a refraction-correct lens for all wavelengths.

Embodiment 2

A second comparative example relates to a spectacle lens optimized according to a method of the prior art by means of minimization of a monochromatic target function. The single-vision lenses of example 3 or example 4 are optimized according to one of the above-described methods by means of target functions of type 1 (example 3) or type 2 (example 4). As in the embodiment 1, the wavelengths decisive for the polychromatic optimization in embodiment 2 are $\lambda_1=\lambda_F=486{,}134$ nm and $\lambda_2=\lambda_C=656{,}281$ nm. The following table 2 summarizes the objectives for the optimization.

TABLE 2

|  | Target function | Degrees of freedom | Evaluation points |
| --- | --- | --- | --- |
| Comparative example 2 | monochromatic | 1 (refractive) | 11 |
| Example 3 | type 1 | 1 (refractive) + 3 (diffractive) = 4 | 11 |
| Example 4 | type 2 | 1 (refractive) + 3 (diffractive) = 4 | 11 |

In this embodiment, the refractive surface to be optimized is specified by an exact sphere described by the one degree of freedom of the curvature k:

$$\bar{S}(\bar{x}) = \frac{1}{k} - \sqrt{\frac{1}{k^2} - \bar{x}^2}. \quad (32)$$

The grating phase is specified by the function $$\psi(\bar{x}) = \frac{\alpha_2}{2}\bar{x}^2 + \frac{\alpha_3}{3!}\bar{x}^3 + \frac{\alpha_4}{4!}\bar{x}^4 \quad (33)$$

with the three parameters $\alpha_2, \alpha_3, \alpha_4$ as degrees of freedom.

For all evaluation points, it holds that $$\bar{x}_i = -30 \text{ mm} + (i-1) \times 6 \text{ mm}, i = 1, 2, \ldots x. \quad (34)$$

Thus, the 11 evaluation points are the evaluation points $\bar{x}_1 = -30$ mm, $\bar{x}_2 = -24$ mm, ..., $\bar{x}_{11} = +30$ mm.

Second Comparative Example

For the optimization according to the second comparative example, a monochromatic target function according to equation (3) is used. On the assumptions of embodiment 2, the target function has the form $$F_{monochrom} = \sum_{i=1}^{11}(a_d u_i + c)^2 \quad (35)$$

where $u_i = S^{(2)}(\bar{x}_i)$.

A minimum search of equation (35) for the degree of freedom k can be performed e.g. by differentiating and zeroing, or by a numerical method for minimum search. A suitable numerical method for minimum search is e.g. the method of conjugate gradients, the method by means of main axis determination, the Levenberg-Marquardt method, Newton's method, or a quasi-Newton's method.

As a result of this minimum determination, the value $$k \approx 9.49 \text{ dpt} \quad (36)$$

is determined for the parameter k.

This value is slightly smaller than the value determined in one of the monochromatic optimizations with only one single evaluation point according to the comparative example 1 (cf. equation (16)).

Third Example

In comparison with the second comparative example, the target function of type 1 used in the third example is of the form $$F_1 = \sum_{i=1}^{11}(a_1 u_i + b_1 v_i + c)^2 + (a_2 u_i + b_2 v_i + c)^2, \quad (37)$$

where $u_i = S^{(2)}(\bar{x}_i)$, $v_i = \psi^{(2)}(\bar{x}_i)$.

A minimum search of equation (37) for the degrees of freedom k, $\alpha_2$, $\alpha_3$, $\alpha_4$ leads to the following results:

$$k \approx 8.846 \text{ dpt};$$

$$\alpha_2 \approx 1.24 \times 10^6 \text{ m}^{-2};$$

$$\alpha_3 \approx 4.04 \times 10^{-9} \text{ m}^{-3}; \quad (38)$$

$$\alpha_4 \approx -2.33 \times 10^9 \text{ m}^{-4}.$$

Particularly, this results in $$\overline{S}^{(2)}(0) \approx 8.846 \text{ dpt}$$

$$\psi^{(2)}(0) = 1.24 \times 10^6 \text{ m}^{-2} \quad (38a)$$

and $$\overline{S}^{(2)}(30 \text{ mm}) \approx 9.86 \text{ dpt}$$

$$\psi^{(2)}(30 \text{ mm}) = 1.91 \times 10^5 \text{ m}^{-2}. \quad (38b)$$

In a comparison of equation (24a) with equations (38a) and (38b), it can be seen that the equation (24a), which is based on an optimization with only one evaluation point, substantially provides average values of equations (38a) and (38b), which are each based on an optimization with 11 evaluation points.

Fourth Example

The target function used in the optimization of the spectacle lens according to the fourth example is of the form $$F_1 = \sum_{i=1}^{11} (a_d u_i + b_d v_i + c)^2 + (a_2 u_i + b_2 v_i - a_1 u_i - b_1 v_i)^2. \quad (39)$$

A minimum search of equation (39) for the degrees of freedom k, $\alpha_2$, $\alpha_3$, $\alpha_4$ leads to the following results:

$$k \approx 8.847 \text{ dpt};$$

$$\alpha_2 \approx 1.19 \times 10^6 \text{ m}^{-2};$$

$$\alpha_3 \approx 2.34 \times 10^{-9} \text{ m}^{-3};$$

$$\alpha_4 \approx 2.12 \times 10^9 \text{ m}^{-4}. \quad (40)$$

Particularly, this results in $$\overline{S}^{(2)}(0) \approx 8.846 \text{ dpt}$$

$$\psi^{(2)}(0) = 1.19 \times 10^6 \text{ m}^{-2} \quad (40a)$$

and $$\overline{S}^{(2)}(30 \text{ mm}) \approx 9.87 \text{ dpt}$$

$$\psi^{(2)}(30 \text{ mm}) = 2.42 \times 10^5 \text{ m}^{-2}. \quad (40b)$$

The above values are comparable to, but slightly deviate from the corresponding values obtained by means of a minimum search of the target function of type 1.

The results of the spectacle lens optimization according to the target function of type 1 (third example) and of type 2 (fourth example), in comparison with the optimization according to the monochromatic target function (second comparative example), are illustrated in FIGS. 4 to 8.

Figure 4B:
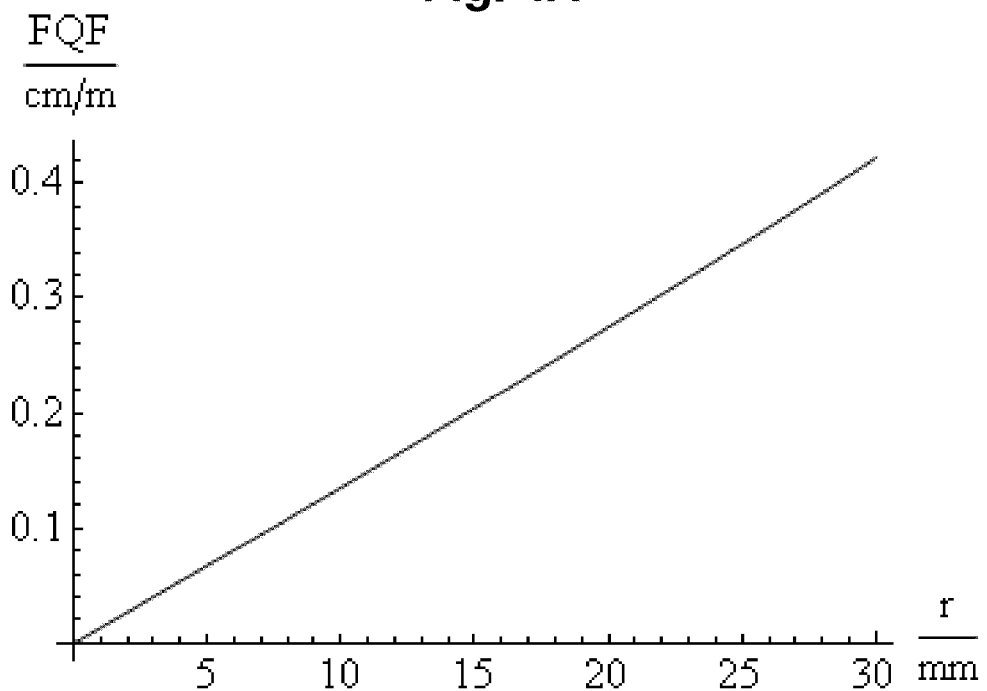

FIG. 4 illustrates the longitudinal chromatic aberration (FIG. 4A) and the lateral chromatic aberration (FIG. 4B) of the spectacle lens according to the second example as a function of the radial coordinate. Similar to the first comparative example (cf. FIGS. 1A and 1B) with only one evaluation point, the longitudinal chromatic aberration is above 0.12 dpt across the entire lens also in this case. In contrast to the first comparative example, it slightly increases toward the outside though. The lateral chromatic aberration has practically a similar course as in FIG. 1B.

Figure 5B:
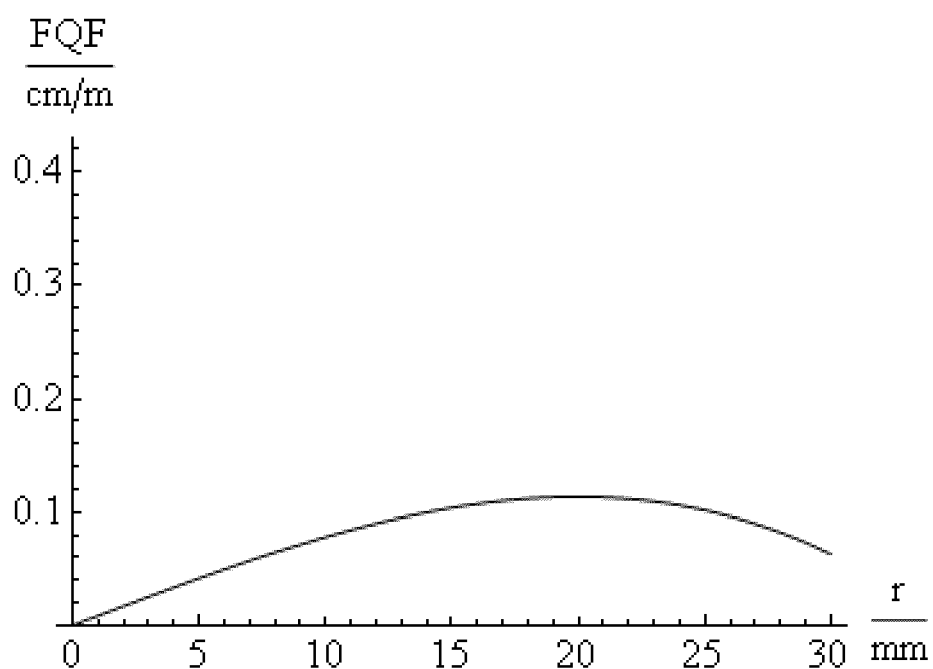

FIG. 5 shows the longitudinal chromatic aberration (FIG. 5A) and the lateral chromatic aberration (FIG. 5B) of a spectacle lens optimized according to the third example according to a target function of type 1. The optimization of a target function of type 1 results in a spectacle lens having a longitudinal chromatic aberration in an amount of below 0.1 dpt everywhere (FIG. 5A). The corresponding lateral chromatic aberration is below the perception threshold of 0.12 cm/m everywhere in the lens (FIG. 5B).

Figure 6B:
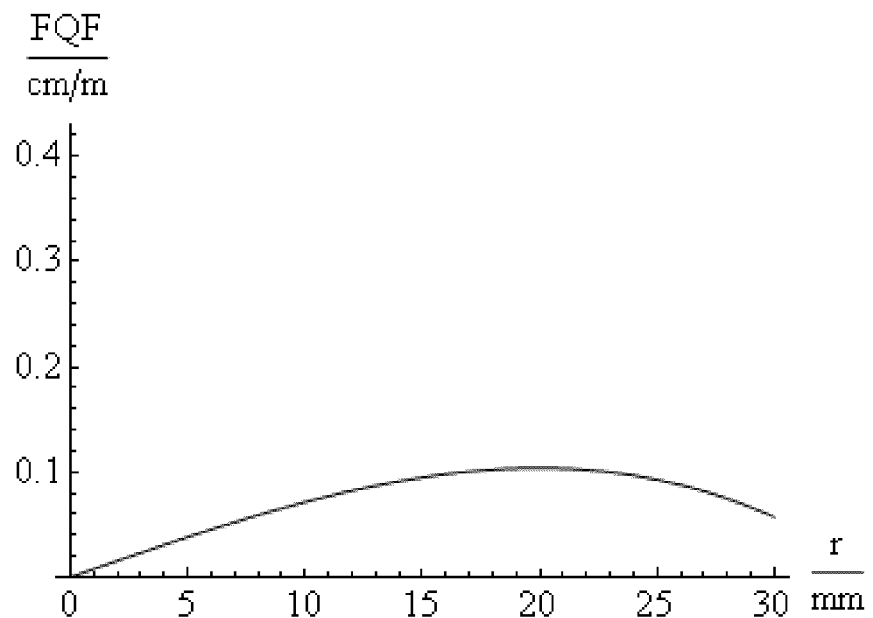

FIG. 6 shows the longitudinal chromatic aberration (FIG. 6A) and the lateral chromatic aberration (FIG. 6B) of a spectacle lens optimized according to the fourth example according to a target function of type 2. If a target function of type 2 is optimized, as in the fourth example, the results will slightly differ numerically from those of a target function of type 1. In terms of quality, the improvement with respect to the prior art (cf. comparative example 2) is very similar.

By analogy with FIGS. 3A-B, FIGS. 7A-C illustrate the wavelength dependencies different variables (prescription power, refractive power, diffractive power, and the total power in the lens center). FIG. 7A shows the courses for the monochromatic optimization according to a second comparative example, FIG. 7B shows the results of an optimization according to the third example using a target function of type 1, and FIG. 7C shows the results of an optimization according to the fourth example using a target function of type 2. As can be seen from FIGS. 7A-C, in contrast to embodiment 1, no noticeable changes by the addition of evaluation points are visible. Moreover, there are only marginal differences between the optimizations according to type 1 and type 2.

In contrast, in FIGS. 8A-C, the refractive errors at different wavelengths and the longitudinal chromatic aberration are plotted on a finer scale against the radial coordinate. In particular, FIG. 8A shows the refractive error at the wavelength $\lambda_C$, the refractive error at the wavelength $\lambda_F$, and the longitudinal chromatic aberration of a lens according to comparative example 2, which has been optimized according to the above-described monochromatic target function. FIG. 8B shows the refractive error at the wavelength $\lambda_C$, the refractive error at the wavelength $\lambda_F$, and the longitudinal chromatic aberration of a lens according to the third example, which has been optimized according to a polychromatic target function of type 1. FIG. 8C the refractive error at the wavelength $\lambda_C$, the refractive error at the wavelength $\lambda_F$, and the longitudinal chromatic aberration of a lens according to the fourth example, which has been optimized according to a polychromatic target function of type 2.

As can be seen from FIG. 8A, the spectacle lens optimized according to a monochromatic optimization at first has a large stroke of the refractive errors at both wavelengths. However, that is substantially a feature of the selected surface representation and can substantially be avoided by selecting a more flexible surface representation. In contrast, the constantly high longitudinal chromatic aberration in FIG. 8A is an evitable feature of the monochromatic optimization method according to the prior art, in which the color fringe is not corrected. By adding a diffraction grating and by using an exemplary method according to the invention, the longitudinal chromatic aberration can be improved strongly (FIG. 8B). The optimization by means of a target function of type 1 results in a clear reduction of the longitudinal chromatic aberration combined with a simultaneous, clear reduction of the refractive errors. An optimization by means of a target function of type 2 results in similarly great improvements, but with a different error distribution as a function of the coordinate (FIG. 8C) in the individual case.

FIGS. 9A to 9C illustrate the color fringe of a spectacle lens for different viewing angles a) 0° b) 10° c) 20° d) 30°, wherein FIG. 9A shows a non-corrected image formation through a monochromatically optimized spectacle lens, FIG. 9B shows an image formation through a spectacle lens with corrected color fringe, without an aspherical follow-up optimization of the refractive surfaces, and FIG. 9C shows an image formation through a spectacle lens optimized by means of a simultaneous color fringe optimization and an aspherical follow-up optimization. As can be seen from FIG. 9B, a color fringe correction without taking the refractive errors of the spectacle lens with the grating results in a slightly more blurred image formation. Only considering both the color fringe and the refractive error, e.g. by means of a simultaneous optimization of the diffraction grating and at least one of the refractive surfaces, leads to a sharp image formation with corrected color fringe.

With the proposed procedure according to a preferred embodiment of the invention, an optimum combination of refractive surfaces and diffraction gratings can be determined both for single-vision lenses and for multifocal lenses, which optimizes at least the second-order aberrations and also minimizes the color fringe. In this respect, the method according to the fourth example of the invention is particularly suitable. However, a good approximation of an optimum combination can also be achieved with the methods according to the first to third embodiments.

FIGS. 10A-10C show the results of an exemplary color fringe correction with a rotationally symmetric single-vision lens having a spherical power (sph) of −4.0 dpt, wherein the lens properties are indicated in mm as a function of the spectacle lens coordinates. FIG. 10A shows the color fringe of a conventional non-corrected single-vision lens of the optical material Perfalit 1.5 with a refractive index 1.5 and an Abbe number of 58.5. FIG. 10B shows the color fringe of a conventional non-corrected single-vision lens of the optical material Perfalit 1.6 with a refractive index 1.6 and an Abbe number of 40.5. FIG. 10C shows the color fringe of a color fringe-corrected single-vision lens of the highly refractive optical material Perfalit 1.74, with a refractive index of 1.74. The color fringe-corrected single-vision lens has an effective Abbe number of approximately 130.

FIGS. 11a-11D show an exemplary color fringe correction of a progressive spectacle lens by means of a diffraction grating, wherein FIG. 11A shows the astigmatism in the wearing position of the spectacle lens, FIG. 11B shows the diffractive phase or form of the grating lines of the diffraction grating, FIG. 11C shows the color fringe of the non-corrected spectacle lens, and FIG. 11D shows the color fringe of the corrected spectacle lens. The progressive spectacle lens has a spherical power in the distance reference point (sph) of −4.0 dpt and an addition of 2.5 dpt. The refractive index of the optical material of the spectacle lens is n=1.668 and the Abbe number is $v_d$=31.81. As can be seen from a comparison of FIGS. 11C and 11D, it is possible to achieve a good color fringe correction also for relatively highly asymmetric surfaces or optical elements.

Color fringe correction by a diffraction grating will be described in more detail in the following.

FIG. 12 schematically shows the diffraction of light upon incidence of a plane wavefront 10 onto a boundary surface 12 with a periodic structure 14 (diffraction grating). Due to interference, an angle-dependent distribution of the intensity of the outgoing wavefront 16 having several diffraction maxima occurs. The interference condition is $d(n' \sin \phi') - d(n \sin \phi) = m\lambda$. Here, $\lambda$ is the wavelength, $\phi, \phi'$ are the angles of incidence and emergence, n,n' are the two refractive indices (in front of and behind the boundary surface with the grating), and d is the grating constant. The angular distribution of the intensity can be written as the product of two factors, namely the diffraction factor and the form factor. The positions of the maxima of the diffraction factor only depend on the grating constant d and on the number of grating lines, the maximum position of the form factor, however, only depends on the elementary structure of the grating (e.g. on the blazing angle $\beta$ in the case of a blazed grating).

A main feature of a diffraction grating is the diffraction factor, which describes that the intensity distribution includes several maxima that can be counted with respect to the diffraction orders m They follow a modified diffraction law $n' \sin \phi' - n \sin \phi = m\lambda/d$. Only the maximum of the $0^{th}$ diffraction order (m=0) satisfies the classic law of refraction. All other directions would not occur refractively. In the ray image, this means that a ray is split into several partial rays. The form factor determines the distribution of the intensity to the individual diffraction orders. FIG. 13 schematically shows the angular distribution of the intensity with a blazed grating 14 applied to one of the surfaces of a prism 20. The lines F and B correspond to the form factor and the diffraction factor, respectively.

When these basic facts are applied to optical elements (e.g. prisms, lenses, spectacle lenses, etc.), it has to be taken into account that an optical element has at least two boundary surfaces. Here, it is common to 1) neglect polarization effects, i.e. to still make do with the scalar diffraction theory, 2) consider the Rayleigh-Sommerfeld diffraction integral with Fraunhofer or only Fresnel diffraction, 3) only consider far-field interferences, and 4) neglect scattering effects.

The third assumption is often made tacitly. However, it is valid as long as the two lens surfaces are further away from each other than the coherence length of day light or light from an incandescent lamp of 3 μm. This is usually the case for spectacle lenses.

The color fringe of optical elements in general is based on the fact that they have at least two refractive boundary surfaces, wherein the two combined refractive boundary surfaces of an optical element have a wavelength-dependent prismatic power $Pr_{ref}$. The use of diffractive optics for color fringe correction is based on the application of a diffraction grating to at least one of the refractive boundary surfaces of the optical element, for which grating an additional prismatic power $Pr_{diff}$ is introduced due to the diffractively modified law of refraction for m≠0.

With a suitable design or dimension of the diffraction grating (in particular the period d of the diffraction grating), there is an order m=$m_0$, for which the wavelength dependency of $Pr_{diff}$ is opposed to the ordinary dispersion of the refractive prism $Pr_{ref}$ and has such a size that the total prism $Pr=Pr_{ref}+Pr_{diff}$ is almost wavelength-independent. To obtain the highest possible intensity for this very order $m_0$, i.e. to maximize the diffraction efficiency, the grating form can be configured in a suitable manner. In the case of a blazed grating, this is accomplished by a suitable selection of the blazing angle.

A diffraction grating, which serves to correct the color fringe of a predetermined spectacle lens, can be determined as follows, for example:

1) modeling in the wave-optical image;
2) A specific order is selected from the wave-optical intensity distribution. The grating constant is selected such that the peak of this order is wavelength-independent. This makes a color fringe correction possible. The form of the grating (e.g. the blazing angle in the case of a blazed grating) is set such that the diffraction efficiency is maximal for this order. Finally, the direction of emergence for this peak is described by a ray (geometric ray image, ray tracing);
3) Simultaneous optimization of the grating and of the refractive surface, wherein the second and higher-order image formation properties of the spectacle lens are taken into consideration with the grating. According to an aspect of the invention, a transition to geometric wavefronts and wave tracing is proposed in order to calculate the image formation properties of the spectacle lens (preferably in the wearing position) and to optimize them as required.

Modeling in Wave-Optical Image

A crucial variable of wave optics is the distribution of amplitude and phase. By the calculation of the diffraction integral, the splitting into form and diffraction factors can be reproduced. Irrespective of how the diffraction orders can be used for color fringe correction then, it is advantageous to collect the intensity in only one single order if possible. For example, by means of a blazed grating with a specific blazing angle, it is possible, at least with a defined or predetermined design wavelength, to obtain a diffraction efficiency of basically almost 100% for the selected diffraction order. FIG. 14 shows the diffraction efficiency as a function of the wavelength. As can be taken from FIG. 14, it is possible that at the margin of the visible wavelength range, the diffraction efficiency typically still takes on values between 70% and 90%.

The form factor is a relatively wide bell function, which is centered precisely along the direction that, due to the slope of the surface portions in the grating, would already be the direction of emergence according to the classic law of refraction. Depending on the grating profile (e.g. depending on the blazing angle), this direction can be shifted to a diffraction maximum of a desired diffraction order (cf. FIG. 13). All other diffraction maxima are suppressed at the same time then. The directional dependence of the form factor applies independently of the grating constant and means that throughout the entire transition, which can be carried out by DOEs, MODs and also Fresnel gratings, light exits always near, or according to, the classic law of refraction.

Color Fringe Correction

If no diffraction grating is present, the intensity distribution will be determined by a curve, the maximum of which would be determined by the curve "F" of the form factor in FIG. 13. However, the peak would be much narrower and would be determined by the width of the single slit, which the complete lens represents. The wavelength dependency of the maximum position would then be determined by the ordinary dispersion.

This is not changed in the presence of a blazed diffraction grating, except that the width of the form factor peak now increases by orders and is determined by the single slit, which is now determined by a grating period (cf. curve "F" in FIG. 13). The dispersion behavior of this peak does not determine the intensity distribution alone any more, since it is additionally restricted by the sharp peaks of the diffraction factor. The one of the peaks that lies centrally on the form factor at an operating wavelength includes the entire intensity and de facto determines the direction of emergence of the light. The diffraction efficiency is almost 100% here. The aim is to make the position of this peak wavelength-independent, so that a color fringe correction is obtained.

Now, if the wavelength varies, the form factor will move slowly with only little loss of diffraction efficiency over this constant peak (cf. FIG. 14).

Geometric Ray Image and Color Fringe Correction

As explained above, by suitably selecting the profile of the diffraction grating, all diffraction maxima can be neglected in favor of only one maximum. The direction of emergence of the remaining diffraction maximum can be described in the geometric ray image by the modified law of refraction n' sin φ'n sin φ=mλ/d.

For a color fringe correction of a (local) prism, it is required for the prismatic deviation of a ray, which passes through both boundary surfaces of the prism and is deflected by the prism, to be wavelength-independent for a predetermined wavelength (design wavelength). The wavelength independence is to be understood as a vanishing derivative with respect to wavelength.

On the basis of this condition, the grating constant d can be determined, which is proportional to the Abbe number and the diffraction order and inversely proportional to the prism. Surprisingly, it has been found that the thus determined value of the grating constant is not in the order of the wavelength (as expected), but at a value of greater than d≈100 μm for a prism of 4 cm/m and with an Abbe number of $v_d \approx 40$. This can be explained by the fact that not a refractive power, but only the minor effect of color fringe correction is to be achieved.

As shown above, the diffraction order for which a color fringe correction occurs is always directed such that a reinforcement of the original prism occurs. The amount of the total prism $Pr=Pr_{ref}+Pr_{diff}$ is always approximately 5% to 10% higher than the amount $|Pr_{ref}|$ of the purely refractive portion.

Figure 15C:
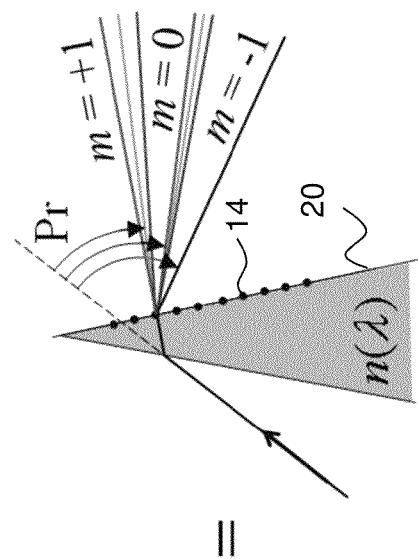
Figure 15B:
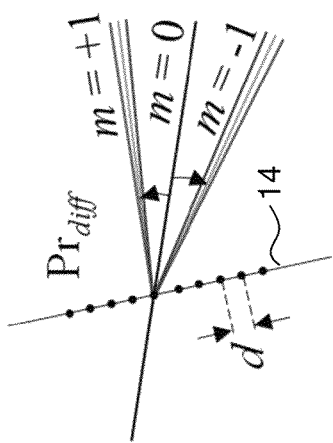
Figure 15A:
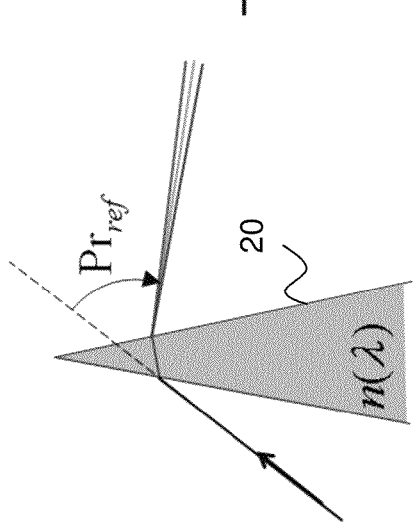

FIG. 15 shows the principle of color fringe correction by a diffraction grating with a refractive prism. FIG. 15A shows the color fringe of a prism 20 with a prism angle α, which is due to the wavelength-dependent prismatic power $Pr_{ref}$ of the prism 20. FIG. 15B shows a wavelength-dependent diffraction by the diffraction grating 14. FIG. 15C shows the combined power of the prism 20 and of the diffraction grating 14. A color fringe correction in the order of m=−1 takes place for the specified grating constant d. The wavelength-dependent prismatic power of the prism 20 is $Pr_{ref}=-(n(\lambda)-1)\alpha$. The diffraction grating 14 with the grating constant d has a prismatic power $$Pr_{diff} = \frac{m\lambda}{d}.$$

The combined power of the prism 20 and of the grating 14 is $Pr=Pr_{ref}+Pr_{diff}$. For a color fringe correction, it is required that $$\left.\frac{\partial Pr}{\partial \lambda}\right|_{\lambda=\lambda_D} = 0$$

for a predetermined design wavelength $\lambda_D$. It results for the grating constant that $$d \approx \frac{m}{\alpha \cdot \frac{\partial n}{\partial \lambda}}.$$

If, instead of on a prism, the color fringe is to be corrected on an optical element with curved surfaces, the results of the color fringe correction by means of a prism can be applied to the color fringe correction of the optical element by adjusting the value of d locally such that it corrects the local prism. Generally, the thus determined grating is not equidistant any more (i.e. does not have equidistant grating lines). Usually, the now variable function d(r) varies so slowly that the model concept of periodicity used for the deduction of the wave-optical equations remains approximately valid.

Since the local prism is proportional to r according to Prentice's rule, the period d(r) of a grating to correct the color fringe of a spectacle lens can be selected to be inversely proportional to r, i.e. d(r)=A/r. Here, the constant A is proportional to the Abbe number and the diffraction order, and inversely proportional to the vertex power. By analogy with the prism, according to Prentice's rule, the amount of the vertex power is increased by 5% to 10% as well due to the diffractive contribution.

In the above approach, however, the actual wearing position of the lens is not taken into consideration. In particular, it is not taken into consideration that, in the wearing position of the lens, the prism can deviate from the prism determined according to Prentice's rule. Generally, the dependency of the period on r is therefore usually more complex. Therefore, the period d(r) can be represented in form of a power series with terms proportional to $r^2$, r, 1, 1/r, $1/r^2$, . . . . Preferably, the coefficients of the individual terms are determined by a simultaneous optimization of grating and refractive surface.

These principles apply both to positive and negative lenses.
Geometric Wavefronts and Wave Tracing In order to obtain second-order laws by means of wave tracing, an image with geometric wavefronts is introduced in addition to the above-mentioned geometric ray image. These wavefronts do not correspond to the wavefronts that describe the surfaces of same phase in the wave-optical image, but they form after selection of a diffraction order and by being introduced as surfaces with respect to which the rays of that diffraction order are vertical, or perpendicular.

In this image, the diffraction grating (also referred to as a diffractive optical element or DOE) plays the role of a phase grating which, depending on r, more generally depending on the coordinates x, y, introduces a phase function $\psi(x,y)$ that is added to the optical wavelength of rays passing through. The function $\psi(x,y)$ is introduced such that the rays that are perpendicular to the surfaces of constant optical wavelength then automatically satisfy the diffractive law of refraction n' sin φ'n sin φ=λ/d or its vector extension. As has been found out, the gradient of $\psi(x,y)$ has to satisfy the condition $|\nabla|=m\lambda/d$ then.

Surprisingly, it has also been shown that a diffractive generalization of the Coddington equations exists, according to which the power vector of the surface power (except for/up to a prefactor) is extended additively by a vector consisting of the three second derivatives $\psi_{xx}$, $\psi_{xy}$, $\psi_{yy}$.

The passage of light through an arbitrary optical element, which can comprise several optical components, or through an arbitrary optical system 100 can be described on the basis of ray tracing and wavefront tracing, as is schematically shown in FIG. 16 and FIG. 17. Here, the object of ray tracing is to calculate, for a predetermined optical element/system 100, the outgoing ray 108 going out of the element/system at the exit surface 106 from an incident ray 102 existing up to the entrance surface 104 of the optical element/system. The object of wavefront tracing is to calculate, for a predetermined optical element/system 100, the outgoing wavefront 112 at the exit surface 106 of the element/system 100 from an incident wavefront 110 existing at the entrance surface 104 of the optical element/system 100. The object of local wavefront tracing is to calculate, for a predetermined optical element/system 100, the local properties of the outgoing wavefront 112 at the exit surface 112 of the element/system 100 from the local properties of an incident wavefront 112 existing at the entrance surface 104 of the optical element 100.

An optical element or optical system can be comprised of an arbitrary sequence of thin boundary surfaces, homogeneous materials, or inhomogeneous materials. In particular, an optical element (such as a spectacle lens, as shown in FIG. 17) can be comprised of the sequence of a curved refractive boundary surface 104 from air into a denser homogeneous material 114, the passage 116 through the material, and a second curved refractive boundary surface 106 back into air. FIG. 17 schematically shows the ray tracing and the wavefront tracing through such an optical element.

To improve optical elements or optical systems, in particular spectacle lenses, it may be advantageous to additionally introduce optical components into the ray path, which are based on other physical effects than a mere refraction at a curved boundary surface. For example, it has been suggested that diffractive optical elements be used, to which diffraction effects are of importance. In particular, such an element can be phase-delaying or phase-modulating, in fact such that by adding the element, the change of the optical path length depends on the penetration point of the ray.

However, methods allowing performing a precise tracing of the properties (in particular the image formation properties) of optical elements, which also comprise diffractive optical components, in particular taking a predetermined wearing position of the optical element into consideration, have not been known so far.

An extended wavefront tracing for the case of complex optical elements, which have at least one diffraction grating, will be described in detail in the following. The method can also be considered an extension of the wavefront tracing through purely refractive boundary surfaces, which is known from document WO 2008/089999A1, for the case of complex optical systems with at least one diffraction grating.

The most elementary description of a second-order wavefront tracing through a purely refractive boundary surface is known from the prior art (cf. e.g. the textbook "Optik and Technik der Brille" of H. Diepes and R. Blendowske, 2002 Optische Fachveröffentlichung GmbH, Heidelberg, pages 485 ff.) as the so-called BAD equation, or also vergence equation. In the case of a rotationally symmetric refractive surface and with a vertical, or perpendicular, incidence of rays, the BAD equation (vergence equation) reads as follow:

$$B=A+D. \quad (101)$$

Here, A is the vergence (i.e. a measure for the local wavefront curvature) of the incident wavefront, B is the vergence of the outgoing wavefront, and D is the surface power of the refractive surface.

If the requirements for rotational symmetry are not met, the BAD equation will be written vectorially for purely refractive surfaces according to the prior art (cf. e.g. the above-cited textbook "Optik and Technik der Brille"), i.e.

$$B = A + D. \quad (102)$$

Here, A is the power vector form of the vergence matrix of the incident wavefront, B is the power vector form of the vergence matrix of the outgoing wavefront, and D is the power vector form of the surface power matrix of the refractive surface. Instead of a power vector, linear combinations of power vector components, which have been combined to form a new vector, can be used as well. In particular, the normal curvatures and the torsion, i.e. the second derivatives with respect to transverse coordinates and the mixed derivative, can be used.

Instead of the symbols A and A, B and B, as well as D and D, the following symbols are often used:
A and A → S and S
B and B → S' and S'
D and D → F and F Accordingly, the equations (101) and (102) then read S'=S+F and S'=S+F.

If the incidence of rays is not perpendicular, further modifications of the BAD equation can be introduced for purely refractive boundary surfaces according to the prior art, with which the wavefront passage can again be described precisely (cf. e.g. G. Esser, W. Becken, W. Müller, P. Baumbach, J. Arasa, and D. Uttenweiler, "Derivation of the refraction equations for higher-order aberrations of local wavefronts at oblique incidence", JOSA. A, vol. 27, no. 2, February 2010, pages 218-237). These modifications are the Coddington equation and the generalized Coddington equation for second and higher-order aberrations. In particular, the publication of G. Esser et al. describes the power vector form of the generalized Coddington equation for second and higher-order aberrations.

The equations (in power vector form) known from the prior art for second and higher-order wavefront tracings in the case of a passage through a purely refractive boundary surface are summarized in table 1:

TABLE 1

|  | vertical incidence + rotational symmetry | vertical incidence without rotational symmetry | no symmetry |
|---|---|---|---|
| $2^{nd}$ order | $S'^{(2)} = S^{(2)} + F^{(2)}$ alternative notation: $S' = S + F$ $B = A + D$ | $S'^{(2)} = S^{(2)} + F^{(2)}$ alternative notation: $S' = S + F$ $B = A + D$ | $T'_2 S'^{(2)} = T_2 S^{(2)} + v F^{(2)}$ |
| $3^{rd}$ order | $S'^{(3)} = S^{(3)} + F^{(3)} + R_3(S^{(2)}, F^{(2)})$ | $S'^{(3)} = S^{(3)} + F^{(3)} + R_3(S^{(2)}, F^{(2)})$ | $T'_3 S'^{(3)} = T_3 S^{(3)} + v F^{(3)} + Q_3(S^{(2)}, F^{(2)})$ |
| $4^{th}$ order | $S'^{(4)} = S^{(4)} + F^{(4)} + R_4(S^{(3)}, F^{(3)}, S^{(2)}, F^{(2)})$ | $S'^{(4)} = S^{(4)} + F^{(4)} + R_4(S^{(3)}, F^{(3)}, S^{(2)}, F^{(2)})$ | $T'_4 S'^{(4)} = T_4 S^{(4)} + v F^{(4)} + Q_4(S^{(3)}, F^{(3)}, S^{(2)}, F^{(2)})$ |
| etc. | | | |

Tables 1A to 1C include explanations on the above-listed equations for the second order (table 1A), for the third order (table 1B), and for the fourth order (table 1C).

TABLE 1A

| | |
|---|---|
| $S^{(2)} = n W_{In}^{(2)}(0)$ | vergence of the incident wavefront: refractive index on the incidence side multiplied by the second derivative of the vertex depth of the incident wavefront |
| $S'^{(2)} = n' W'_{Out}^{(2)}(0)$ | vergence of the outgoing wavefront: refractive index on the emergence side multiplied by the second derivative of the vertex depth of the outgoing wavefront |

TABLE 1A-continued

| | |
|---|---|
| $F^{(2)} = (n' - n) \overline{S}^{(2)}(0)$ | surface power of the refractive surface: refractive index difference multiplied by the second derivative of the vertex depth of the refractive surface |
| S and A | vergence of the incident wavefront |
| S' and B | vergence of the outgoing wavefront |
| F and D | surface power of the refractive surface |
| $S^{(2)} = n \begin{pmatrix} W_{In}^{(2,0)}(0,0) \\ W_{In}^{(1,1)}(0,0) \\ W_{In}^{(0,2)}(0,0) \end{pmatrix}$ | refractive index on the incidence side multiplied by the power vector of the second derivative of the vertex depth of the incident wavefront |
| $S'^{(2)} = n' \begin{pmatrix} W'^{(2,0)}_{Out}(0,0) \\ W'^{(1,1)}_{Out}(0,0) \\ W'^{(0,2)}_{Out}(0,0) \end{pmatrix}$ | refractive index on the emergence side multiplied by the power vector of the second derivative of the vertex depth of the outgoing wavefront |
| $F^{(2)} = (n' - n) \begin{pmatrix} \overline{S}^{(2,0)}(0,0) \\ \overline{S}^{(1,1)}(0,0) \\ \overline{S}^{(0,2)}(0,0) \end{pmatrix}$ | refractive index difference multiplied by the power vector of the second derivative of the vertex depth of the refractive surface |
| S and A | power vector of the vergence of the incident wavefront |
| S' and B | power vector of the vergence of the outgoing wavefront |
| F and D | power vector of the surface power of the refractive surface |
| $T_2$ | incidence angle-dependent matrix for correction of oblique incidence |
| $T'_2$ | emergence angle-dependent matrix for correction of oblique incidence |
| $v = n' \cos \phi' - n \cos \phi$ | factor for correction of oblique incidence |

TABLE 1B

| | |
|---|---|
| $S^{(3)} = n W_{In}^{(3)}(0)$ | refractive index on the incidence side multiplied by the third derivative of the vertex depth of the incident wavefront |

TABLE 1B-continued

| | |
|---|---|
| $S'^{(3)} = n' W'_{Out}^{(3)}(0)$ | refractive index on the emergence side multiplied by the third derivative of the vertex depth of the outgoing wavefront |
| $F^{(3)} = (n' - n) \overline{S}^{(3)}(0)$ | refractive index difference multiplied by the third derivative of the vertex depth of the refractive surface |
| $S^{(3)} = n \begin{pmatrix} W_{In}^{(3,0)}(0,0) \\ W_{In}^{(2,1)}(0,0) \\ W_{In}^{(1,2)}(0,0) \\ W_{In}^{(0,3)}(0,0) \end{pmatrix}$ | refractive index on the incidence side multiplied by the power vector of the third derivative of the vertex depth of the incident wavefront |

TABLE 1B-continued

| | | |
|---|---|---|
| $S'^{(3)} = n \begin{pmatrix} W'^{(3,0)}_{Out}(0,0) \\ W'^{(2,1)}_{Out}(0,0) \\ W'^{(1,2)}_{Out}(0,0) \\ W'^{(0,3)}_{Out}(0,0) \end{pmatrix}$ | | refractive index on the emergence side multiplied by the power vector of the third derivative of the vertex depth of the outgoing wavefront |
| $F^{(3)} = (n' - n) \begin{pmatrix} \overline{S}^{(3,0)}(0,0) \\ \overline{S}^{(2,1)}(0,0) \\ \overline{S}^{(1,2)}(0,0) \\ \overline{S}^{(0,3)}(0,0) \end{pmatrix}$ | | refractive index difference multiplied by the power vector of the third derivative of the vertex depth of the refractive surface |
| $T_3$ | | incidence angle-dependent matrix for correction of oblique incidence |
| $T'_3$ | | emergence angle-dependent matrix for correction of oblique incidence |
| $v = n'\cos\phi' - n\cos\phi$ | | factor for correction of oblique incidence |
| $R_3 (S^{(2)}, F^{(2)})$ | | additional term that only depends on the lower-order (here $2^{nd}$ order) variables |
| $R_3 (S^{(2)}, F^{(2)})$ | | vectorial additional term that only depends on the lower-order (here $2^{nd}$ order) variables |
| $Q_3 (S^{(2)}, F^{(2)})$ | | vectorial additional term that considers the oblique incidence and only depends on the lower-order (here $2^{nd}$ order) variables |

TABLE 1C

| | |
|---|---|
| $R_4 (S^{(3)}, F^{(3)}, S^{(2)}, F^{(2)})$ | additional term that only depends on the lower-order (here $2^{nd}$ and $3^{rd}$ order) variables |
| $R_4 (S^{(3)}, F^{(3)}, S^{(2)}, F^{(2)})$ | vectorial additional term that only depends on the lower-order (here $2^{nd}$ and $3^{rd}$ order) variables |
| $Q_4 (S^{(3)}, F^{(3)}, S^{(2)}, F^{(2)})$ | vectorial additional term that considers the oblique incidence and only depends on the lower-order (here $2^{nd}$ and $3^{rd}$ order) variables |

The form of the additional terms $R_3(S^{(2)}, F^{(2)})$, $R_3(S^{(2)}, F^{(2)})$, $Q_3(S^{(2)}, F^{(2)})$ is further described in the publication [G. Esser, W. Becken, W. Müller, P. Baumbach, J. Arasa, and D. Uttenweiler, "Derivation of the refraction equations for higher-order aberrations of local wavefronts at oblique incidence", JOSA. A, vol. 27, no. 2, February 2010, pages 218-237]. These terms disappear as soon as the lower-order terms $S^{(2)}, F^{(2)}$ and $S^{(2)}, F^{(2)}$ disappear or are equal to zero.

The further explanations on the $4^{th}$ order, etc., are analogous to the explanations on the $2^{nd}$ and $3^{rd}$ orders.

Surprisingly, it has been shown that the equations describing the second and higher-order wavefront tracing by ordinary refractive boundary surfaces can be modified in a comparatively simple way, so that also diffractive optical elements or diffraction gratings can be taken into account. Here, either the passage of light through an isolated diffraction grating or the passage through a directly consecutive combination of a diffraction grating or a refractive boundary surface can be described.

Moreover, it has turned out that a generally vectorial variable $PK^{(k)}$, $k=2, 3, 4, \ldots$, hereinafter referred to as a phase curvature (for $k=2$) or as phase derivatives (for $k>2$), can be assigned to any arbitrary, non-rotationally symmetric diffraction grating even under arbitrary, oblique-angled ray incidence conditions, so that the corresponding BAD equation and the higher-order equations for refractive surfaces substantially only have to be extended additively by the additional term $PK^{(k)}$, $k=2, 3, 4, \ldots$ in order to correctly describe the vergences for the wavefront passage in the presence of a non-rotationally symmetric diffraction grating.

In other words, however asymmetric a situation may be for which the wavefront tracing could be described precisely for purely refractive surfaces, it is sufficient to extend the corresponding equation substantially only by an additive additional term PK in order to also describe the diffraction grating correctly.

Further, it has been found that the vergence of the outgoing wavefront is independent of the order in which the refractive surface and the diffraction grating succeed one another.

In the case of a second-order wavefront tracing (i.e. for $k=2$) for a rotationally symmetric diffraction grating and with a vertical, or perpendicular, incidence of rays, equation (101) is extended additively by the additional term $PK^{(2)}$ in order to correctly describe the vergences for the wavefront passage also in the presence of a diffraction grating:

$$B = A + D + PK^{(2)}. \tag{103}$$

However, equation (101) is only valid exactly for the case that the ray impinges vertically, or perpendicularly, on the refractive surface and that the incident wavefront and the refractive surface are rotationally symmetric. But equation (101) is still a good approximation also for deviations from these prerequisites. Analogously, equation (103) is a good approximation in the presence of a diffraction grating.

In the case of a second-order wavefront tracing (i.e. for $k=2$) for a non-rotationally symmetric diffraction grating and with a vertical, or perpendicular, incidence of rays, the diffraction grating can be assigned a vectorial variable $PK^{(2)}$, so that the corresponding vectorial BAD equation only has to be extended additively by the vectorial additional term $PK^{(2)}$ in order to correctly describe the vergences for the wavefront passage in the presence of a non-rotationally symmetric diffraction grating. In this case, it holds that $$B = A + D + PK^{(2)}. \tag{104}$$

As will be explained in detail in the following, a generally vectorial variable $PK^{(k)}$ can be assigned to any arbitrary, non-rotationally symmetric diffraction grating even under arbitrary, oblique-angled ray incidence conditions, so that the corresponding general BAD equation and the higher-order equations for the wavefront tracing through refractive surfaces substantially only have to be extended additively by the additional term $PK^{(k)}$ ($PK^{(2)}$, $PK^{(3)}PK^{(4)}$, ...) in order to correctly describe the vergences for the wavefront passage in the presence of a non-rotationally symmetric diffraction grating.

Moreover, is has been shown that the components of the additive additional term $PK^{(k)}$ can be described by the vector of the second or higher-order derivatives of a phase function $\Psi(\overline{x},\overline{y})$ with respect to the coordinates $\overline{x},\overline{y}$ tangentially to the refractive surface (base surface). It holds for the additive second-order additional term that:

$$PK^{(2)} = -\begin{pmatrix} \Psi^{(2,0)}(0,0) \\ \Psi^{(1,1)}(0,0) \\ \Psi^{(0,2)}(0,0) \end{pmatrix} = -\begin{pmatrix} \frac{\partial^2 \Psi(\overline{x},\overline{y})}{\partial \overline{x}^2} \\ \frac{\partial^2 \Psi(\overline{x},\overline{y})}{\partial \overline{x} \partial \overline{y}} \\ \frac{\partial^2 \Psi(\overline{x},\overline{y})}{\partial \overline{y}^2} \end{pmatrix}\Bigg|_{(\overline{x},\overline{y})=(0,0)} \tag{105}$$

For this reason, the additive second-order additional term $PK^{(2)}$ is also referred to as a "phase curvature".

The phase function $\Psi(\bar{x},\bar{y})$ represents the optical path length difference (optical path difference or OPD), which is introduced by the diffraction grating, as a function of the coordinates $\bar{x},\bar{y}$ tangentially to the refractive surface. The description of a diffraction grating by the phase function $\Psi(\bar{x}, \bar{y})$ allows determining the additive additional term $PK^{(k)}$ ($PK^{(2)}, PK^{(3)}, PK^{(4)}, \ldots$) constructively. Put differently, it is suggested that a phase function $\Psi(\bar{x},\bar{y})$ be used to describe an arbitrary diffraction grating, the additive additional term $PK^{(k)}$ ($PK^{(2)}, PK^{(3)}, PK^{(4)}, \ldots$) being determined by the vector of the second and higher-order derivatives of the phase function with respect to the coordinates $\bar{x},\bar{y}$ tangentially to the refractive surface (cf. equation (105) for k=2).

Table 2 summarizes the equations and wavefront equations (in power vector form) for the wavefront tracing in the case of a passage through a refractive boundary surface (base surface), to which a phase-modifying optical element is applied in addition. Tables 2A and 2B include explanations on the $2^{nd}$ order (table 2A) and $3^{rd}$ order (table 2B) equations listed in table 1.

TABLE 2

| | vertical incidence + rotational symmetry | vertical incidence without rotational symmetry | no symmetry |
|---|---|---|---|
| $2^{nd}$ order | $S'^{(2)} = S^{(2)} + F^{(2)} - \Psi^{(2)}$<br>alternative notation:<br>$S' = S + F + PK^{(2)}$<br>$B = A + D + PK^{(2)}$ | $S'^{(2)} = S^{(2)} + F^{(2)} - \Psi^{(2)}$<br>alternative notation:<br>$S' = S + F + PK^{(2)}$<br>$B = A + D + PK^{(2)}$ | $T'_2 S'^{(2)} = T_2 S^{(2)} + vF^{(2)} - \Psi^{(2)}$<br>alternative notation:<br>$T'_2 S'^{(2)} = T_2 S^{(2)} + vF^{(2)} + PK^{(2)}$ |
| $3^{rd}$ order | $S'^{(3)} = S^{(3)} + F^{(3)} - \Psi^{(3)} + R_3(S^{(2)}, F^{(2)})$<br>alternative notation:<br>$PK^{(3)} = -\Psi^{(3)}$ | $S'^{(3)} = S^{(3)} + F^{(3)} - \Psi^{(3)} + R_3(S^{(2)}, F^{(2)})$<br>alternative notation:<br>$PK^{(3)} = -\Psi^{(3)}$ | $T'_3 S'^{(3)} = T_3 S^{(3)} + vF^{(3)} - \Psi^{(3)} + Q_3(S^{(2)}, F^{(2)})$<br>alternative notation:<br>$PK^{(3)} = -\Psi^{(3)}$ |
| $4^{th}$ order | $S'^{(4)} = S^{(4)} + F^{(4)} - \Psi^{(4)} + R_4(S^{(3)}, F^{(3)}, S^{(2)}, F^{(2)})$<br>alternative notation:<br>$PK^{(4)} = -\Psi^{(4)}$ | $S'^{(4)} = S^{(4)} + F^{(4)} - \Psi^{(3)} + R_4(S^{(3)}, F^{(3)}, S^{(2)}, F^{(2)})$<br>alternative notation:<br>$PK^{(4)} = -\Psi^{(4)}$ | $T'_4 S'^{(4)} = T_4 S^{(4)} + vF^{(4)} - \Psi^{(4)} + Q_4(S^{(3)}, F^{(3)}, S^{(2)}, F^{(2)})$<br>alternative notation:<br>$PK^{(4)} = -\Psi^{(4)}$ | etc.

TABLE 2A

| | |
|---|---|
| $\Psi^{(2)} = \Psi^{(2)}(0)$ | second derivative of the phase function |
| $PK^{(2)} = -\Psi^{(2)}(0)$ | phase curvature, i.e. negative second derivative of the phase function |
| $\Psi^{(2)} = \begin{pmatrix} \Psi^{(2,0)}(0,0) \\ \Psi^{(1,1)}(0,0) \\ \Psi^{(0,2)}(0,0) \end{pmatrix}$ | power vector of the second derivatives of the phase function |
| $PK^{(2)} = -\Psi^{(2)}(0,0)$ | power vector of the phase curvature, i.e. the negative second derivatives of the phase function |

TABLE 2B

| | |
|---|---|
| $\Psi^{(3)} = \Psi^{(3)}(0)$ | third derivative of the phase function |
| $PK^{(3)} = -\Psi^{(3)}(0)$ | additional term according to the invention, determined by negative third derivative of the phase function |
| $\Psi^{(3)} = \begin{pmatrix} \Psi^{(3,0)}(0,0) \\ \Psi^{(2,1)}(0,0) \\ \Psi^{(1,2)}(0,0) \\ \Psi^{(0,3)}(0,0) \end{pmatrix}$ | power vector of the third derivatives of the phase function |

TABLE 2B-continued

| | |
|---|---|
| $PK^{(3)} = -\Psi^{(3)}(0,0)$ | vectorial additional term according to the invention, determined by the power vector of the negative third derivatives of the phase function |

The equations for the $4^{th}$ order and all higher orders are made up analogously.

The coordinate system $\bar{x}, \bar{y}, \bar{z}$ is a local coordinate system, which serves to describe the passage of a ray through a boundary surface, wherein it holds at the penetration point of the main ray with the boundary surface that $(\bar{x}, \bar{y}, \bar{z})=(0, 0, 0)$, and wherein the $\bar{z}$ axis is perpendicular to the base surface. A special possible choice of such a local system is to require that the incident ray be e.g. in the $\bar{x}-\bar{z}$ plane or in the $\bar{y}-\bar{z}$ plane. In general, however, this condition does not necessarily have to be satisfied. The use of local coordinate systems is known from WO 2008/089999 A1, for example, and is used in second-order wavefront tracing through surfaces without diffraction gratings. Typically, use is made of as many local systems as main rays are to be calculated. Further, a global coordinate system can be used.

Moreover, it has been found that a connection can be established between the grating lines of the diffractive optical element or the diffraction grating and the phase function $\Psi(\bar{x}, \bar{y})$, which is based on the fact that the grating lines lie on curves with $\Psi(\bar{x},\bar{y})$=const. The determination of the phase function $\Psi(\bar{x},\bar{y})$ on the basis of parameters of the diffraction grating will be described in detail in the following.

Moreover, it has been found that different from a refraction at a purely refractive boundary surface (such as described in WO 2008 089999 A1), the incident main ray, the outgoing main ray, and the normal vector of the refractive surface generally will not have to be in one and the same plane any more if a diffraction grating is present.

In the simplest case of a refractive, homogeneous boundary surface between two media with the refractive indices n and n' without diffractive optical elements or diffraction gratings, the ray deviation is described by the law of refraction n' sin $\phi'$−n sin $\phi$=0, where $\phi$ is the angle of incidence and $\phi'$ is the angle of emergence.

FIG. 18 schematically illustrates the ray path upon diffraction on a boundary surface 120 with a diffraction grating 122 in a special simple case in which it is possible to describe the ray deviation by a closed law. This law can be understood to be a modification of this law of refraction. This case is characterized in that the refractive surface 120 is a plane and that the diffraction grating 122 is an irregularity of this surface 120, which is translation-invariant perpendicular to the plane of incidence 124 and equidistant with period d in the direction of the plane of refraction (the plane of the refractive surface 120) (cf. FIG. 18). The irregularity can be a blazed grating, a rectangular grating, an alternation of translucent and opaque zones, or any other deviation from the homogeneous, plane, translucent, refractive surface. In this simple case, an incident monochromatic ray 102, which belongs to light with the wavelength λ, is split into many individual rays 108-m, which belong to the different diffraction order m, m= . . . , −2, −1, 0, 1, 2, . . . , by diffraction. The diffraction order m can be selected arbitrarily, but fixedly, and the situation for the ray pertaining to the diffraction order m can be described in an isolated manner, i.e. irrespective of the possible other diffraction orders, in the following. For a ray pertaining to the diffraction order m, the modified law of refraction applies n' sin φ'n sin φ=mλ/d, where n and n' designate the refractive index of the material in front of and behind the boundary surface 120, φ is the angle of incidence, and φ' is the angle of emergence.

For every more general case, e.g. for rays being incident obliquely to the grating lines, for a non-equidistant grating and/or for a grating with curved grating lines and/or for a curved surface, no comprehensive laws on ray deviation and wavefront calculation have been known so far. In order to be able to calculate or optimize an optical element with arbitrary, in particular aspherical surfaces and at least one diffraction grating in the wearing position taking the second-order aberrations (e.g. refractive power and astigmatism) and optionally higher-order aberrations (e.g. coma or spherical aberration) into consideration, it is advantageous to also be able to perform exact wavefront tracing also for the general case.

In the following, the principles of ray and wavefront tracing in the general case of an optical element or an optical system (e.g. a spectacle lens) with a diffraction grating will be described in more detail.

Coordinate Systems

First of all, variables capable of describing a boundary surface including at least one diffraction grating as generally as possible will be introduced. To this end, by analogy with the case of purely refractive surfaces, two types of coordinates or coordinate systems are used in principle.

One type is global coordinates $\bar{x}^0$, $\bar{y}^0$, $\bar{z}^0$, which serve to describe the base surface (i.e. the purely refractive surface without the diffraction grating by its vertex depth $\bar{z}^0(\bar{x}^0,\bar{y}^0)$. Here, the possibly existing vertex depth of the diffraction grating is not added to the vertex depth of the base surface. Instead, the diffraction grating itself is described by a separate property $h(\bar{x}^0,\bar{y}^0)$. Here, $h(\bar{x}^0,\bar{y}^0)$ can play the role of an additional vertex depth, so that the real (microscopic) physical vertex depth of the base surface is determined by $\bar{z}_m^0(\bar{x}^0,\bar{y}^0) = \bar{z}^0(\bar{x}^0,\bar{y}^0) + h(\bar{x}^0,\bar{y}^0)$. However, it is possible for $h(\bar{x}^0,\bar{y}^0)$ to play the role of a transmission property or another property of the POE.

The other type of coordinates is—as described above—local coordinates $\bar{x}$, $\bar{y}$, $\bar{z}$, which serve to describe the passage of a ray through the boundary surface such that $(\bar{x}, \bar{y}, \bar{z})=(0, 0, 0)$ applies at the penetration point and that the $\bar{z}$ axis is perpendicular to the base surface there. A special possible choice of such a local system is to require that the incident ray be e.g. in the $\bar{x}$-$\bar{y}$ plane or in the $\bar{y}$-$\bar{t}$ plane, for example. In general, however, this condition does not necessarily have to be satisfied. The use of local systems is known from WO 2008/089999 A1, for example, and is used in second-order wavefront tracing through surfaces without a diffraction grating.

Typically, use is made of only a global coordinate system, but of as many local systems as main rays are to be calculated.

FIG. 18A illustrates the position of the coordinate system x, y, z of the incident wavefront with respect to the coordinate system $\bar{x}$, $\bar{y}$, $\bar{z}$ of the refractive surface (base surface), expressed by the angles $\phi_x$, $\phi_y$, $\phi$, and $\chi$.

For the sake of simplicity, FIG. 18A only shows the coordinate system of the incident wavefront and the coordinate system of the refractive surface. The coordinate system x', y', z' of the outgoing wavefront can be specified by analogy with the coordinate system of the incident wavefront. Moreover, reference is made to FIG. 1 of the publication [G. Esser, W. Becken, W. Müller, P. Baumbach, J. Arasa, and D. Uttenweiler, "Derivation of the refraction equations for higher-order aberrations of local wavefronts at oblique incidence", JOSA. A, vol. 27, no. 2, February 2010, pages 218-237], which shows a two-dimensional representation of the corresponding mutual position for all three coordinate systems.

Description of a Diffraction Grating by the Phase Function $\Psi(\bar{x},\bar{y})$ The phase function $\Psi(\bar{x},\bar{y})$ represents the optical path length difference (optical path difference or OPD), which is introduced by the diffraction grating, as a function of the coordinates $\bar{x},\bar{y}$ tangentially to the refractive surface (base surface). The phase function $\Psi(\bar{x},\bar{y})$ can be determined by means of the grating lines. Conversely, with a predetermined phase function, it is possible to determine the grating lines of the corresponding diffraction grating.

In the simplest case of a constant, equidistant diffraction grating 122 on a plane surface 120 (cf. e.g. FIG. 18 and FIG. 19), which is described in global coordinates by $\bar{z}^0(\bar{x}^0,\bar{y}^0) = a_x \bar{x}^0 + a_y \bar{y}^0 + t$, it is possible to differentiate between a single-periodic and a double-periodic grating.

In a single-periodic grating, a period vector $d_1$ exists, so that $$h(\bar{r}^0 + d_1) = h(\bar{r}^0) \quad (106a)$$

holds for all points $\bar{r}^0 = (\bar{x}^0, \bar{y}^0)$. Moreover, there exists a direction with translation invariance, i.e. a vector v with $$h(\bar{r}^0 + \alpha v) = h(\bar{r}^0) \quad (106b)$$

for all α.

In such a case, the grating lines 112a face toward v, whereas $d_1$ does not necessarily have to describe the distance between the grating lines 122a, since $d_1$ does not necessarily have to be perpendicular to v. In such a case, the vector $d_1$ can be replaced by the vector with the components $$d = \begin{pmatrix} d_x \\ d_y \end{pmatrix},$$

which is defined by $$d = d_1 - (d_1 \cdot v)v \quad (107)$$

This vector d is perpendicular to v and it holds that $$h(\bar{r}^0 + d) = h(\bar{r}^0 + d_1 - (d_1 \cdot v)v) \quad (108)$$
$$= h(\bar{r}^0 + d_1 - \alpha v)$$
$$= h(\bar{r}^0 + d_1)$$
$$= h(\bar{r}^0)$$

so that the vector d is also a period vector. However, in contrast to $d_1$, the vector d also indicates the distance between two grating lines (cf. FIG. 19). The grating period is determined by the amount d=|d|.

In a single-periodic grating 122, as shown in FIG. 19, for example, two further period vectors of practical importance exist in addition. They depend on the coordinate system and are determined by the vectors $$\delta_x = \begin{pmatrix} \delta_x \\ 0 \end{pmatrix}, \delta_y = \begin{pmatrix} 0 \\ \delta_y \end{pmatrix}, \tag{109}$$

which face toward the coordinate axes (cf. FIG. 19). The connection between d and the vectors $\delta_x, \delta_y$ is determined by:

$$\delta_x = \frac{|d|^2}{d_x}, \delta_y = \frac{|d|^2}{d_y}, \tag{110a}$$

and $$d_x = \frac{\delta_x \delta_y^2}{\delta_x^2 + \delta_y^2}, d_y = \frac{\delta_y \delta_x^2}{\delta_x^2 + \delta_y^2} \tag{110b}$$

In a double-periodic grating 122, two period vectors $d_1, d_2$ with $$h(\bar{r}^0 + d_1) = h(\bar{r}_S)$$

$$h(\bar{r}^0 + d_2) = h(\bar{r}_S). \tag{111}$$

exist. Double-periodic within this scope means that there is no translation invariance in any direction, i.e. there is no vector v with $h(\bar{r}^0 + \alpha v) = h(\bar{r}_S)$ for all $\alpha$.

From an inspection of the wave optics, one can say that a plane monochromatic wave of the wavelength $\lambda$, which is incident on a single- or double-periodic grating in an oblique manner, leads to a direction-dependent intensity distribution on the side of emergence due to interference. This distribution can be represented as a product of two direction-dependent factors, wherein said one factor (the form factor) is only determined by the form of the diffraction grating within the grating period, and the second factor (the grating or diffraction factor) is determined only by the grating periodicity. The second factor takes on a maximum in each of such directions in which the path difference between two points of the wave field on the boundary surface, which are displaced by one grating period, is an integer multiple of the wavelength of the light on the side of emergence.

If, in the image of the geometric ray optics, the incident wave field is assigned the directional vector $$N = \begin{pmatrix} \sin\varphi_x \\ \sin\varphi_y \\ \sqrt{1 - \sin^2\varphi_x - \sin^2\varphi_y} \end{pmatrix} \tag{112a}$$

and, on the side of emergence of each direction in which a maximum of the grating factor exists, a directional vector of the form $$N' = \begin{pmatrix} \sin\varphi'_x \\ \sin\varphi'_y \\ \sqrt{1 - \sin^2\varphi'_x - \sin^2\varphi'_y} \end{pmatrix} \tag{112b}$$

then the rays will be described by the laws $$n'\sin\varphi'_x - n\sin\varphi_x = \frac{m_x \lambda}{\delta_x} \tag{113}$$

$$n'\sin\varphi'_y - n\sin\varphi_y = \frac{m_y \lambda}{\delta_y}$$

where $m_x = \ldots, -3, -2, -1, 0, 1, 2, 3, \ldots$ and $m_y = \ldots, -3, -2, -1, 0, 1, 2, 3, \ldots$ are integers. The laws (113) can be considered to be the extended laws of refraction in the presence of a diffraction grating. In particular, the case $m_x = 0, m_y = 0$, i.e. the zeroth diffraction order, describes the situation without diffraction elements.

In a double-periodic diffraction element, all integers $m_x, m_y$ can be found independent of each other. In a single-periodic grating, only diffraction orders $m_x = \sigma \cdot m_y$ of the same amount can be found, where $\sigma = +1$ applies to the case that the grating lines decrease for increasing values of $\bar{x}^0$ (such as in FIG. 19, $\partial \bar{y}^0 / \partial \bar{x}^0 < 0$) and $\sigma = -1$ applies in the case of increasing grating lines ($\partial \bar{y}^0 / \partial \bar{x}^0 > 0$).

In the following, single-periodic diffraction gratings ($m := m_x = \sigma \cdot m_y$) will be discussed. However, all calculations can be modified accordingly for the case of double-periodic diffraction gratings.

The equation (113) with $m := m_x = \sigma \cdot m_y$ on the right side can be interpreted such that two rays, which are refracted at two neighboring grating lines, have a non-vanishing path difference, i.e. a phase difference proportional to m and proportional to $\lambda$. Thus, there is the possibility of characterizing the course of the grating lines, namely on the one hand by grating properties that can be measured (e.g. with a microscope) and are based on the vector d, and on the other hand by the abstract property of introducing an additional location-dependent path difference into the ray path. In the second case, the course of the grating lines is determined by the difference between the values of a phase function $\Psi^0(\bar{x}^0, \bar{y}^0, \lambda, m)$ which in addition to the coordinates $\bar{x}^0, \bar{y}$ also depends on the wavelength $\lambda$ and on the diffraction order m. Since this phase function is in any case proportional to $\lambda$ and m, these factors can be split off. Instead of the phase function $\Psi^0(\bar{x}^0, \bar{y}; \lambda, m)$, the phase function $\psi^0(\bar{x}^0, \bar{y}^0)$ can be used, where $$\Psi^0(\bar{x}^0, \bar{y}; \lambda, m) = m\lambda \cdot \psi^0(\bar{x}^0, \bar{y}^0). \tag{114}$$

FIG. 20 shows grating lines of a diffraction grating 122 on a plane boundary surface 120, and FIG. 21 shows grating lines of a diffraction grating 122 on a curved boundary surface 122.

Except for the simplest case of a constant, equidistant grating on a plane surface, the grating lines extend in a different direction at each point of an optical element in the general case, as is shown in FIG. 20 and FIG. 21, for example. Moreover, their distance is generally different at each point (cf. e.g. FIG. 20). Strict periodicity is not present any more in principle. Consequently, the period vector d cannot be defined any more. Therefore, it is suggested replacing the period vector d by a coordinate-dependent function $d(\bar{x}^0, \bar{y}^0)$ or, put differently, by a vector field $d(\bar{x}^0, \bar{y}^0)$ defined as the tangential vector field with respect to the trajectories 126, which are orthogonal to the grating lines 122a.

In addition, in the general case of a curved base surface 120, as shown in FIG. 21, it has be to taken into account that the grating 122 is specified in global coordinates $\bar{x}^0, \bar{y}^0$ on the one hand, but local properties are relevant for an effect on the ray passage on the other hand, such as the local grating distance the grating 122 has along the tilted axes of a local coordinate system $\bar{x}^0, \bar{y}^0$.

Instead of $d(\bar{x}^0, \bar{y}^0)$, the effect of the grating 122 can be described by the phase function $\psi^0(\bar{x}^0, \bar{y}^0)$ in this general case as well.

The phase function of a diffraction grating $\psi^0(\bar{x}^0, \bar{y}^0)$ is more suitable for wavefront tracing than the vector field $d(\bar{x}^0, \bar{y}^0)$, but it cannot be measured directly. In order to perform a wavefront tracing based on the phase function $\psi^0(\bar{x}^0, \bar{y}^0)$, a method for determining the transition between the functions $d(\bar{x}^0, \bar{y}^0)$ and $\psi^0(\bar{x}^0, \bar{y}^0)$ in both directions (i.e. $d(\bar{x}^0, \bar{y}^0) \Leftrightarrow \psi^0(\bar{x}^0, \bar{y}^0)$) is proposed. The flow diagram shown in FIG. 22 illustrates the transition between the vector field $d(\bar{x}^0, \bar{y}^0)$ and the phase function $\psi^0(\bar{x}^0, \bar{y}^0)$.

In particular, in a predetermined grating, which can be known e.g. by measuring (cf. block 130 in FIG. 22) the microscope image of a grating projection or by a projection of another measurable property of the grating (e.g. a transmission property), the phase function $\psi^0(\bar{x}^0, \bar{y}^0)$ can be obtained in the global coordinate system (cf. block 132 in FIG. 22) by counting the grating lines and interpreting them as curves $\psi^0(\bar{x}^0, \bar{y}^0) = $ const. For the curves, the values $\psi^0(\bar{x}^0, \bar{y}^0) = 0$, $\psi^0(\bar{x}^0, \bar{y}^0) = 1$, $\psi^0(\bar{x}^0, \bar{y}^0) = 2$, etc., are assumed successively (cf. FIG. 22). For all points) $(\bar{x}^0, \bar{y}^0)$ not on but between the grating lines, the values of the phase function can be determined by suitable interpolation. Conversely, if the phase function $\psi^0(\bar{x}^0, \bar{y}^0)$ is known, the grating lines can be determined by calculating the curves $\psi^0(\bar{x}^0, \bar{y}^0)$ const. with $\psi^0(\bar{x}^0, \bar{y}^0) = 0$, $\psi^0(\bar{x}^0, \bar{y}^0) = 1$, $\psi^0(\bar{x}^0, \bar{y}^0) = 2$, etc.

After a local coordinate system $(\bar{x}, \bar{y}, \bar{z})$ has been set, the phase function relevant for local ray tracing is the function $$\psi(\bar{x}, \bar{y}) = \psi^0(\bar{x}^0(\bar{x}, \bar{y}), \bar{y}^0(\bar{x}, \bar{y})), \tag{115}$$

(cf. block 134 in FIG. 22), where the connections $\bar{x}^0(\bar{x}, \bar{y}), \bar{y}^0(\bar{x}, \bar{y})$ result from the transformation from the global coordinate system to the local coordinate system (for the respective penetration point). By setting (cf. block 136 in FIG. 22)

$$\Psi(\bar{x}, \bar{y}; \lambda, m) = m\lambda \cdot \psi(\bar{x}, \bar{y}) \tag{116}$$

analogously to equation (114), the local phase function can be obtained taking the diffraction order and the wavelength into account.

Wavefront Tracing in the Case of an Optical Element/System Comprising at Least One Diffraction Grating
First-Order Properties (Ray Deviation)

For the tracing of rays described by the vectors N, N' in the local system (cf. equations (112a) and (112b)), the wavefront tracing yields the laws for the ray deviation $$n'\sin\varphi'_x - n\sin\varphi_x = \frac{\partial}{\partial \bar{x}}\Psi(\bar{x}, \bar{y}; \lambda, m) \tag{117}$$

$$n'\sin\varphi'_y - n\sin\varphi_y = \frac{\partial}{\partial \bar{y}}\Psi(\bar{x}, \bar{y}; \lambda, m).$$

Example 1

In the simplest case of a constant equidistant grating on a plane surface, which corresponds e.g. to FIG. 19, the phase function in the global system is determined by $$\psi^0(\bar{x}^0, \bar{y}^0) = \frac{\bar{x}^0}{\delta_x} + \frac{\bar{y}^0}{\delta_y} + \psi_0 \tag{118}$$

where $\psi_0$ is a constant. Since the base surface is plane, the local system can be selected identically with the global system, so that $\psi(\bar{x}, \bar{y}) = \psi^0(\bar{x}, \bar{y})$. Since in this case it holds that $$\frac{\partial}{\partial \bar{x}}\Psi(\bar{x}, \bar{y}; \lambda, m) = \frac{m\lambda}{\delta_x} \tag{119}$$

$$\frac{\partial}{\partial \bar{y}}\Psi(\bar{x}, \bar{y}; \lambda, m) = \frac{m\lambda}{\delta_y}$$

equation (117) leads exactly to the special case of equation (113).

Example 2

If, for an arbitrary grating, the local system $\bar{x}, \bar{y}, \bar{z}$ is selected at the penetration point such that the incident ray is in the $\bar{y}$–$\bar{z}$ plane, then $\phi_x = 0$. If the phase function in this local system is determined by $\Psi(\bar{x}, \bar{y}; \lambda, m)$, then the laws for ray deviation according to equation (117) will read $$n'\sin\varphi'_x = \frac{\partial}{\partial \bar{x}}\Psi(\bar{x}, \bar{y}; \lambda, m) \tag{120}$$

$$n'\sin\varphi'_y - n\sin\varphi_y = \frac{\partial}{\partial \bar{y}}\Psi(\bar{x}, \bar{y}; \lambda, m).$$

If $\partial\Psi(\bar{x}, \bar{y}; \lambda, m)/\partial\bar{x} \neq 0$, then $\phi'_x \neq 0$. This means that if the grating lines are not perpendicular to the plane of incidence—a ray deviation to the side will take place and the plane of emergence will not coincide with the plane of incidence (other than in the case of a mere refraction). If, conversely, $\partial\Psi(\bar{x}, \bar{y}; \lambda, m)/\partial\bar{x} = 0$, then $\phi'_x = 0$ and the ray deviation will take place only in the $\bar{y}$–$\bar{z}$ plane.

Second-Order Properties (Curvature Properties of the Wavefront)

In order to describe wavefront properties, it is suggested that the ray tracing of a main ray passing through an evaluation point of the optical element be performed first. Thus, the main ray differs from possible neighboring rays that pass off the evaluation point. In the exemplary case of a spectacle lens, a main ray is particularly a light ray that, starting from the object point, passes through the center of the entrance pupil. Upon eye movements, the entrance pupil coincides with the ocular center of rotation, and not necessarily with the physical pupil of the eye. The angles $\phi_x, \phi_y, \phi'_x, \phi'_y$, and thus the vectors N,N' in equations (112a) and (112b) are known after this step.

In addition, it is suggested that except for a local coordinate system, which serves to describe the base surface and in which also the incident and the outgoing rays are described, yet further coordinate systems be introduced as well.

The coordinate system (x, y, z) serves to describe the incident wavefront and is directed such that the z axis is directed in the direction of light along the incident ray direction N and that the origin $(x, y, z) = (0, 0, 0)$ coincides with the point $(\bar{x}, \bar{y}, \bar{z}) = (0, 0, 0)$.

The coordinate system (x', y', z') serves to describe the outgoing wavefront and is directed such that the z' axis is directed in the direction of light along the outgoing ray direction N' and that the origin (x', y', z')=(0, 0, 0) also coincides with the point $(\bar{x}, \bar{y}, \bar{z})=(0, 0, 0)$.

The coordinates of a spatial vector can be described either by the variable $v=(v_x, v_y, v_z)$ in the coordinate system $(x, y, z)$, by the variable $v'=(v'_x, v'_y, v'_z)$ in the coordinate system $(x', y', z')$, or by the variable $\bar{v}=(\bar{v}_x, \bar{v}_y, \bar{v}_z)$ in the coordinate system $(\bar{x}, \bar{y}, \bar{z})$. The mutual position of the coordinate systems depends on the rays and is only set except for the degrees of freedom, which corresponds to a rotation of the system $(x, y, z)$ about the incident ray and to a second independent rotation of the system $(x', y', z')$ about the outgoing ray.

Preferably, the mutual position of the coordinate systems is set by $$v = R \cdot \bar{v} \qquad (121)$$
$$v' = R' \cdot \bar{v}$$
$$R = R_z(\chi) R_x(\varphi) R_z(-\chi)$$
$$R' = R_z(\chi') R_x(\varphi') R_z(-\chi')$$

where $$R_x(\varepsilon) = \begin{pmatrix} 1 & 0 & 0 \\ 0 & \cos\varepsilon & -\sin\varepsilon \\ 0 & \sin\varepsilon & \cos\varepsilon \end{pmatrix}, \qquad (122)$$

$$R_y(\varepsilon) = \begin{pmatrix} \cos\varepsilon & 0 & \sin\varepsilon \\ 0 & 1 & 0 \\ -\sin\varepsilon & 0 & \cos\varepsilon \end{pmatrix},$$

$$R_z(\varepsilon) = \begin{pmatrix} \cos\varepsilon & -\sin\varepsilon & 0 \\ \sin\varepsilon & \cos\varepsilon & 0 \\ 0 & 0 & 1 \end{pmatrix}.$$

The auxiliary angles $\varphi, \varphi', \chi, \chi'$ in equation (121) must be expressed by the variables $\varphi_x, \varphi_y, \varphi'_x, \varphi'_y$ known before the wavefront tracing. The matrices R, R' are constructed such that $\varphi, \varphi'$ are the angles of incidence and emergence with respect to the surface normal, and it holds that $$\cos\varphi = \sqrt{1 - \sin^2\varphi_x - \sin^2\varphi_y} \qquad (123)$$
$$\sin\varphi = \sqrt{\sin^2\varphi_x + \sin^2\varphi_y},$$
$$\cos\varphi' = \sqrt{1 - \sin^2\varphi'_x - \sin^2\varphi'_y}$$
$$\sin\varphi' = \sqrt{\sin^2\varphi'_x + \sin^2\varphi'_y},$$

and $$\sin\chi = \frac{-\sin\varphi_x}{\sqrt{\sin^2\varphi_x + \sin^2\varphi_y}} \qquad (124)$$
$$\cos\chi = \frac{\sin\varphi_y}{\sqrt{\sin^2\varphi_x + \sin^2\varphi_y}},$$
$$\sin\chi' = \frac{-\sin\varphi'_x}{\sqrt{\sin^2\varphi'_x + \sin^2\varphi'_y}}$$
$$\cos\chi' = \frac{\sin\varphi'_y}{\sqrt{\sin^2\varphi'_x + \sin^2\varphi'_y}}.$$

From the above equations (123) and (124), it follows that $$\tan\chi = -\frac{\sin\varphi_x}{\sin\varphi_y}, \qquad (126)$$

$$\tan\chi' = -\frac{\sin\varphi'_x}{\sin\varphi'_y}.$$

If the incident wavefront in the local coordinate system $(x, y, z)$ is determined by $W_{In}(x,y)$ the refractive base surface in the system $(\bar{x}, \bar{y}, \bar{z})$ will be determined by $\bar{S}(\bar{x},\bar{y})$, and the sought-for outgoing wavefront in the system $(x', y', z')$ is determined by $W'_{Out}(x',y')$ then the following formulae (127) and (128) will describe the dependence of the second local derivatives of the wavefronts (i.e. the incident and outgoing wavefronts), of the base surface, and of the phase $\Psi(\bar{x},\bar{y};\lambda,m)$.

$$n' R_2(\chi') C'_2 R_2(-\chi') \begin{pmatrix} W'^{(2,0)}_{Out}(0,0) \\ W'^{(1,1)}_{Out}(0,0) \\ W'^{(0,2)}_{Out}(0,0) \end{pmatrix} - \qquad (127)$$

$$n R_2(\chi) C_2 R_2(-\chi) \begin{pmatrix} W^{(2,0)}_{In}(0,0) \\ W^{(1,1)}_{In}(0,0) \\ W^{(0,2)}_{In}(0,0) \end{pmatrix} =$$

$$v \begin{pmatrix} \bar{S}^{(2,0)}(0,0) \\ \bar{S}^{(1,1)}(0,0) \\ \bar{S}^{(0,2)}(0,0) \end{pmatrix} - \begin{pmatrix} \Psi^{(2,0)}(0,0) \\ \Psi^{(1,1)}(0,0) \\ \Psi^{(0,2)}(0,0) \end{pmatrix},$$

where $$v = n'\cos\varphi' - n\cos\varphi \qquad (128)$$
$$= n'\sqrt{1 - \sin^2\varphi'_x - \sin^2\varphi'_y} - n\sqrt{1 - \sin^2\varphi_x - \sin^2\varphi_y}$$

is satisfied. The phase $\Psi(\bar{x},\bar{y}; \lambda, m)$ is the phase defined in equation (116).

The individual terms of equation (127) correspond to the terms of the BAD equation $$B - A = D + PK^{(2)}.$$

In equation (127), the superscript symbols represent derivatives. It holds for an arbitrary function $h(x,y)$ that:

$$h^{(k-m,m)}(0,0) := \partial^k / \partial x^{k-m} \partial y^m h(x,y)|_{x=0,y=0}. \qquad (129)$$

The function $h(x, y)$ in the formula (129) optionally plays the role of the functions $W_{In}(x,y)$, $W'_{Out}(x',y')$, $\bar{S}(\bar{x},\bar{y})$ and $\Psi(\bar{x},\bar{y};\lambda,m)$, wherein in the case of $\Psi(\bar{x},\bar{y};\lambda,m)$, the derivatives refer to $\bar{x},\bar{y}$. The matrices $C_2$ and $C'_2$ are defined as in the purely refractive case (cf. e.g. G. Esser, W. Becken, W. Müller, P. Baumbach, J. Arasa and D. Uttenweiler, "Derivation of the refraction equations for higher-order aberrations of local wavefronts at oblique incidence", J. Opt. Soc. Am. A/Vol. 27, No. 2/February 2010):

$$C_2 = \begin{pmatrix} 1 & 0 & 0 \\ 0 & \cos\varphi & 0 \\ 0 & 0 & \cos^2\varphi \end{pmatrix}, \qquad (130)$$

$$C'_2 = \begin{pmatrix} 1 & 0 & 0 \\ 0 & \cos\varphi' & 0 \\ 0 & 0 & \cos^2\varphi' \end{pmatrix}.$$

In addition, the matrix $R_2(\chi)$ is taken into account in equation (127), which describes the rotation of the wavefront. If, generally, a wavefront is determined by the function w(x, y), it will be described in rotated coordinates $$\begin{pmatrix} \tilde{x} \\ \tilde{y} \end{pmatrix} = Rot(\alpha) \begin{pmatrix} x \\ y \end{pmatrix} \tag{132}$$

with $$Rot(\alpha) = \begin{pmatrix} \cos\alpha & -\sin\alpha \\ \sin\alpha & \cos\alpha \end{pmatrix}$$

by the transformed function $$\tilde{w}(\tilde{x},\tilde{y}) = w(x(\tilde{x},\tilde{y}), y(\tilde{x},\tilde{y})) \tag{133}$$

The $k^{th}$-order derivative $$\frac{\partial^k}{\partial \tilde{x}^m \partial \tilde{y}^{k-m}} \tilde{w}(\tilde{x}, \tilde{y})$$

with respect to the rotated coordinates can be expressed as a linear combination of the derivatives $$\frac{\partial^k}{\partial x^l \partial y^{k-l}} w(x, y)$$

with respect to the original coordinates. The $(k+1)\times(k+1)$ matrix $R_k(\chi)$ describes the transition between the $k^{th}$-order derivative in the coordinate system $(x,y)$ and the $k^{th}$-order derivative in the coordinate system $(\tilde{x},\tilde{y})$.

$$\frac{\partial^k}{\partial \tilde{x}^m \partial \tilde{y}^{k-m}} \tilde{w}(\tilde{x}, \tilde{y}) = \sum_{l=0}^{k} (R_k(\chi))_{(m+1),(l+1)} \frac{\partial^k}{\partial x^l \partial y^{k-l}} w(x, y), \tag{134}$$

$$m = 0, \ldots, k, l = 0, \ldots, k$$

It explicitly holds for the first three orders that $$R_1(\alpha) = \begin{pmatrix} \cos\alpha & -\sin\alpha \\ \sin\alpha & \cos\alpha \end{pmatrix} = Rot(\alpha)$$

$$R_2(\alpha) = \begin{pmatrix} \cos^2\alpha & -2\cos\alpha\sin\alpha & \sin^2\alpha \\ \cos\alpha\sin\alpha & \cos^2\alpha - \sin^2\alpha & -\cos\alpha\sin\alpha \\ \sin^2\alpha & 2\cos\alpha\sin\alpha & \cos^2\alpha \end{pmatrix}$$

$$R_3(\alpha) = \begin{pmatrix} \cos^3\alpha & -3\cos^2\alpha\sin\alpha & 3\cos\alpha\sin^2\alpha & -\sin^3\alpha \\ \cos^2\alpha\sin\alpha & \cos^3\alpha - 2\cos\alpha\sin^2\alpha & \sin^3\alpha - 2\cos^2\alpha\sin\alpha & \cos\alpha\sin^2\alpha \\ \cos\alpha\sin^2\alpha & -(\sin^3\alpha - 2\cos^2\alpha\sin\alpha) & \cos^3\alpha - 2\cos\alpha\sin^2\alpha & -\cos^2\alpha\sin\alpha \\ \sin^3\alpha & 3\cos\alpha\sin^2\alpha & 3\cos^2\alpha\sin\alpha & \cos^3\alpha \end{pmatrix}$$

$$R_4(\alpha) = \ldots$$

In the following, some special cases of optical systems, in particular spectacle lenses with POE, will be discussed. In the case of a perpendicular incidence of light, it holds that:

$v=n'n;$
$R_2=1;$
$C_2=1;$
$C'_2=1.$

It yields for equation (127):

$$n'\begin{pmatrix} W'^{(2,0)}_{Out}(0,0) \\ W'^{(1,1)}_{Out}(0,0) \\ W'^{(0,2)}_{Out}(0,0) \end{pmatrix} - n\begin{pmatrix} W^{(2,0)}_{In}(0,0) \\ W^{(1,1)}_{In}(0,0) \\ W^{(0,2)}_{In}(0,0) \end{pmatrix} = \tag{127a}$$

$$(n'-n)\begin{pmatrix} \bar{S}^{(2,0)}(0,0) \\ \bar{S}^{(1,1)}(0,0) \\ \bar{S}^{(0,2)}(0,0) \end{pmatrix} - \begin{pmatrix} \Psi^{(2,0)}(0,0) \\ \Psi^{(2,1)}(0,0) \\ \Psi^{(0,2)}(0,0) \end{pmatrix}$$

With a one-dimensional problem (meridional plane), instead of mixed derivatives with respect to $\bar{x},\bar{y}$, only derivatives with respect to one coordinate (e.g. $\bar{y}$) occur. Moreover, it holds that $R_2=\bar{R}_2=1;$ $C_2=\bar{C}_2=\cos^2;$ $C'_2=\bar{C}'_2=\cos^2.$ Consequently, equation (127) can be written as $$n'\cos^2\phi' W'^{(2)}_{Out}(0) - n\cos^2\phi W^{(2)}_{In}(0) = \nu\bar{S}^{(2)} - \Psi^{(2)}(0) \tag{127b}$$

With a perpendicular incidence of light and a one-dimensional problem, instead of mixed derivatives with respect to $\bar{x}$, $\bar{y}$, only derivatives with respect to one coordinate (e.g. $\bar{y}$) occur. Moreover, it holds that $v=n'n$ $R_2=\bar{R}_2=1$ $C_2=\bar{C}_2=1$ $C_2=\bar{C}_2=1$ Consequently, equation (127) can be written as $$n'W'^{(2)}_{Out}(0) - nW^{(2)}_{In}(0) = (n'-n)\bar{S}^{(2)}(0) - \Psi^{(2)}(0) \tag{127c}$$

(135)

Higher-Order Properties of the Wavefront ($3^{rd}, 4^{th}, \ldots$-Order Properties)

By analogy with equation (127), it holds for $3^{rd}$-order derivatives that $$n'R_3(\chi')C_3'R_3(-\chi')\begin{pmatrix} W'^{(3,0)}_{Out}(0,0) \\ W'^{(2,1)}_{Out}(0,0) \\ W'^{(1,2)}_{Out}(0,0) \\ W'^{(0,3)}_{Out}(0,0) \end{pmatrix} - \tag{136}$$

$$nR_3(\chi)C_3R_3(-\chi)\begin{pmatrix} W^{(3,0)}_{In}(0,0) \\ W^{(2,1)}_{In}(0,0) \\ W^{(1,2)}_{In}(0,0) \\ W^{(0,3)}_{In}(0,0) \end{pmatrix} ==$$

$$v\begin{pmatrix} \overline{S}^{(3,0)}(0,0) \\ \overline{S}^{(2,1)}(0,0) \\ \overline{S}^{(1,2)}(0,0) \\ \overline{S}^{(0,3)}(0,0) \end{pmatrix} - \begin{pmatrix} \Psi^{(3,0)}(0,0) \\ \Psi^{(2,1)}(0,0) \\ \Psi^{(1,2)}(0,0) \\ \Psi^{(0,3)}(0,0) \end{pmatrix} + Q_3(S^{(2)}, F^{(2)})$$

wherein analogously to equation (130), it holds that:

$$C_3 = \begin{pmatrix} 1 & 0 & 0 & 0 \\ 0 & \cos\varphi & 0 & 0 \\ 0 & 0 & \cos^2\varphi & 0 \\ 0 & 0 & 0 & \cos^3\varphi \end{pmatrix}, \tag{137}$$

$$C_3' = \begin{pmatrix} 1 & 0 & 0 & 0 \\ 0 & \cos\varphi' & 0 & 0 \\ 0 & 0 & \cos^2\varphi' & 0 \\ 0 & 0 & 0 & \cos^3\varphi' \end{pmatrix}.$$

Equations for even higher orders k=4, 5, . . . can be formed analogously.

With the above-described procedure, it is possible to describe an optical system (e.g. a spectacle lens) with at least one diffraction grating in an exact manner. In particular, it is possible to describe the second and higher-order properties of the wavefront exiting the optical system in an exact manner. On the basis of the second and higher-order properties of the wavefront, the aberrations of the optical element (e.g. of the spectacle lens) can be determined in a manner per se known. In this respect, special reference is made to document WO 2008/089999 A1, to the article by W. Becken et al. "Brillengläser im Sport: Optimierung der Abbildungseigenschaften unter physiologischen Aspekten", Z. Med. Phys., 17 (2007), pages 56-66, or to the article by G. Esser "Derivation of the refraction equations for higher-order aberrations of local wavefronts at oblique incidence", JOSA A, vol. 27, no. 2, February 2010, pages 218-237. These documents are explicitly referred to with regard to the technical terminology used as well as the symbols used in equations (121) to (137) and the connection of sphere, cylinder, axis (SZA, values) to wavefront properties. Thus, the corresponding explanations constitute an integral part of disclosure of the present application.

REFERENCE NUMERAL LIST 10 incident wavefront
12 boundary surface
14 periodic structure (diffraction grating)
16 outgoing wavefront
20 prism
100 optical element/system (e.g. spectacle lens)
102 incident ray
104,106 refractive boundary surfaces
108 outgoing ray
108-m outgoing ray of the $m^{th}$ diffraction order
110 incident wavefront
112 outgoing wavefront
122 diffraction grating
114 optical material
116 passage through the optical material
122a grating lines
112b projected grating lines
124 plane of incidence
126 orthogonal trajectories
130-134 steps of the transition between a period function and a phase function

The invention claimed is:

1. A method for designing and manufacturing an optical element having at least one diffraction grating, the method comprising:
designing, by a computer, at least one refractive surface contributing to refractive light deflection and/or the at least one diffraction grating of the optical element to minimize the color fringe and at least one second-order aberration of the optical element, by minimizing or maximizing a target function, which depends on the at least one second-order aberration and on the longitudinal and/or lateral chromatic aberration(s) of the optical element,
wherein the target function is a target function $F_1$:

$$F_1 = \sum_\lambda F_{monochrom}(\lambda),$$

wherein $F_{monochrom}(\lambda)$ is a monochromatic target function for the wavelength $\lambda$; and wherein the target function $F_1$ is evaluated for at least two different wavelengths, and wherein the target function $F_1$ is a target function:

$$F_1 = \sum_{i,\lambda} g_Z(i,\lambda)(Z_\Delta(i,\lambda) - Z_{\Delta,target}(i,\lambda))^2 + g_S(i,\lambda)(S_\Delta(i,\lambda) - S_{\Delta,target}(i,\lambda))^2$$

where
$Z_\Delta(i,\lambda)$ is the actual value of the amount of the astigmatic error at the $i^{th}$ evaluation point of the optical element for the wavelength $\lambda$;
$Z_{\Delta,target}(i,\lambda)$ is the target value of the amount of the astigmatic error at the $i^{th}$ evaluation point of the optical element for the wavelength $\lambda$;
$S_\Delta(i,\lambda)$ is the actual value of the refractive error at the $i^{th}$ evaluation point of the optical element for the wavelength $\lambda$;
$S_{\Delta,target}(i,\lambda)$ is the target value of the refractive error at the $i^{th}$ evaluation point of the optical element for the wavelength $\lambda$;
$g_Z(i,\lambda)$ is the weighting of the amount of the astigmatic deviation at the $i^{th}$ evaluation point of the optical element for the wavelength $\lambda$; and
$g_S(i,\lambda)$ is the weighting of the refractive error at the $i^{th}$ evaluation point of the optical element for the wavelength $\lambda$; and manufacturing the optical element on the basis of the designed at least one refractive surface and/or the at least one diffraction grating.

2. The method according to claim 1, wherein both the at least one refractive surface and the at least one diffraction grating of the optical element are designed.

3. A method for designing and manufacturing an optical element having at least one diffraction grating, the method comprising:

designing, by a computer, at least one refractive surface contributing to refractive light deflection and/or the at least one diffraction grating of the optical element to minimize the color fringe and at least one second-order aberration of the optical element, by minimizing or maximizing a target function, which depends on the at least one second-order aberration and on the longitudinal and/or lateral chromatic aberration(s) of the optical element, wherein the target function is a target function $F_2$:

$$F_2 = F_{monochrom}(\lambda_0) + \sum_i g_{FL}(i) \times f(S_S(i, \lambda_2) - S_S(i, \lambda_1))^2$$

where $F_{monochrom}(\lambda)$ is a monochromatic target function for a predetermined wavelength $\lambda_0$;

$g_{FLF}(i)$ is the weighting of the longitudinal chromatic aberration at the $i^{th}$ evaluation point of the optical element;

$S_{SK}(i,\lambda_1)$ is the vergence matrix of the wavefront at the vertex sphere for the wavelength $\lambda_1$ and for the $i^{th}$ evaluation point;

$S_{SK}(i,\lambda_2)$ is the vergence matrix of the wavefront at the vertex sphere for the wavelength $\lambda_2$ and for the $i^{th}$ evaluation point; and $f(S_{SK}(i,\lambda_2)-S_{SK}(i,\lambda_1))$ is a function of the difference of the vergence matrices of the wavefront at the vertex sphere for two different wavelengths $\lambda_1$ and $\lambda_2$; and manufacturing the optical element on the basis of the designed at least one refractive surface and/or the at least one diffraction grating.

4. The method according to claim 3, wherein the target function $F_2$ is a target function:

$$F_2 = \sum_i (g_Z(i)(Z_\Delta(i, \lambda_0) - Z_{\Delta,target}(i, \lambda_0))^2 + g_S(i)(S_\Delta(i, \lambda_0) - S_{\Delta,target}(i, \lambda_0))^2 + g_{FLF}(i) \times f(S_{SK}(i, \lambda_2) - S_{SK}(i, \lambda_1))^2)$$

where $Z_\Delta(i,\lambda)$ is the actual value of the amount of the astigmatic error at the $i^{th}$ evaluation point of the optical element for the wavelength $\lambda$;

$Z_{\Delta,target}(i,\lambda)$ is the target value of the amount of the astigmatic error at the $i^{th}$ evaluation point of the optical element for the wavelength $\lambda$;

$S_\Delta(i,\lambda)$ is the actual value of the refractive error at the $i^{th}$ evaluation point of the optical element for the wavelength $\lambda$;

$S_{\Delta,target}(i,\lambda)$ is the target value of the refractive error at the $i^{th}$ evaluation point of the optical element for the wavelength $\lambda$;

$g_Z(i,\lambda)$ is the weighting of the amount of the astigmatic deviation at the $i^{th}$ evaluation point of the optical element for the wavelength $\lambda$; and $g_S(i,\lambda)$ is the weighting of the refractive error at the $i^{th}$ evaluation point of the optical element for the wavelength $\lambda$.

5. A method for designing and manufacturing an optical element having at least one diffraction grating, the method comprising:

designing, by a computer, at least one refractive surface contributing to refractive light deflection and/or the at least one diffraction grating of the optical element to minimize the color fringe and at least one second-order aberration of the optical element, by minimizing or maximizing a target function, which depends on the at least one second-order aberration and on the longitudinal and/or lateral chromatic aberration(s) of the optical element, wherein the target function is a target function $F_3$:

$$F_3 = F_{monochrom}(\lambda_0) + \sum_i g_{FQF}(i) \times g(\Delta\varphi_{SK}(i, \lambda_2, \lambda_1))^2$$

where $F_{monochrom}(\lambda)$ is a monochromatic target function for a predetermined wavelength $\lambda_0$;

$g_{FQF}(i)$ is the weighting of the lateral chromatic aberration at the $i^{th}$ evaluation point of the optical element;

$S_{SK}(i,\lambda_1)$ is the vergence matrix of the wavefront at the vertex sphere for the wavelength $\lambda_1$ and for the $i^{th}$ evaluation point;

$S_{SK}(i,\lambda_2)$ is the vergence matrix of the wavefront at the vertex sphere for the wavelength $\lambda_2$ and for the $i^{th}$ evaluation point;

$\Delta\phi_{SK}(i, \lambda_2, \lambda_1)$ is the angle between the object-side main rays for different wavelengths $\lambda_1$ and $\lambda_2$; and $g(\Delta\phi_{SK}(i, \lambda_2, \lambda_1))$ is a function of the angle between the object-side main rays for different wavelengths $\lambda_1$ and $\lambda_2$; and manufacturing the optical element on the basis of the designed at least one refractive surface and/or the at least one diffraction grating.

6. The method according to claim 5, wherein the third target function $F_3$ is a function:

where $Z_\Delta(i,\lambda)$ is the actual value of the amount of the astigmatic error at the $i^{th}$ evaluation point of the optical element for the wavelength $\lambda$;

$Z_{\Delta,target}(i,\lambda)$ is the target value of the amount of the astigmatic error at the $i^{th}$ evaluation point of the optical element for the wavelength $\lambda$;

$S_\Delta(i,\lambda)$ is the actual value of the refractive error at the $i^{th}$ evaluation point of the optical element for the wavelength $\lambda$;

$S_{\Delta,target}(i,\lambda)$ is the target value of the refractive error at the $i^{th}$ evaluation point of the optical element for the wavelength $\lambda$;

$g_Z(i,\lambda)$ is the weighting of the amount of the astigmatic deviation at the $i^{th}$ evaluation point of the optical element for the wavelength $\lambda$; and $g_S(i,\lambda)$ is the weighting of the refractive error at the $i^{th}$ evaluation point of the optical element for the wavelength $\lambda$.

7. The method according to claim 1, wherein the at least one refractive surface and the at least one diffraction grating of the optical element are designed simultaneously or sequentially.

8. The method according to claim 1, further comprising:
specifying a refractive optical element;
calculating a diffraction grating that minimizes the color fringe of the specified refractive optical element, and adding the thus calculated diffraction grating to the refractive optical element;
designing at least one of the refractive surfaces of the thus created optical element with the diffraction grating being maintained such that the refractive error introduced by the diffraction grating is minimized; and
designing the at least one diffraction grating with refractive surfaces of the optical element being maintained such that the color fringe introduced by the surface modification is minimized.

9. The method according to claim 8, wherein specifying a refractive optical element comprises designing at least one of the refractive surfaces of the refractive optical element, which is performed such as to minimize at least one second-order aberration, preferably the refractive error of the optical element.

10. The method according to claim 1, further comprising:
designing at least one of the refractive surfaces of a refractive optical element such that the refractive portion $S_{ref,0}(\lambda_d)$ of the refractive power becomes the value $$\frac{S_{prescriptio}}{\left(1 - \frac{1}{v_d} \cdot \frac{\lambda_d}{\lambda_F - \lambda_C}\right)}$$

in a predetermined reference point of the refractive optical element and for a predetermined wavelength $\lambda_d$; and
calculating a diffraction grating, which minimizes the color fringe of the refractive optical element, and adding the thus calculated diffraction grating to the designed refractive optical element,
where
$S_{prescription}$ is a predetermined target value;
$v_d$ is the Abbe number of the base lenses;
$\lambda_F$ is the F-Fraunhofer line, which is taken into account in the definition of the Abbe number; and
$\lambda_C$ is the C-Fraunhofer line, which is taken into account in the definition of the Abbe number.

11. The method according to claim 1, further comprising:
specifying a refractive optical element with a refractive power $$S_{ref,0}(\lambda_d) = \frac{S_{prescriptio}}{\left(1 - \frac{1}{v_d} \cdot \frac{\lambda_d}{\lambda_F - \lambda_C}\right)}$$

in a predetermined reference point for a predetermined wavelength $\lambda_d$;
calculating a diffraction grating adapted to minimize the color fringe of the refractive optical element, and adding the thus calculated diffraction grating to the refractive optical element; and
designing at least one of the refractive surfaces of the thus created optical element with the diffraction grating being maintained such that the refractive error introduced by the diffraction grating is minimized,
where
$S_{prescription}$ is a predetermined target value;
$v_d$ is the Abbe number of the base lenses;
$\lambda_F$ is the F-Fraunhofer line, which is taken into account in the definition of the Abbe number; and
$\lambda_C$ is the C-Fraunhofer line, which is taken into account in the definition of the Abbe number.

12. The method according to claim 1, wherein the at least one aberration of the optical element with the at least one diffraction grating is calculated by means of wavefront tracing based on the diffraction grating.

13. The method according to claim 1, wherein the optical element is a spectacle lens.

14. A computer program product, comprising a non-transitory computer usable medium having a computer readable program code embodied therein, said computer readable program code adapted to be executed to implement designing an optical element with at least one diffraction grating according to claim 1.

15. A non-transitory storage medium with a computer program stored thereon, wherein the computer program is adapted, when loaded and executed on a computer, to perform designing an optical element with at least one diffraction grating according to claim 1.

16. A device for designing an optical element with at least one diffraction grating, comprising a designed adapted to perform design of the optical element according to the designing an optical element according to claim 1.

17. A method for producing an optical element with at least one diffraction grating, comprising:
designing, by a computer, at least one refractive surface contributing to refractive light deflection and/or the at least one diffraction grating of the optical element in such a way as to minimize the color fringe and at least one second-order aberration of the optical element, by minimizing or maximizing a target function, which depends on the at least one second-order aberration and on the longitudinal and/or lateral chromatic aberration(s) of the optical element,
wherein the target function is a target function $F_1$;

$$F_1 = \sum_\lambda F_{monochrom}(\lambda),$$

where $F_{monochrom}(\lambda)$ is a monochromatic target function for the wavelength $\lambda$; and wherein the target function $F_1$ is evaluated for at least two different wavelengths, and
wherein the target function $F_1$ is a target function:

$$F_1 = \sum_{i,\lambda} g_z(i,\lambda)(Z_\Delta(i,\lambda) - Z_{\Delta,target}(i,\lambda))^2 + g_S(i,\lambda)(S_\Delta(i,\lambda) - S_{\Delta,target}(i,\lambda))^2$$

where
$Z_\Delta(i,\lambda)$ is the actual value of the amount of the astigmatic error at the $i^{th}$ evaluation point of the optical element for the wavelength $\lambda$;
$Z_{\Delta,target}(i,\lambda)$ is the target value of the amount of the astigmatic error at the $i^{th}$ evaluation point of the optical element for the wavelength $\lambda$;
$S_\Delta(i,\lambda)$ is the actual value of the refractive error at the $i^{th}$ evaluation point of the optical element for the wavelength $\lambda$;

$S_{\Delta,target}(i,\lambda)$ is the target value of the refractive error at the $i^{th}$ evaluation point of the optical element for the wavelength $\lambda$;

$g_Z(i,\lambda)$ is the weighting of the amount of the astigmatic deviation at the $i^{th}$ evaluation point of the optical element for the wavelength $\lambda$; and $g_S(i,\lambda)$ is the weighting of the refractive error at the $i^{th}$ evaluation point of the optical element for the wavelength $\lambda$;

providing, by the computer, processing data of the designed optical element; and manufacturing the optical element on the basis of the provided processing data.

18. A device for producing an optical element with at least one diffraction grating, comprising:

a designer adapted to perform a design of the optical element by designing, by a computer, at least one refractive surface contributing to refractive light deflection and/or the at least one diffraction grating of the optical element in such a way as to minimize the color fringe and at least one second-order aberration of the optical element, by minimizing or maximizing a target function, which depends on the at least one second-order aberration and on the longitudinal and/or lateral chromatic aberration(s) of the optical element, wherein the target function is a target function $F_1$;

$$F_1 = \sum_\lambda F_{monochrom}(\lambda),$$

where $F_{monochrom}(\lambda)$ is a monochromatic target function for the wavelength $\lambda$; and wherein the target function $F_1$ is evaluated for at least two different wavelengths, and wherein the target function $F_1$ is a target function:

$F_1 = \Sigma_{i,\lambda} g_Z(i,\lambda)(Z\Delta(i,\lambda)-Z_{\Delta,target}(i,\lambda))^2 + g_S(i,\lambda)(S\Delta(i,\lambda)-S_{\Delta,target}(i,\lambda))^2,$ where $Z\Delta(i,\lambda)$ is the actual value of the amount of the astigmatic error at the $i^{th}$ evaluation point of the optical element for the wavelength $\lambda$;

$Z_{\Delta,target}(i,\lambda)$ is the target value of the amount of the astigmatic error at the $i^{th}$ evaluation point of the optical element for the wavelength $\lambda$;

$S_\Delta(i,\lambda)$ is the actual value of the refractive error at the $i^{th}$ evaluation point of the optical element for the wavelength $\lambda$;

$S_{\Delta,target}(i,\lambda)$ is the target value of the refractive error at the $i^{th}$ evaluation point of the optical element for the wavelength $\lambda$;

$g_Z(i,\lambda)$ is the weighting of the amount of the astigmatic deviation at the $i^{th}$ evaluation point of the optical element for the wavelength $\lambda$; and $g_S(i,\lambda)$ is the weighting of the refractive error at the $i^{th}$ evaluation point of the optical element for the wavelength $\lambda$; and a processor adapted to manufacture the designed optical element.

19. A method for producing an optical element with at least one diffraction grating, comprising:

designing, by a computer, at least one refractive surface contributing to refractive light deflection and/or the at least one diffraction grating of the optical element in such a way as to minimize the color fringe and at least one second-order aberration of the optical element, by minimizing or maximizing a target function, which depends on the at least one second-order aberration and on the longitudinal and/or lateral chromatic aberration(s) of the optical element, wherein the target function is a target function $F_2$:

$$F_2 = F_{monochrom}(\lambda_0) + \sum_i g_{FL}(i) \times f(S_S(i,\lambda_2) - S_S(i,\lambda_1))^2$$

where $F_{monochrom}(\lambda)$ is a monochromatic target function for a predetermined wavelength $\lambda_0$;

$g_{FLF}(i)$ is the weighting of the longitudinal chromatic aberration at the $i^{th}$ evaluation point of the optical element;

$S_{SK}(i,\lambda)$ is the vergence matrix of the wavefront at the vertex sphere for the wavelength $\lambda_1$ and for the $i^{th}$ evaluation point;

$S_{SK}(i,\lambda_2)$ is the vergence matrix of the wavefront at the vertex sphere for the wavelength $\lambda_1$ and for the $i^{th}$ evaluation point; and $f(S_{SK}(i,\lambda_2)-S_{SK}(i,\lambda_1))$ is a function of the difference of the vergence matrices of the wavefront at the vertex sphere for two different wavelengths $\lambda_1$ and $\lambda_2$;

providing, by the computer, processing data of the designed optical element; and manufacturing the optical element on the basis of the provided processing data.

20. A device for producing an optical element with at least one diffraction grating, comprising:

a designer adapted to perform a design of the optical element by designing, by a computer, at least one refractive surface contributing to refractive light deflection and/or the at least one diffraction grating of the optical element in such a way as to minimize the color fringe and at least one second-order aberration of the optical element, by minimizing or maximizing a target function, which depends on the at least one second-order aberration and on the longitudinal and/or lateral chromatic aberration(s) of the optical element, wherein the target function is a target function $F_2$:

$$F_2 = F_{monochrom}(\lambda_0) + \sum_i g_{FL}(i) \times f(S_S(i,\lambda_2) - S_S(i,\lambda_1))^2$$

where $F_{monochrom}(\lambda)$ is a monochromatic target function for a predetermined wavelength $\lambda_0$;

$g_{FLF}(i)$ is the weighting of the longitudinal chromatic aberration at the $i^{th}$ evaluation point of the optical element;

$S_{SK}(i,\lambda_1)$ is the vergence matrix of the wavefront at the vertex sphere for the wavelength $\lambda_2$ and for the $i^{th}$ evaluation point;

$S_{SK}(i,\lambda_2)$ is the vergence matrix of the wavefront at the vertex sphere for the wavelength $\lambda_2$ and for the $i^{th}$ evaluation point; and $f(S_{SK}(i,\lambda_2)-S_{SK}(i,\lambda_1))$ is a function of the difference of the vergence matrices of the wavefront at the vertex sphere for two different wavelengths $\lambda_1$ and $\lambda_2$; and a processor adapted to manufacture the designed optical element.

21. A method for producing an optical element with at least one diffraction grating, comprising:

designing, by a computer, at least one refractive surface contributing to refractive light deflection and/or the at least one diffraction grating of the optical element in such a way as to minimize the color fringe and at least one second-order aberration of the optical element, by minimizing or maximizing a target function, which depends on the at least one second-order aberration and on the longitudinal and/or lateral chromatic aberration(s) of the optical element, wherein the target function is a target function $F_3$:

$$F_3 = F_{monochrom}(\lambda_0) + \Sigma_i g_{FQF}(i) \times g(\Delta\phi_{SK}(i,\lambda_2,\lambda_1))^2$$

where $F_{monochrom}(\lambda)$ is a monochromatic target function for a predetermined wavelength $\lambda_0$;

$g_{FQF}(i)$ is the weighting of the lateral chromatic aberration at the $i^{th}$ evaluation point of the optical element;

$S_{SK}(i,\lambda_1)$ is the vergence matrix of the wavefront at the vertex sphere for the wavelength $\lambda_1$ and for the $i^{th}$ evaluation point;

$S_{SK}(i,\lambda_2)$ is the vergence matrix of the wavefront at the vertex sphere for the wavelength $\lambda_2$ and for the $i^{th}$ evaluation point;

$\Delta\phi_{SK}(i, \lambda_2, \lambda_1)$ is the angle between the object-side main rays for different wavelengths $\lambda_1$ and $\lambda_2$; and $g(\Delta\phi_{SK}(i, \lambda_2, \lambda_1))$ is a function of the angle between the object-side main rays for different wavelengths $\lambda_1$ and $\lambda_2$;

providing, by the computer, processing data of the designed optical element; and manufacturing the optical element on the basis of the provided processing data.

22. A device for producing an optical element with at least one diffraction grating, comprising:

a designer adapted to perform a design of the optical element by designing, by a computer, at least one refractive surface contributing to refractive light deflection and/or the at least one diffraction grating of the optical element in such a way as to minimize the color fringe and at least one second-order aberration of the optical element, by minimizing or maximizing a target function, which depends on the at least one second-order aberration and on the longitudinal and/or lateral chromatic aberration(s) of the optical element, wherein the target function is a target function $F_3$:

$$F_3 = F_{monochrom}(\lambda_0) + \sum_i g_{FQF}(i) \times g(\Delta\varphi_{SK}(i, \lambda_2, \lambda_1))^2$$

where $F_{monochrom}(\lambda)$ is a monochromatic target function for a predetermined wavelength $\lambda_0$;

$g_{FQF}(i)$ is the weighting of the lateral chromatic aberration at the $i^{th}$ evaluation point of the optical element;

$S_{SK}(i,\lambda_1)$ is the vergence matrix of the wavefront at the vertex sphere for the wavelength $\lambda_1$ and for the $i^{th}$ evaluation point;

$S_{SK}(i,\lambda_2)$ is the vergence matrix of the wavefront at the vertex sphere for the wavelength $\lambda_2$ and for the $i^{th}$ evaluation point;

$\Delta\phi_{SK}(i, \lambda_2, \lambda_1)$ is the angle between the object-side main rays for different wavelengths $\lambda_1$ and $\lambda_2$; and $g(\Delta\phi_{SK}(i, \lambda_2, \lambda_1))$ is a function of the angle between the object-side main rays for different wavelengths $\lambda_1$ and $\lambda_2$; and a processor adapted to manufacture the designed optical element.

\* \* \* \* \*